US012085871B2

(12) United States Patent
Ogawa et al.

(10) Patent No.: US 12,085,871 B2
(45) Date of Patent: Sep. 10, 2024

(54) IMAGE FORMING APPARATUS WITH SUPPRESSION OF LIGHT QUALITY ATTENUATION

(71) Applicant: CANON KABUSHIKI KAISHA, Tokyo (JP)

(72) Inventors: Tsuyoshi Ogawa, Tokyo (JP); Shinichi Nishida, Kanagawa (JP); Tetsushi Uneme, Kanagawa (JP); Masahiro Suetsugu, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/077,563

(22) Filed: Dec. 8, 2022

(65) Prior Publication Data
US 2023/0185215 A1    Jun. 15, 2023

(30) Foreign Application Priority Data

Dec. 15, 2021 (JP) ................... 2021-203077
Dec. 20, 2021 (JP) ................... 2021-206459

(51) Int. Cl.
*G03G 15/08* (2006.01)
*G01F 23/292* (2006.01)

(52) U.S. Cl.
CPC ....... *G03G 15/0862* (2013.01); *G01F 23/292* (2013.01)

(58) Field of Classification Search
CPC .............. G03G 15/0862; G01F 23/292; G01F 23/2922
See application file for complete search history.

(56) References Cited

U.S. PATENT DOCUMENTS

| 8,280,269 B2 | 10/2012 | Yoshizumi | |
| 9,063,507 B2 | 6/2015 | Gofuku et al. | |
| 11,467,514 B2 | 10/2022 | Sato et al. | |
| 2013/0272727 A1* | 10/2013 | Hirukawa | G03G 15/0862 399/27 |
| 2016/0154338 A1* | 6/2016 | Jeong | G03G 15/0862 399/58 |
| 2022/0404735 A1 | 12/2022 | Sato et al. | |

FOREIGN PATENT DOCUMENTS

| JP | 2003-131479 A | 5/2003 |
| JP | 2005-208339 A | 8/2005 |
| JP | 2010-078933 A | 4/2010 |
| JP | 2011-085721 A | 4/2011 |
| JP | 2014-066899 A | 4/2014 |
| JP | 2019-148785 A | 9/2019 |
| JP | 2020-154302 A | 9/2020 |

* cited by examiner

*Primary Examiner* — Sophia S Chen
(74) *Attorney, Agent, or Firm* — VENABLE LLP

(57) ABSTRACT

An image forming apparatus includes a container to accommodate a developer, and a sensor to output an output signal depending on an amount of the developer in the container, wherein the sensor includes a light emitting element and a light receiving element which are provided outside the container, and a light guide provided on a wall surface of the container and configured to guide light, emitted by the light emitting element, toward the light receiving element through an inside space of the container. The light guide also includes projected portions configured such that light travels from outside of the container to the inside of the container in a direction intersecting with the direction of gravity.

17 Claims, 47 Drawing Sheets

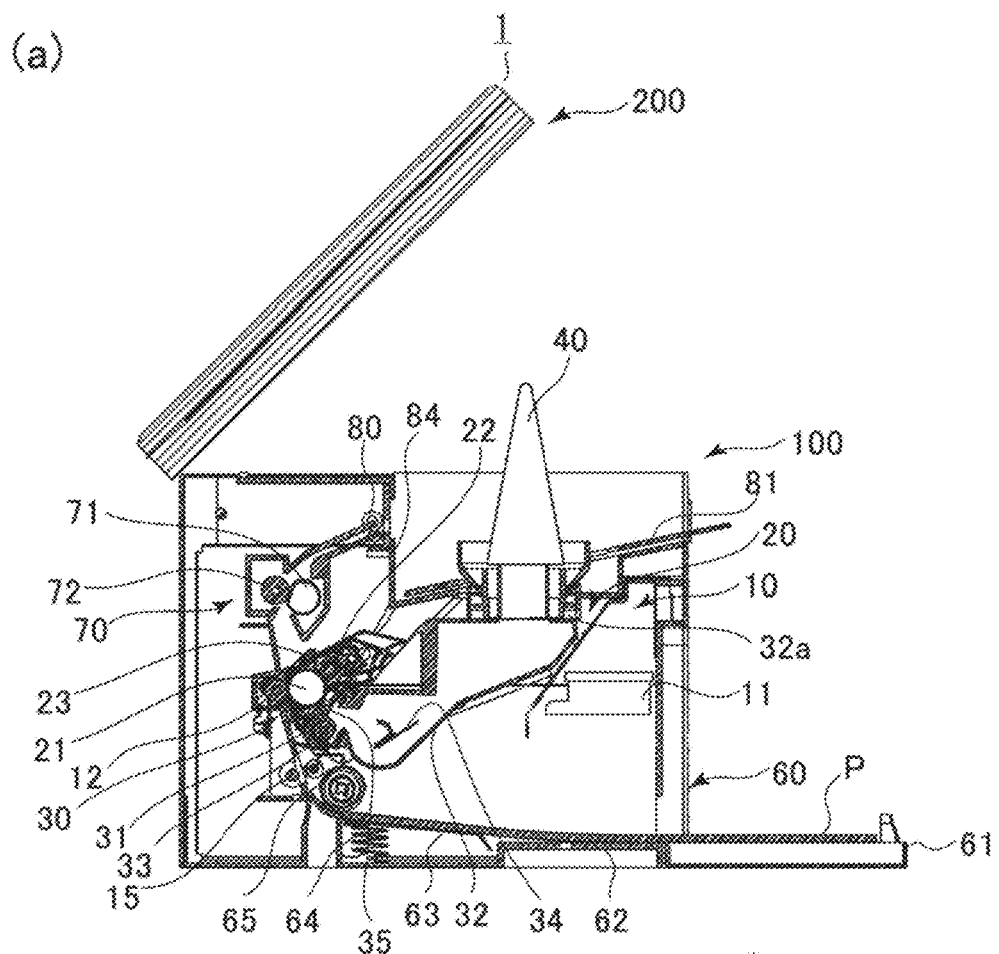
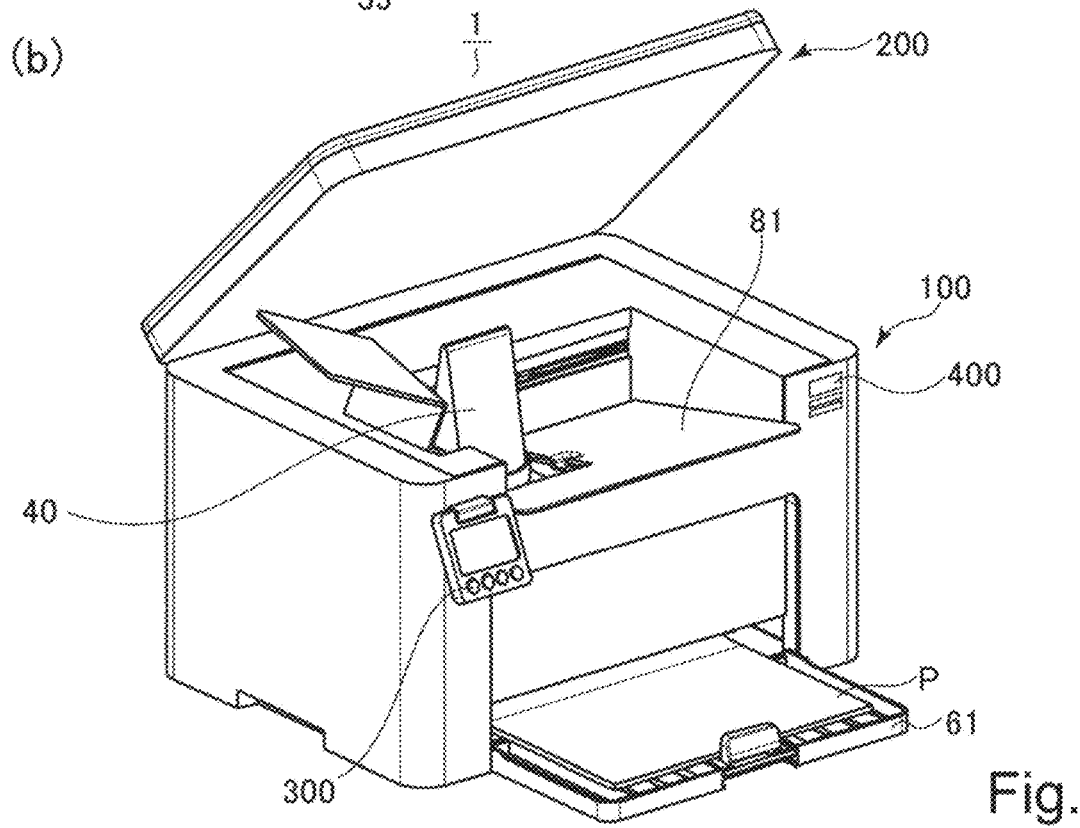
Fig. 1

(a)
(b)
Fig. 2
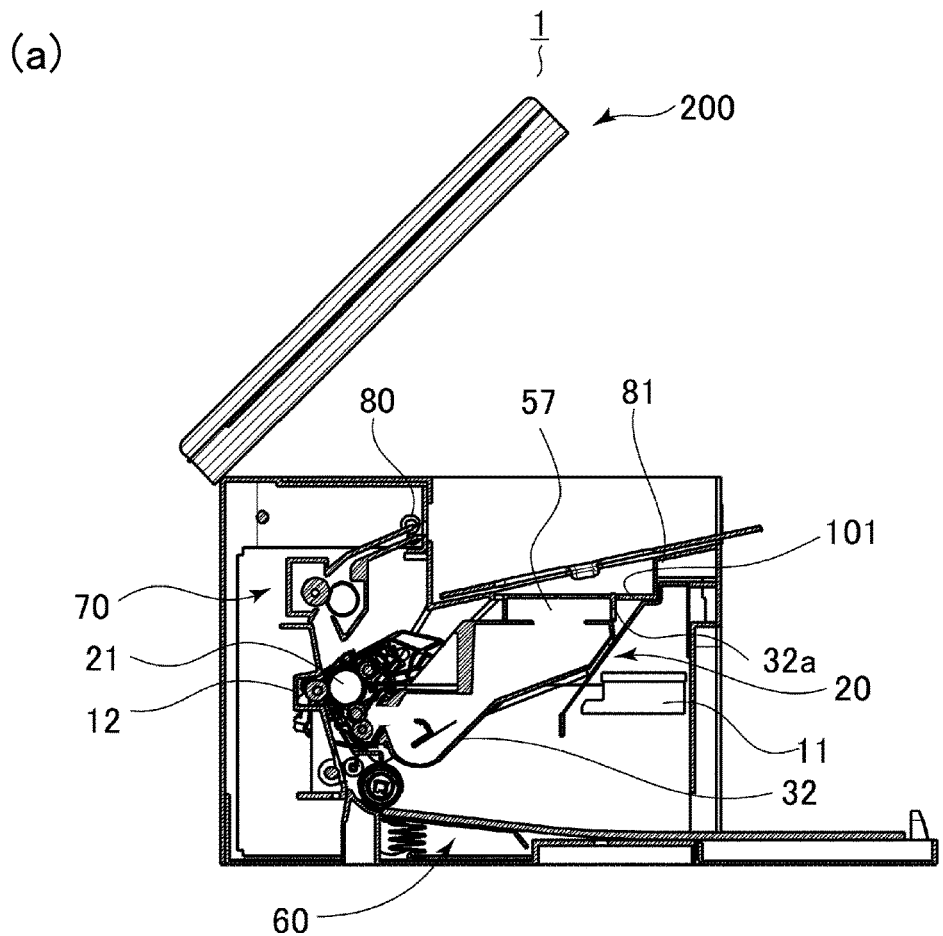
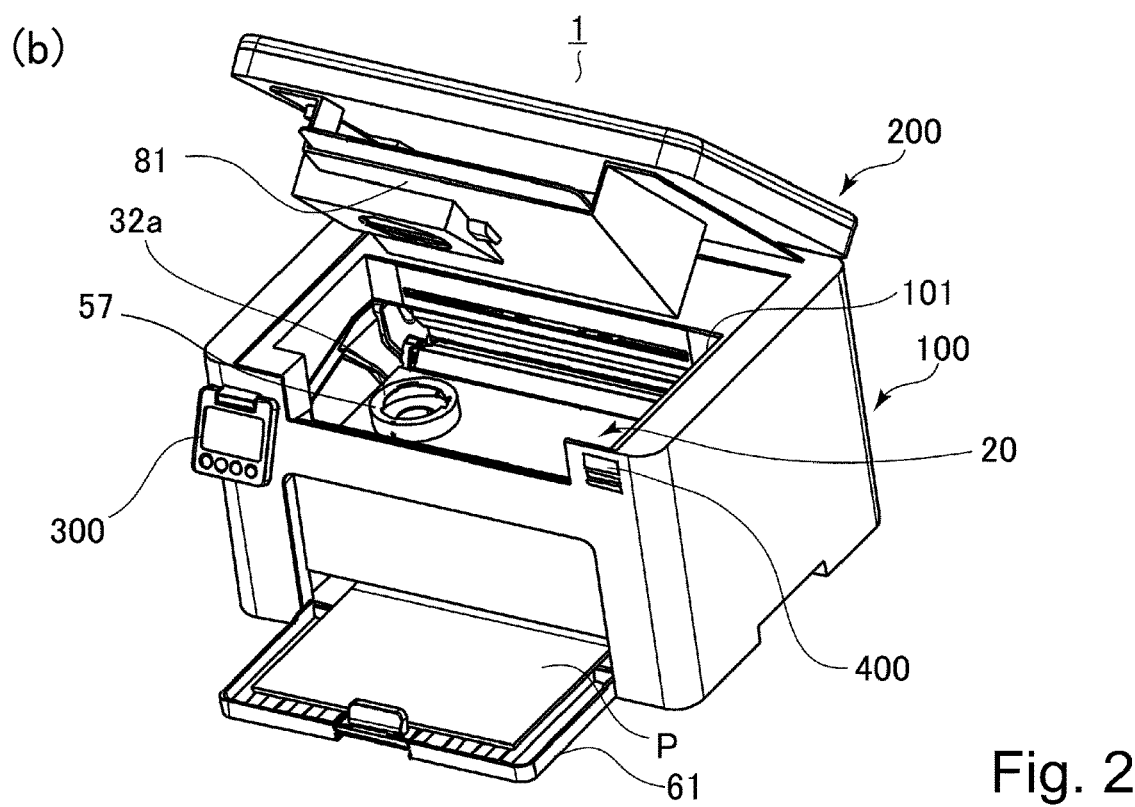

(a)
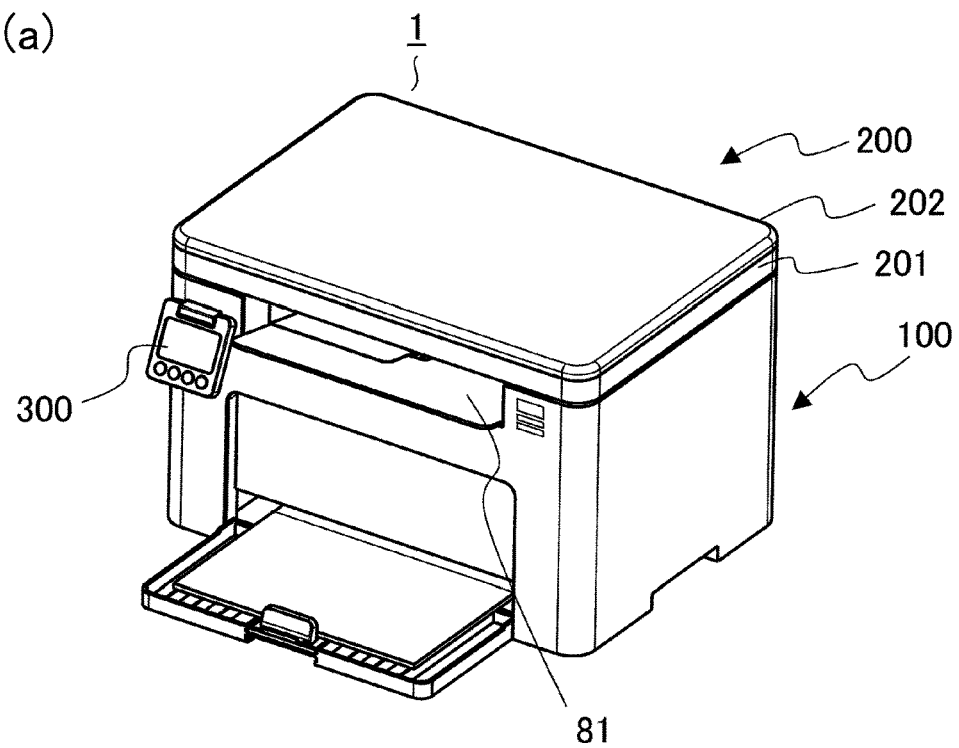
(b)
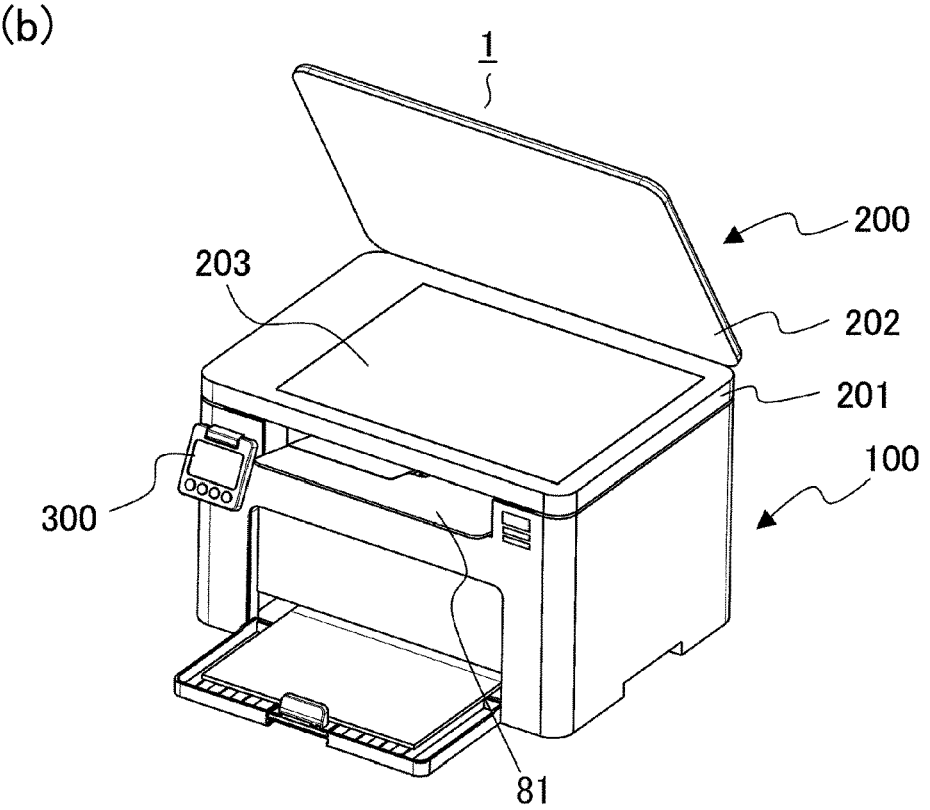
Fig. 3

(a)
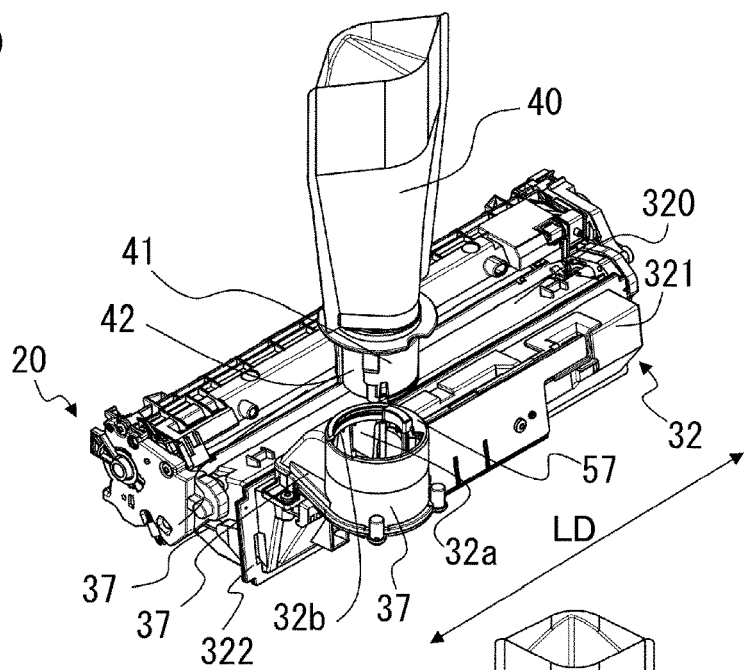
(b)
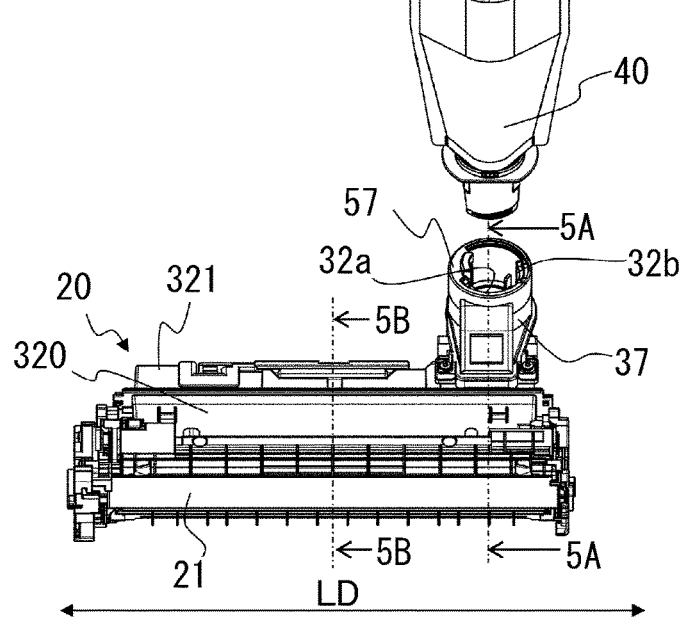
(c)
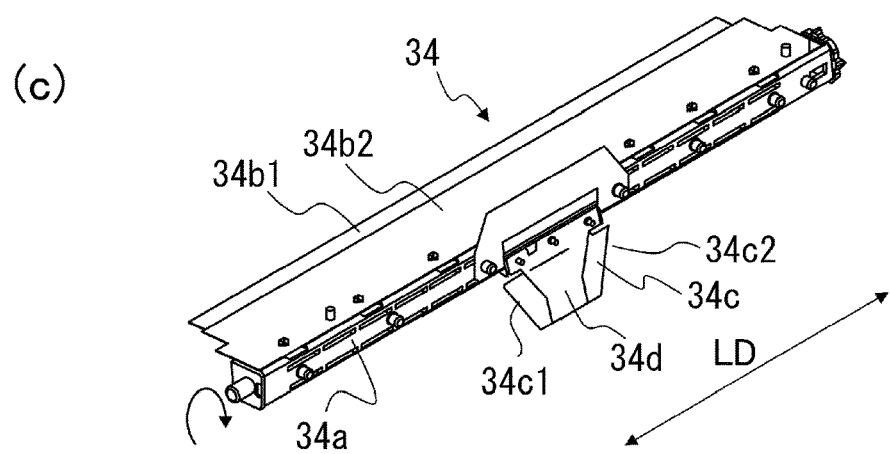
Fig. 4

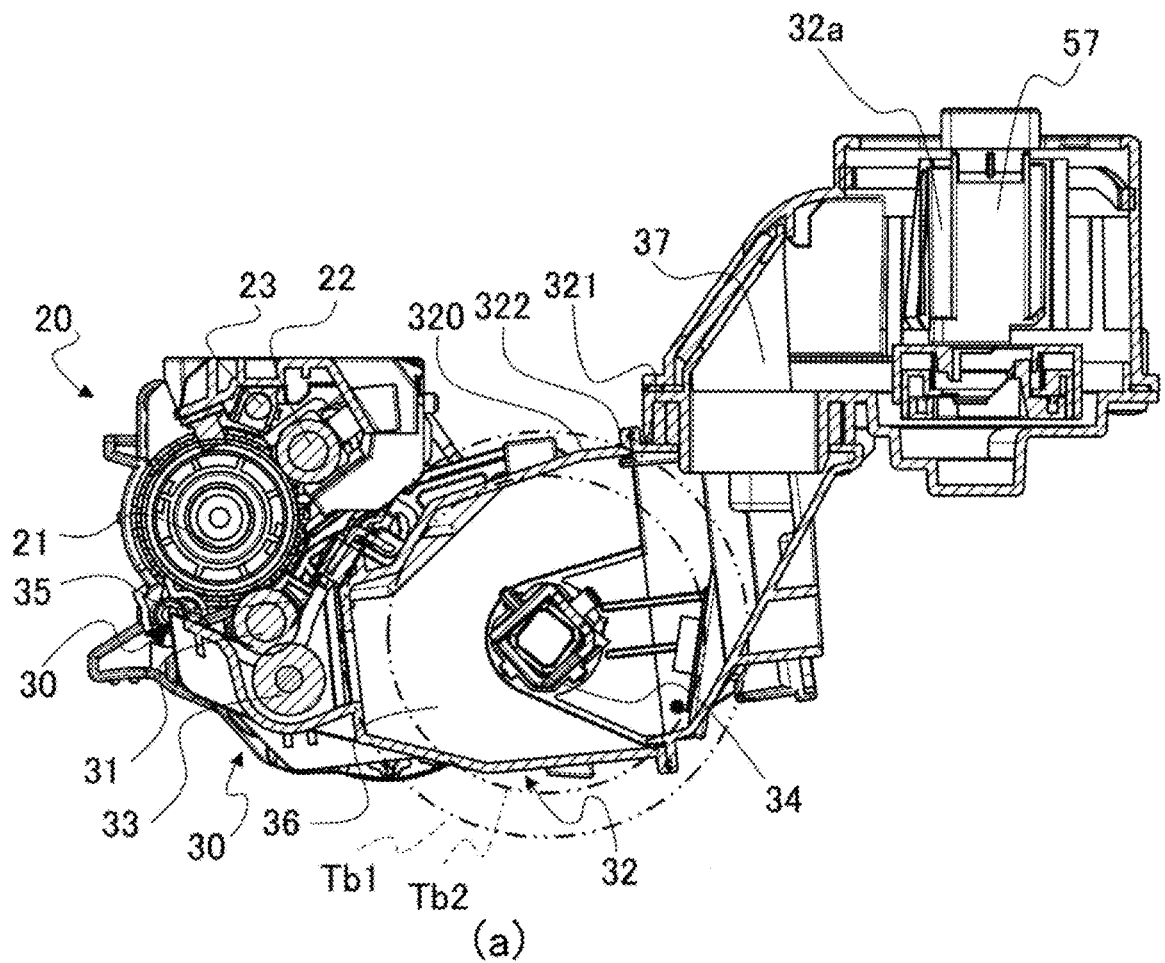
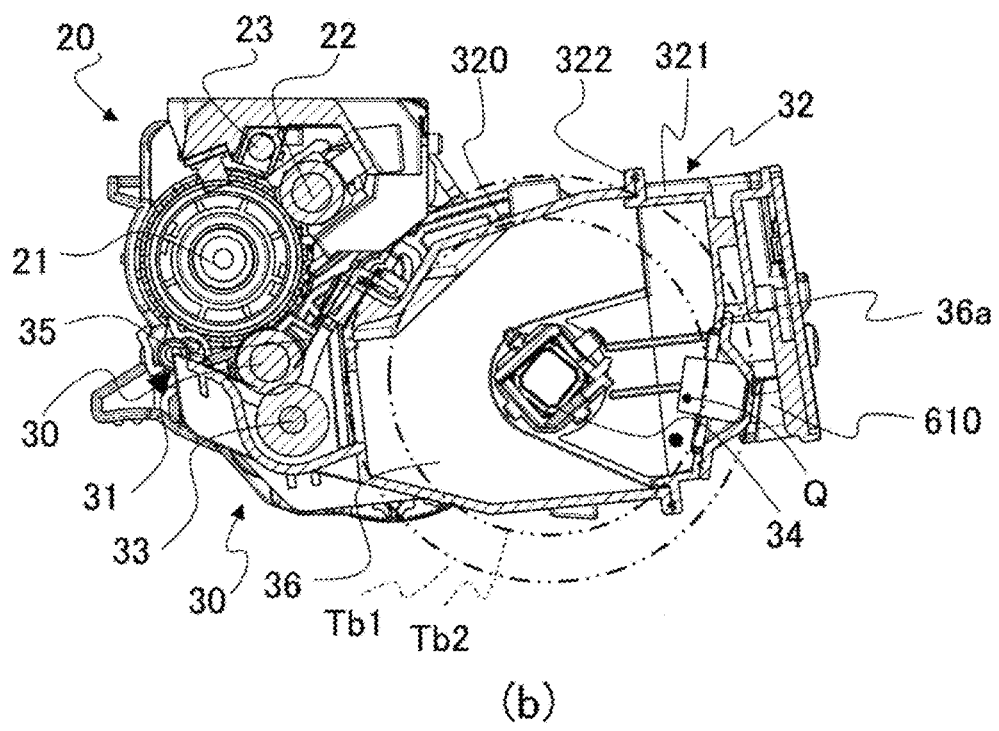
Fig. 5

(a)
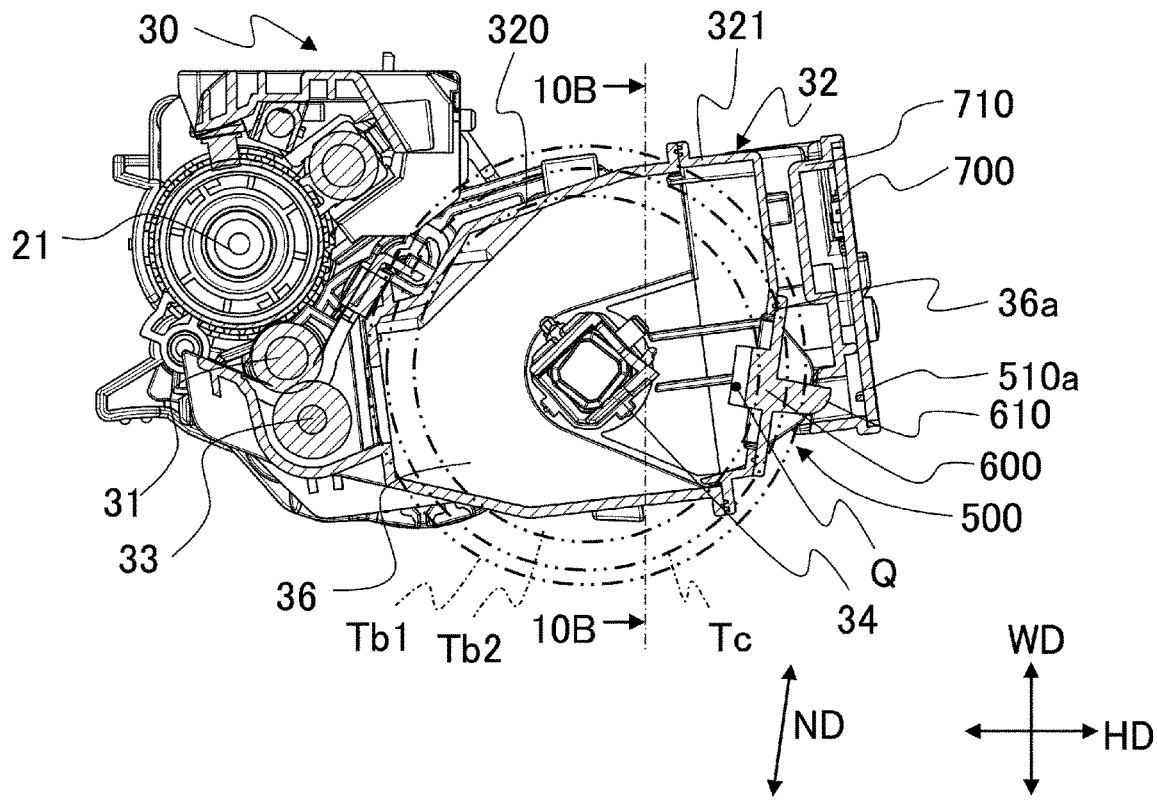
(b)
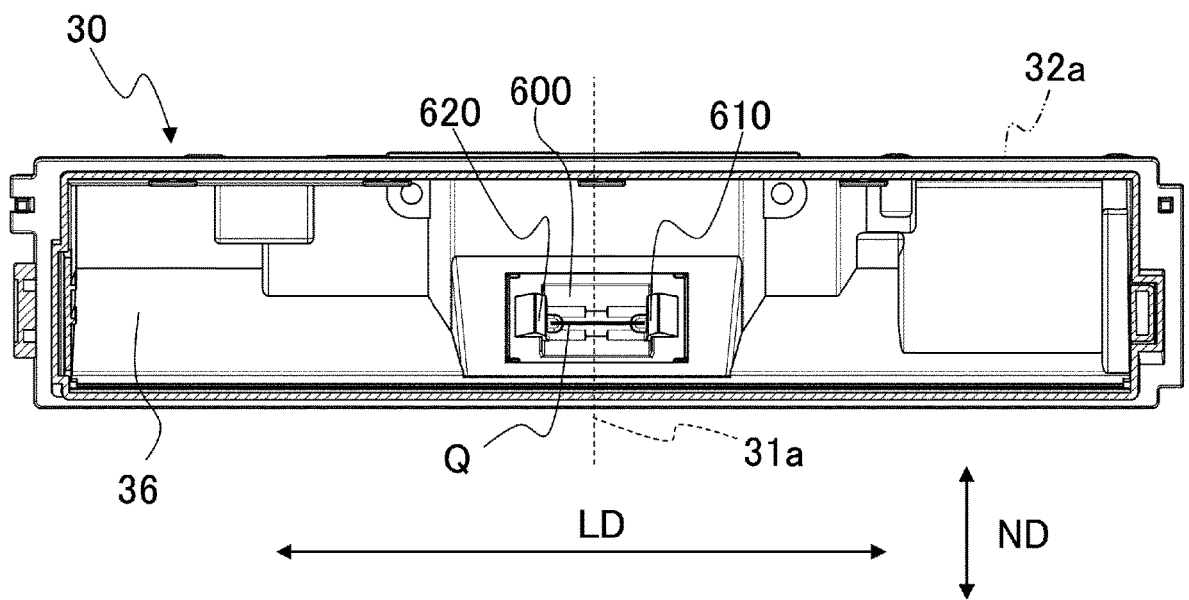
Fig. 10

(a)
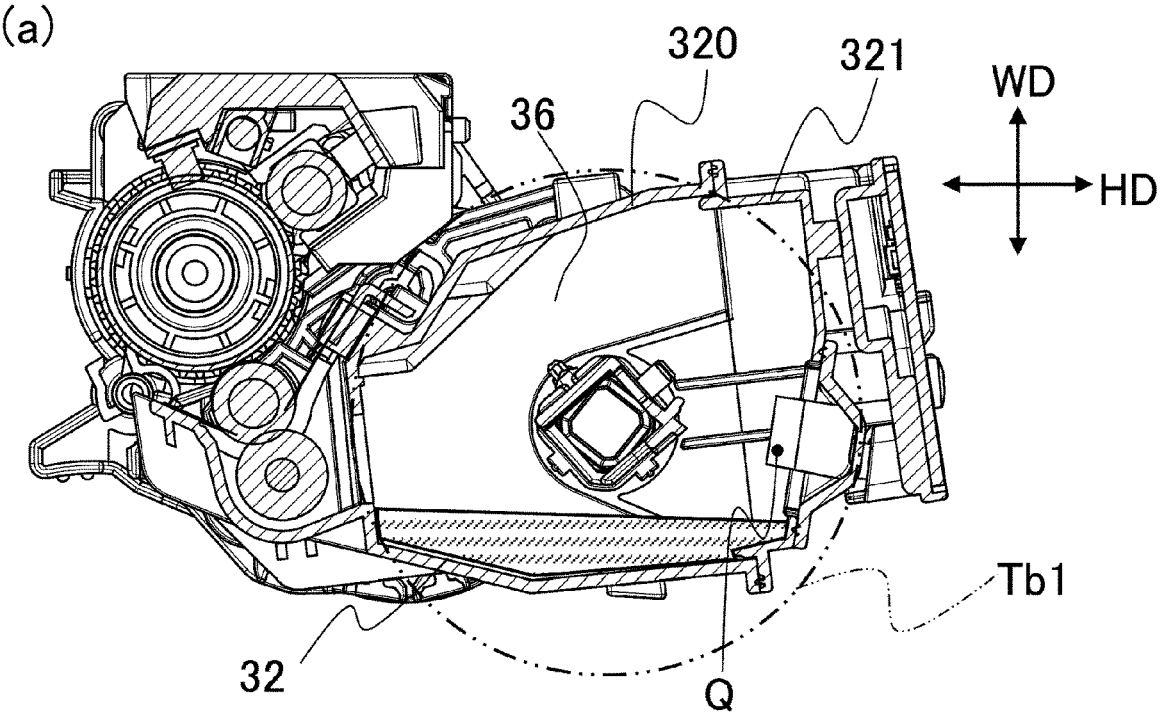
(b)
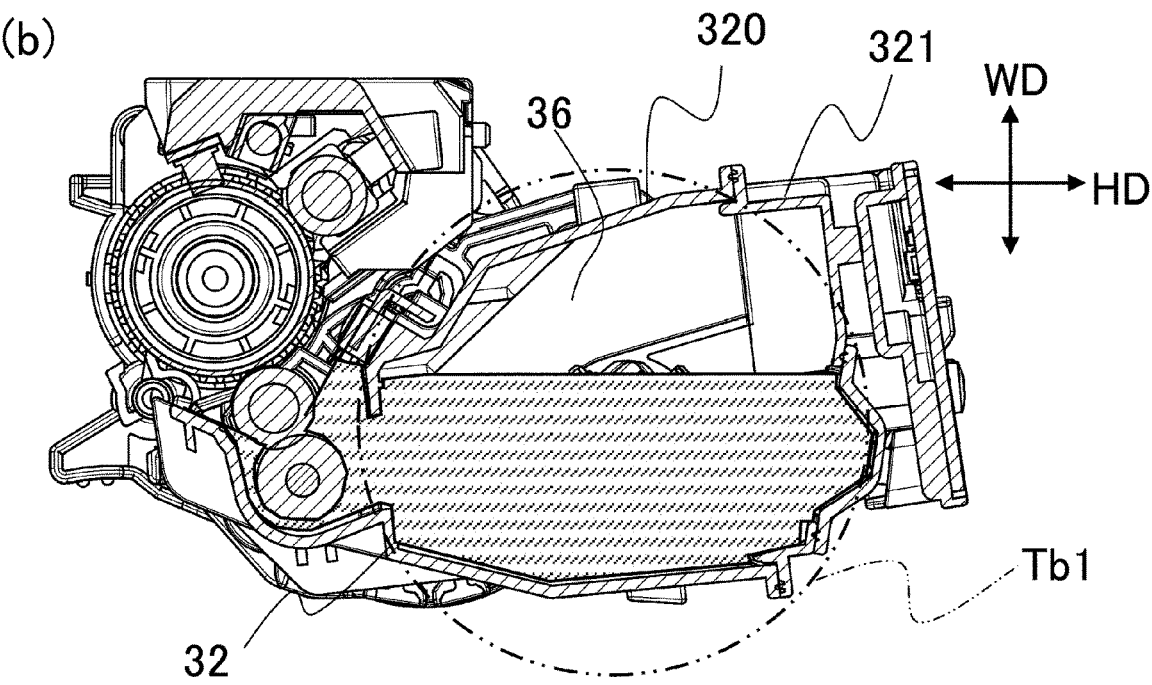
Fig. 12

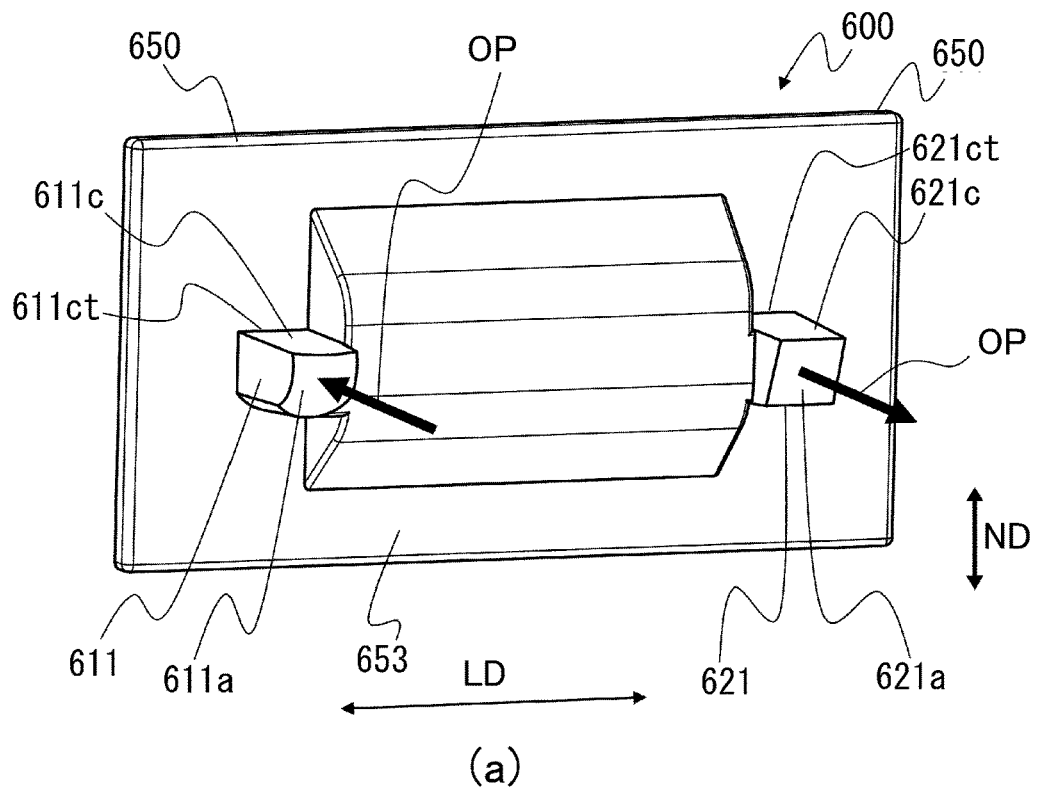
(a)
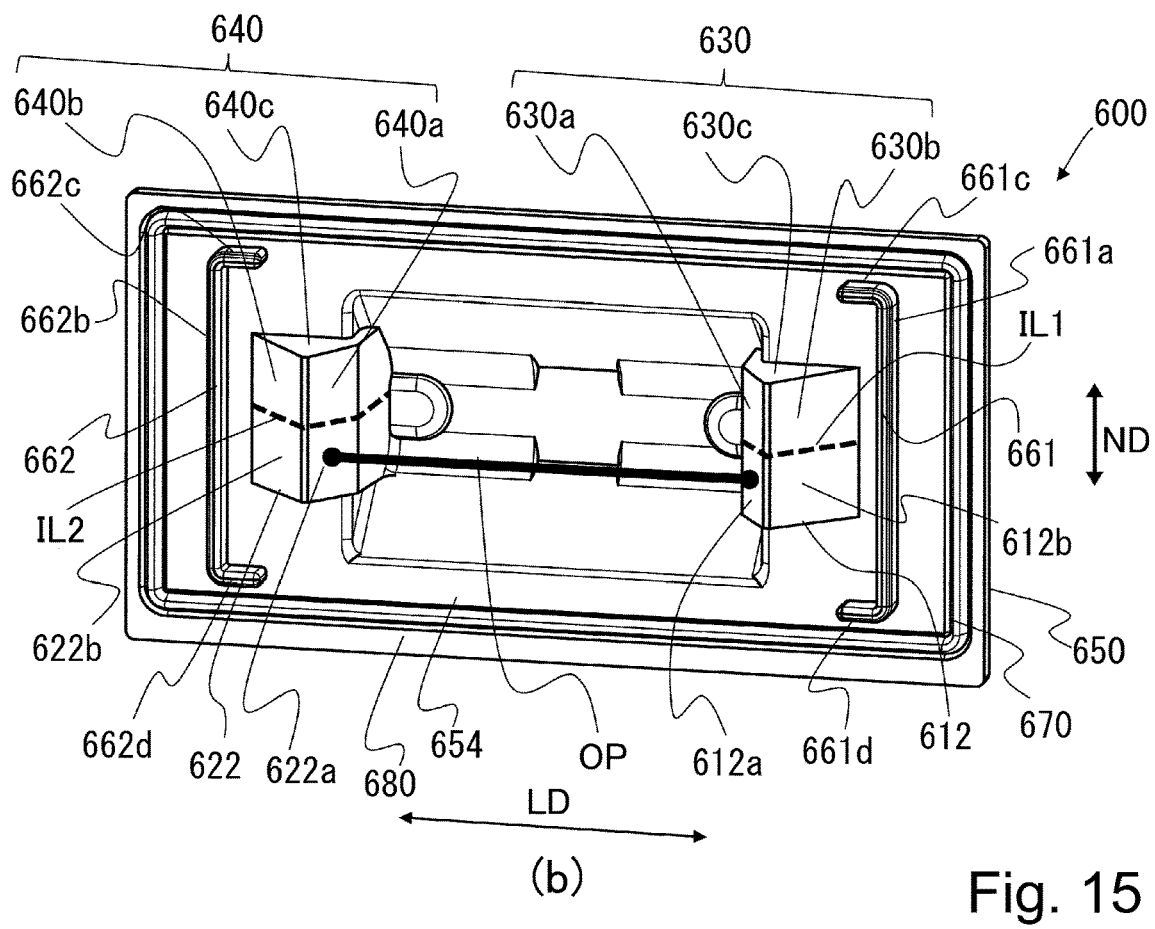
(b)
Fig. 15

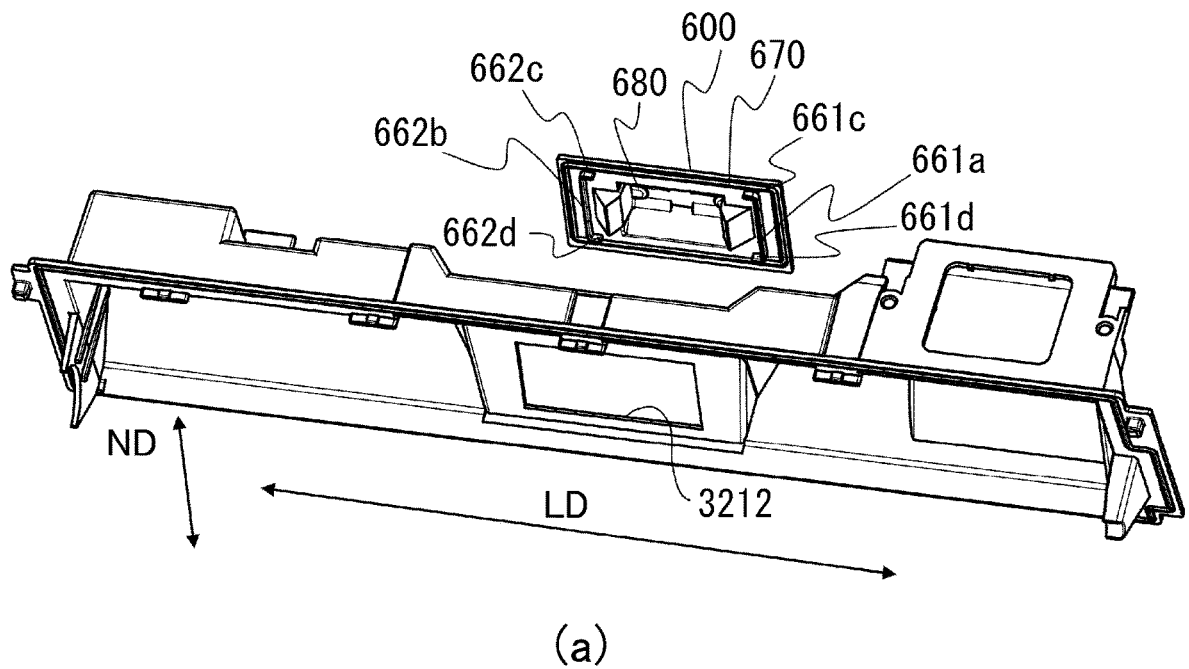
(a)
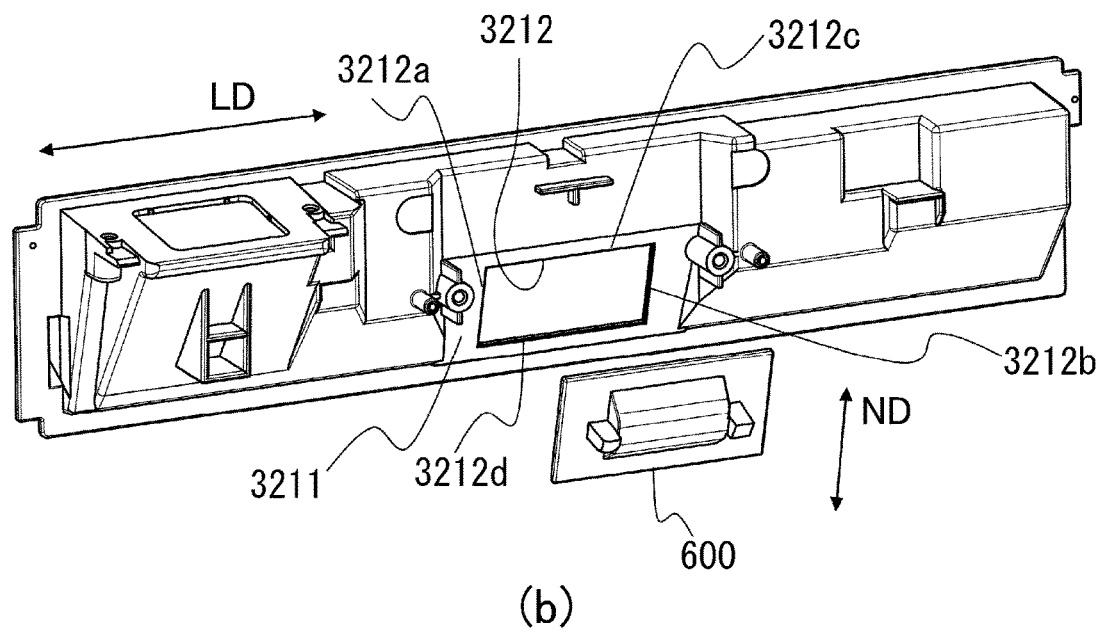
(b)
Fig. 17

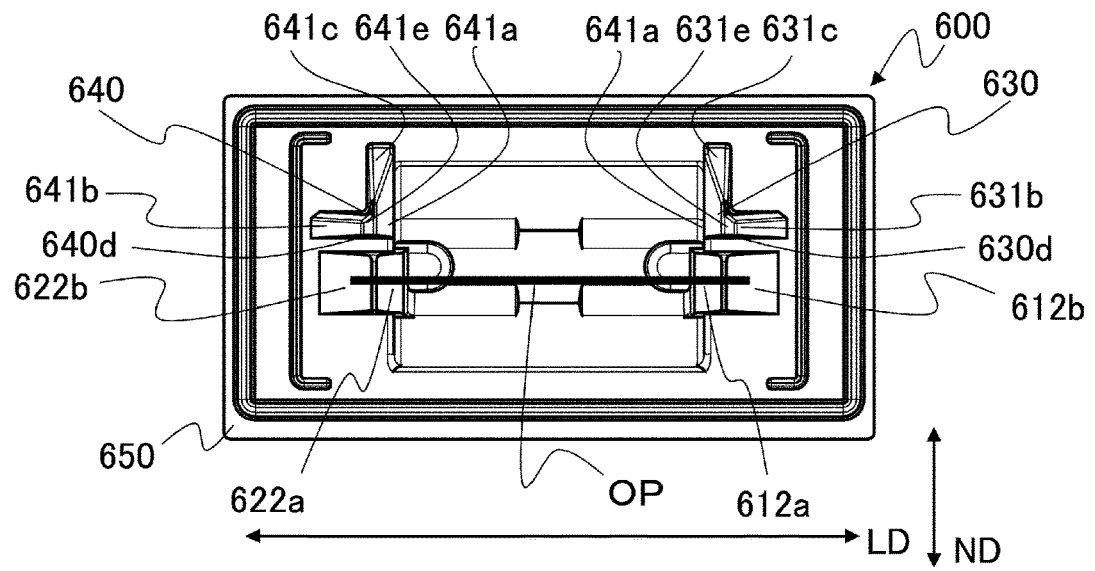
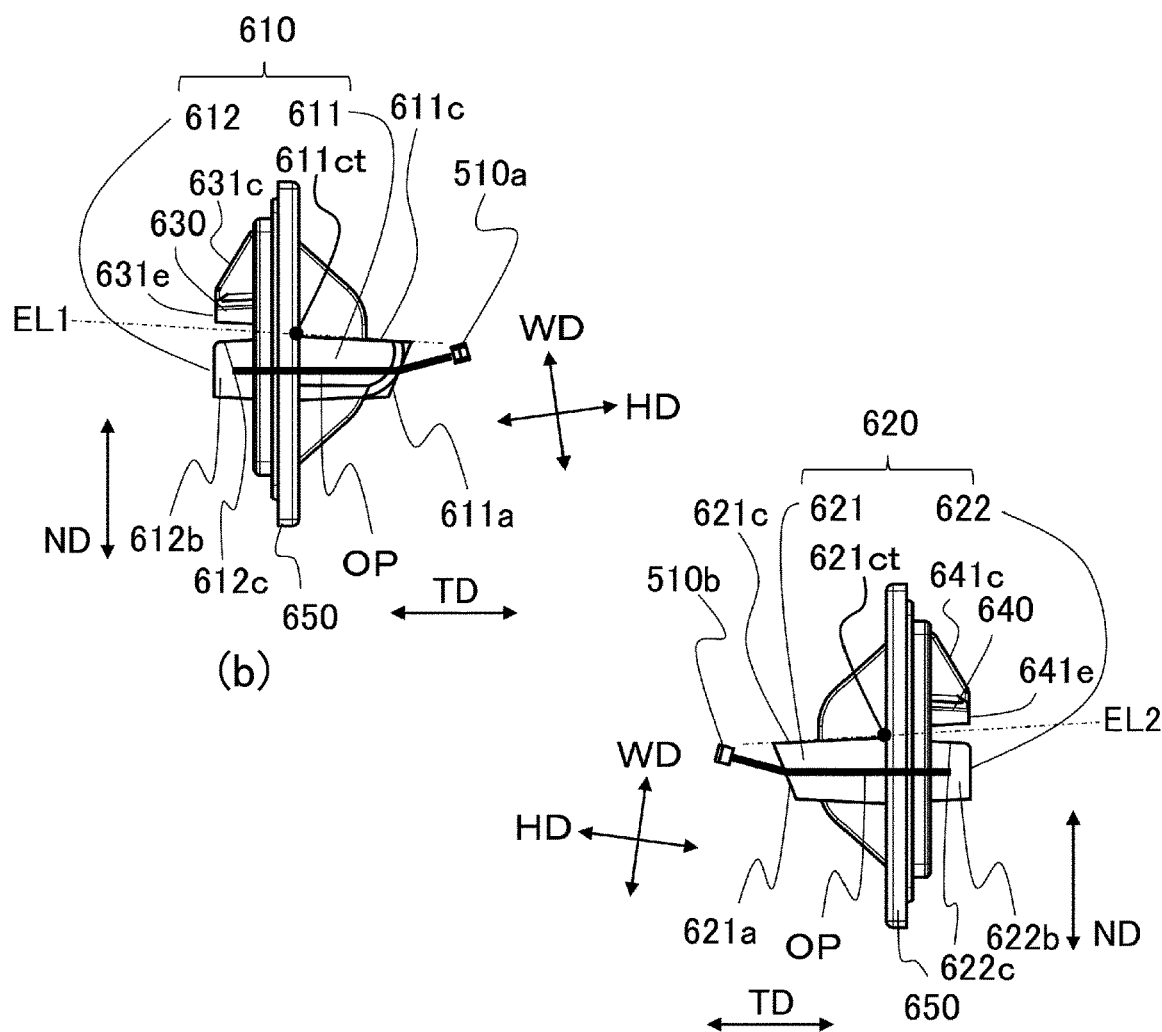
Fig. 23

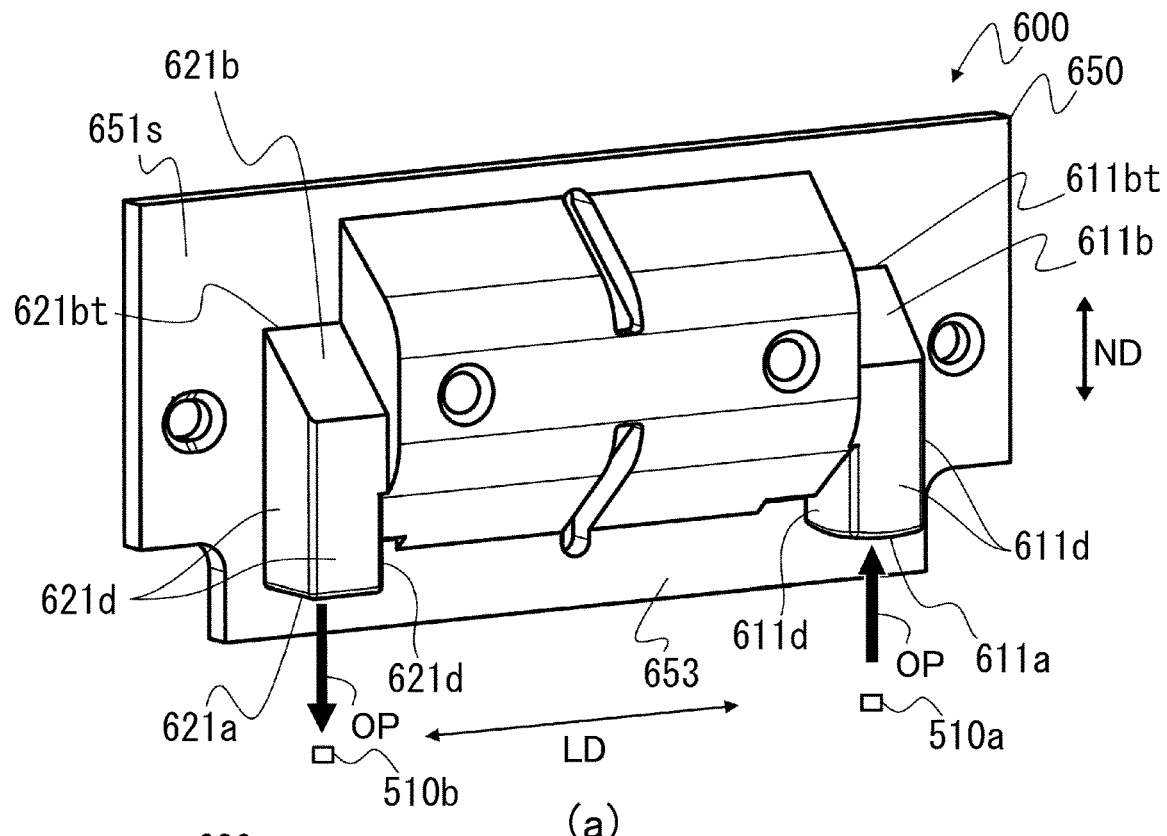
(a)
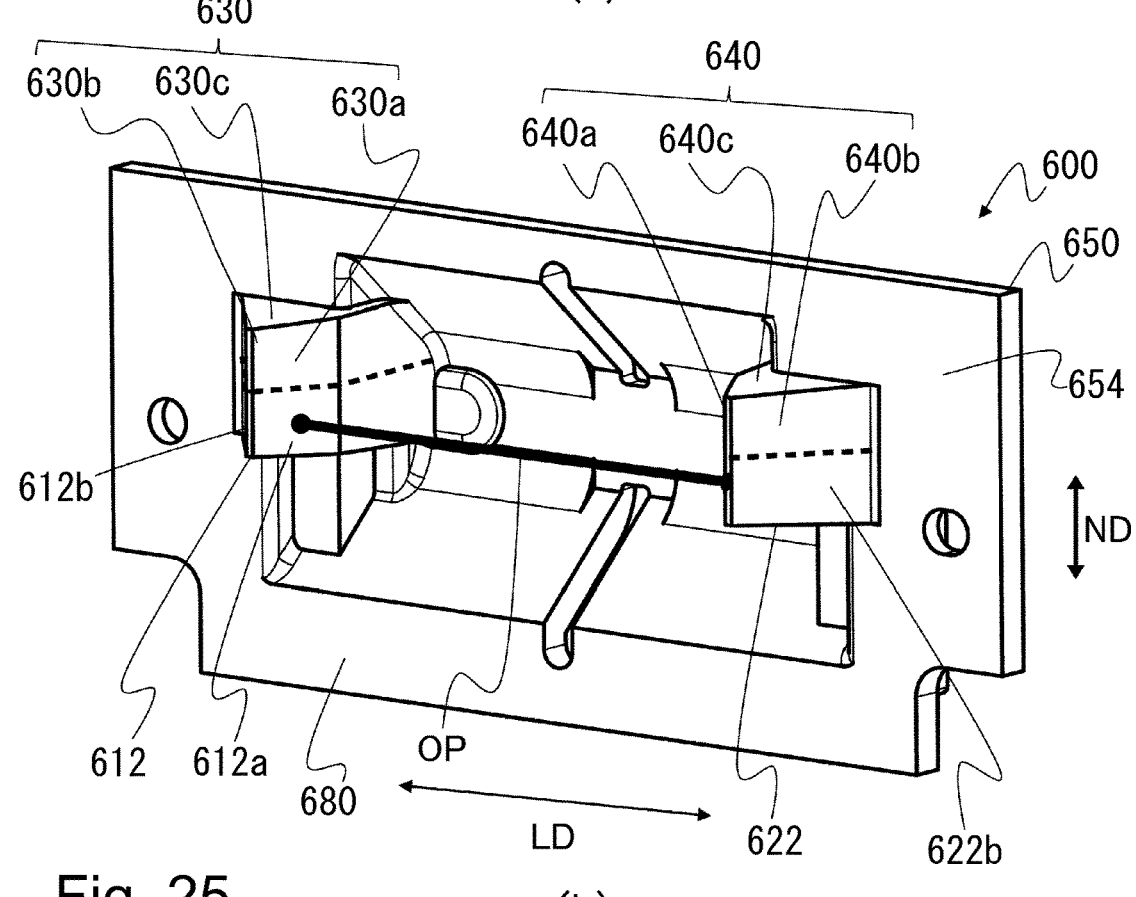
Fig. 25  (b)

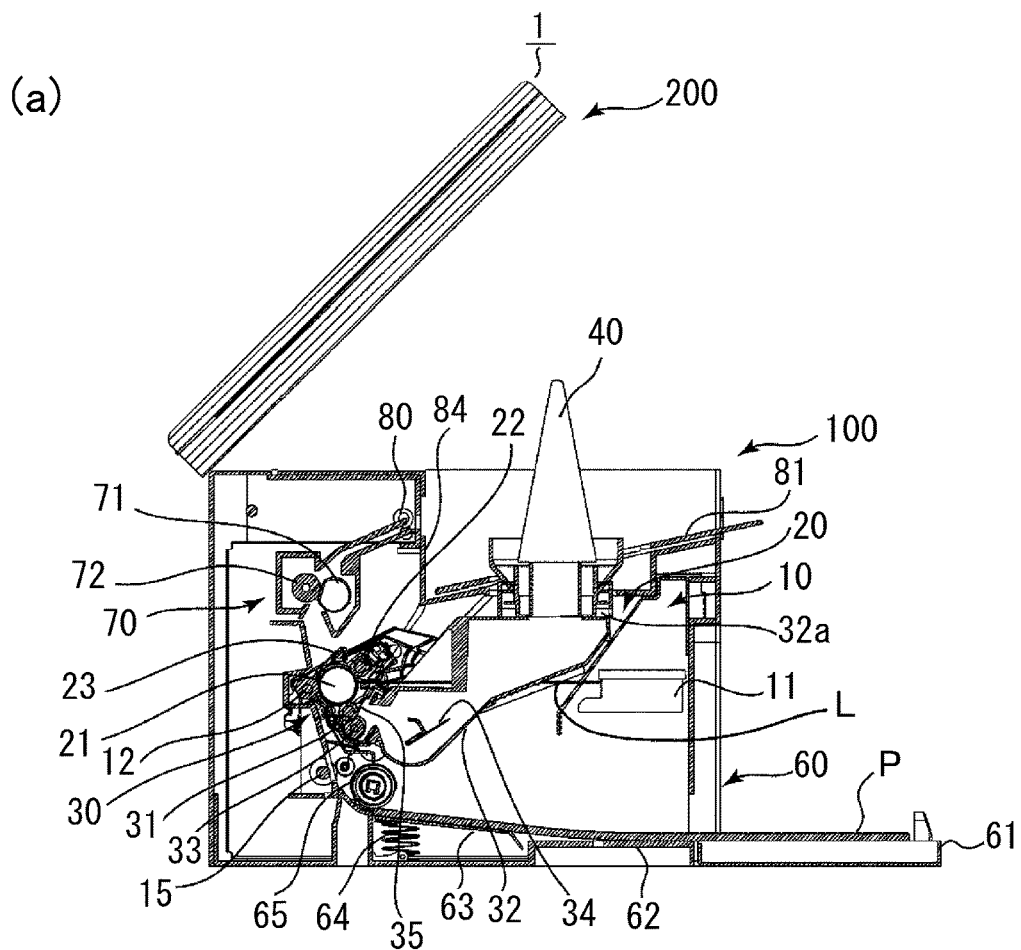
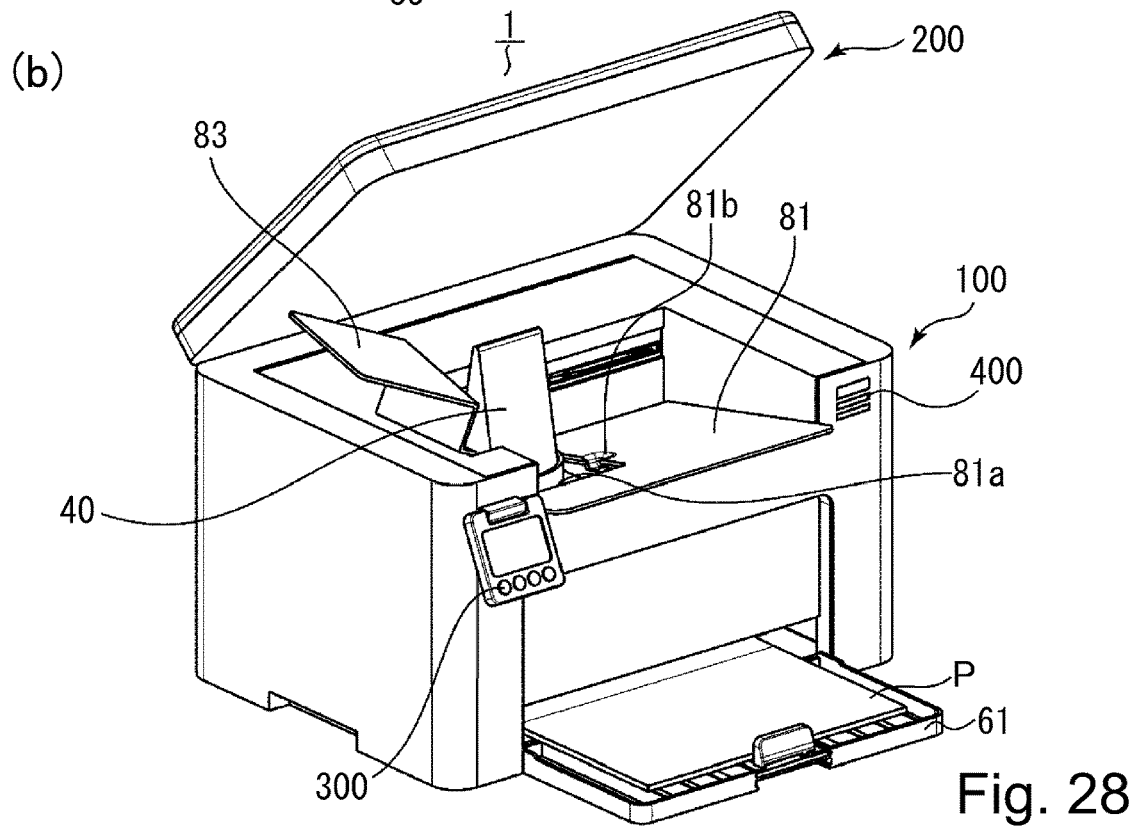
Fig. 28

(a)
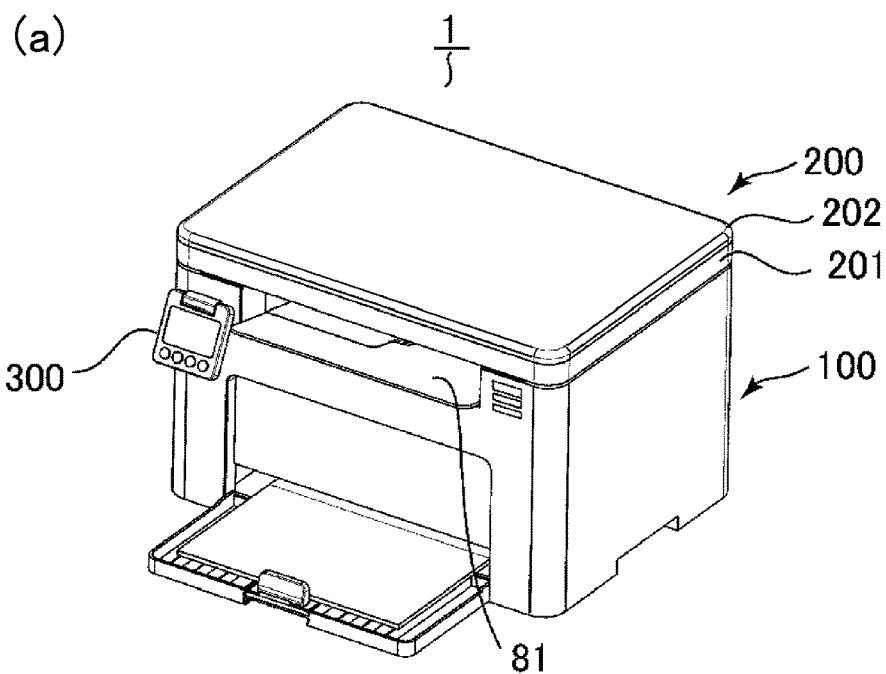
(b)
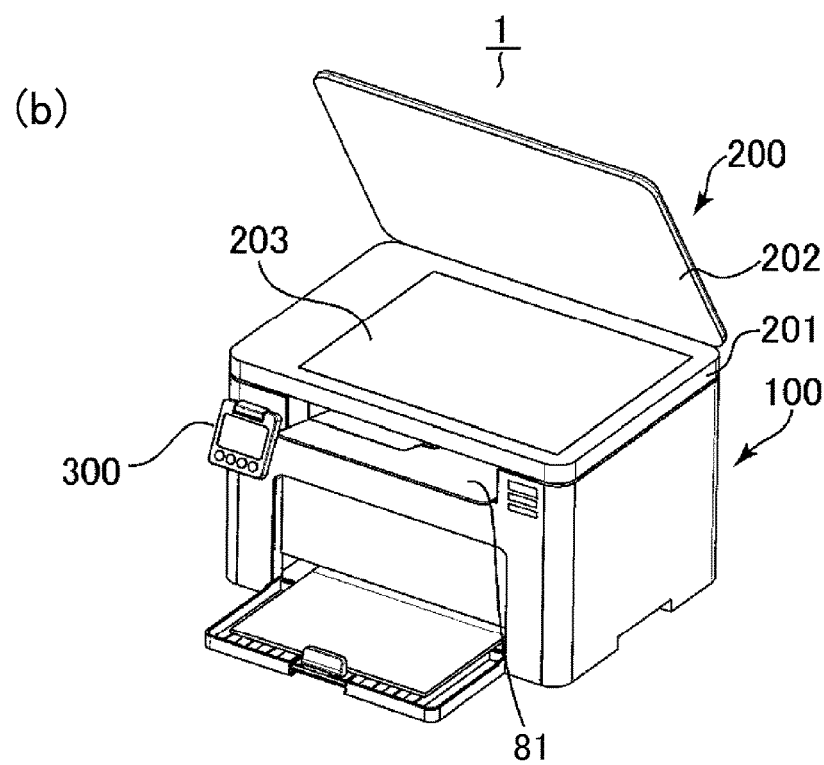
Fig. 30

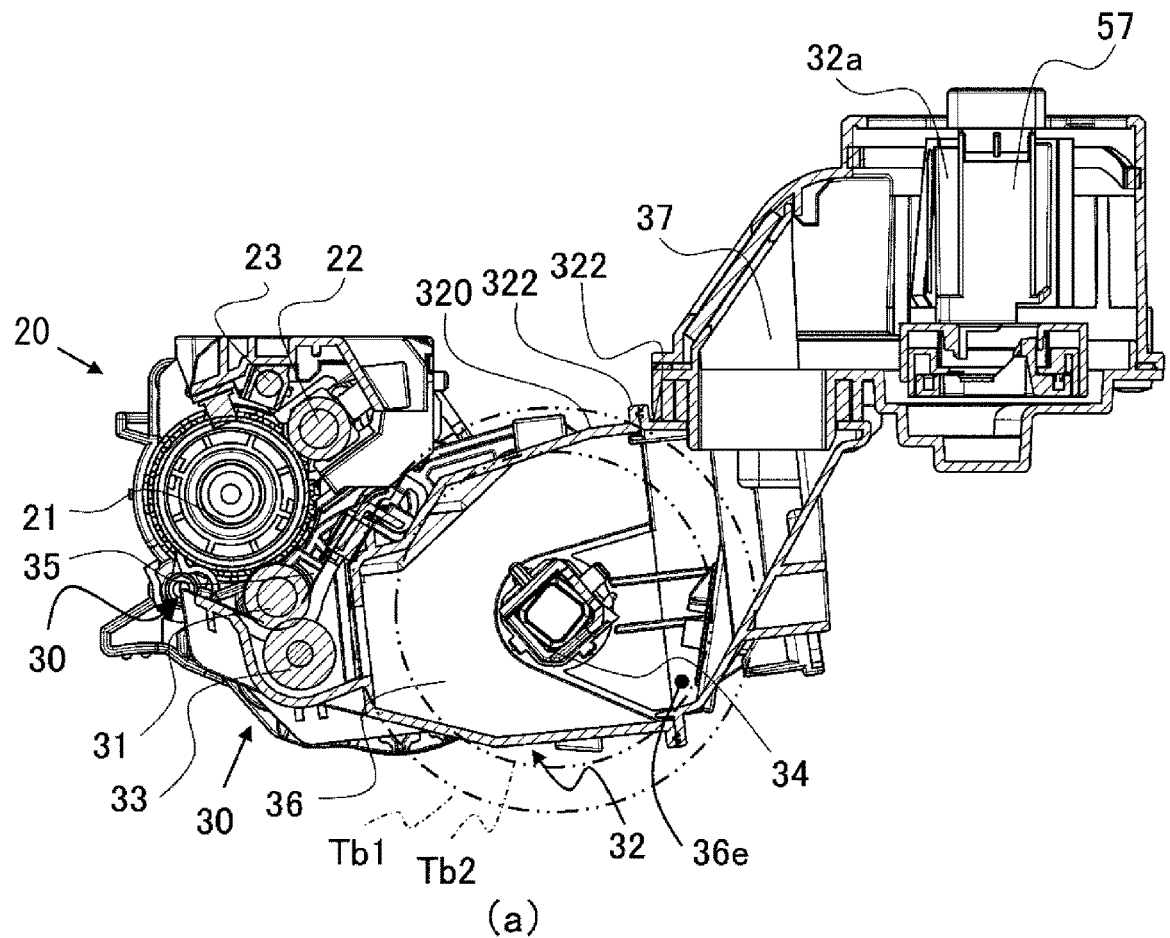
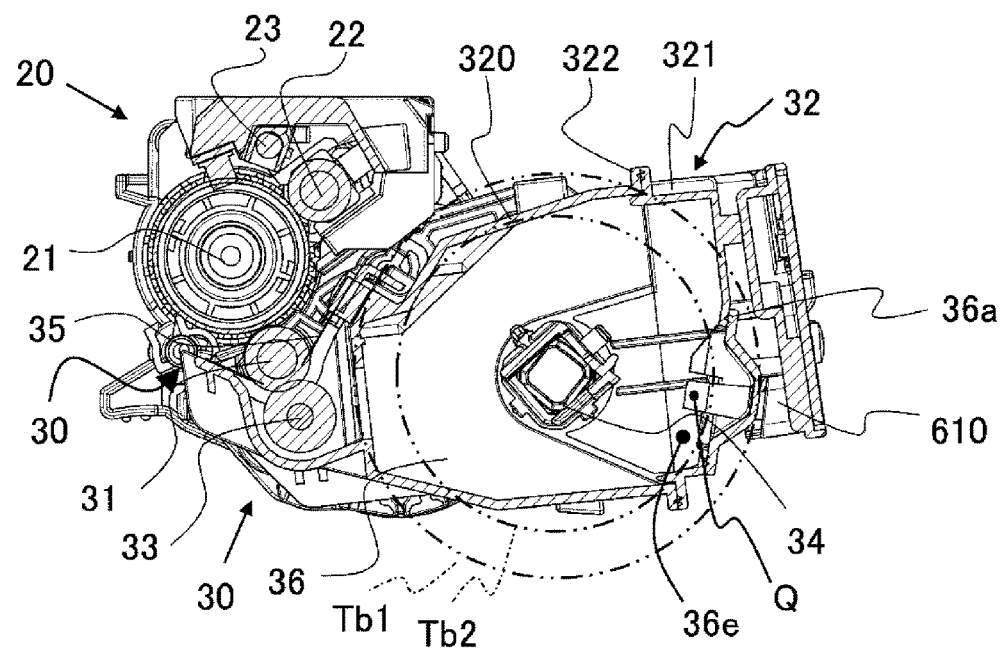
Fig. 32

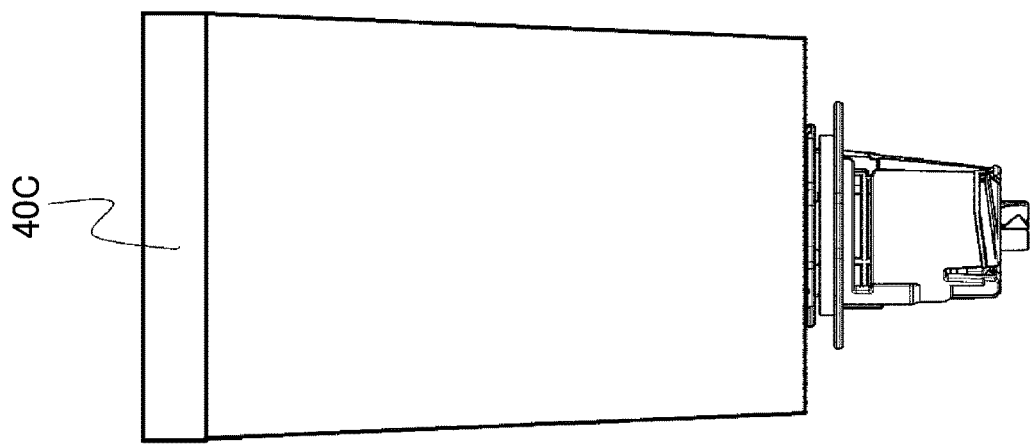
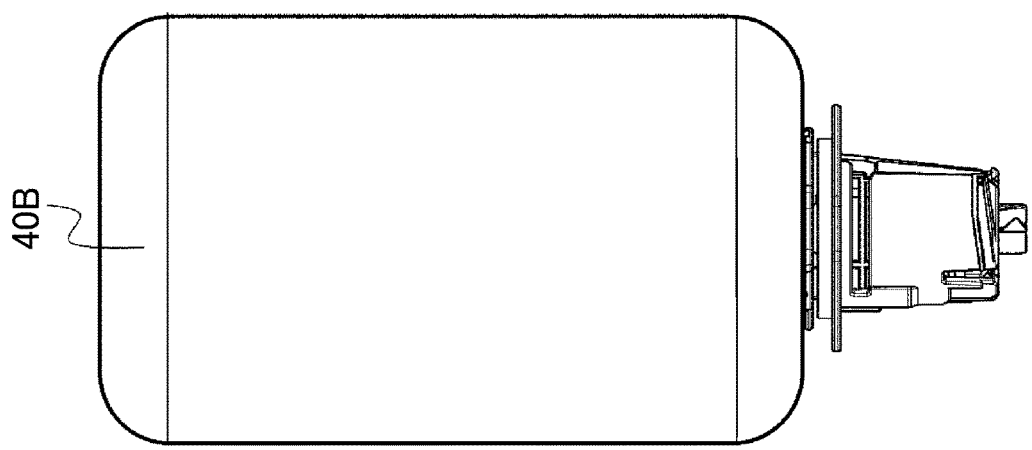
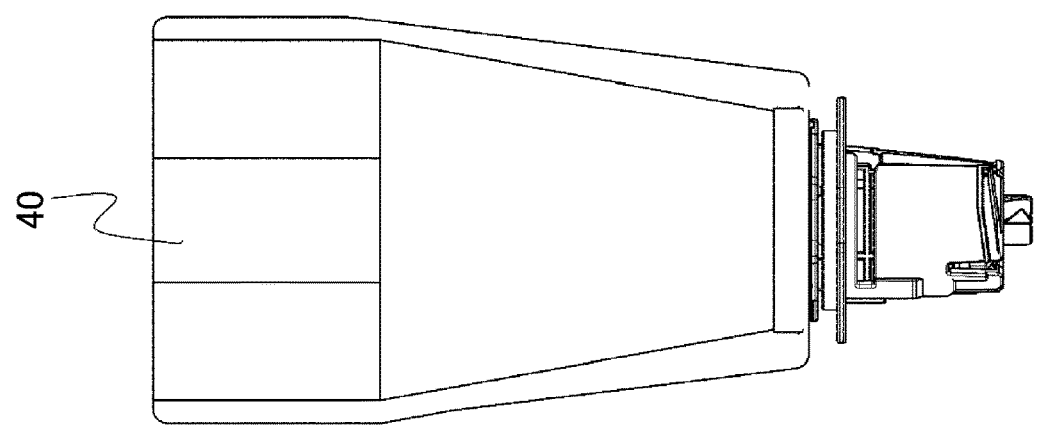
Fig. 34

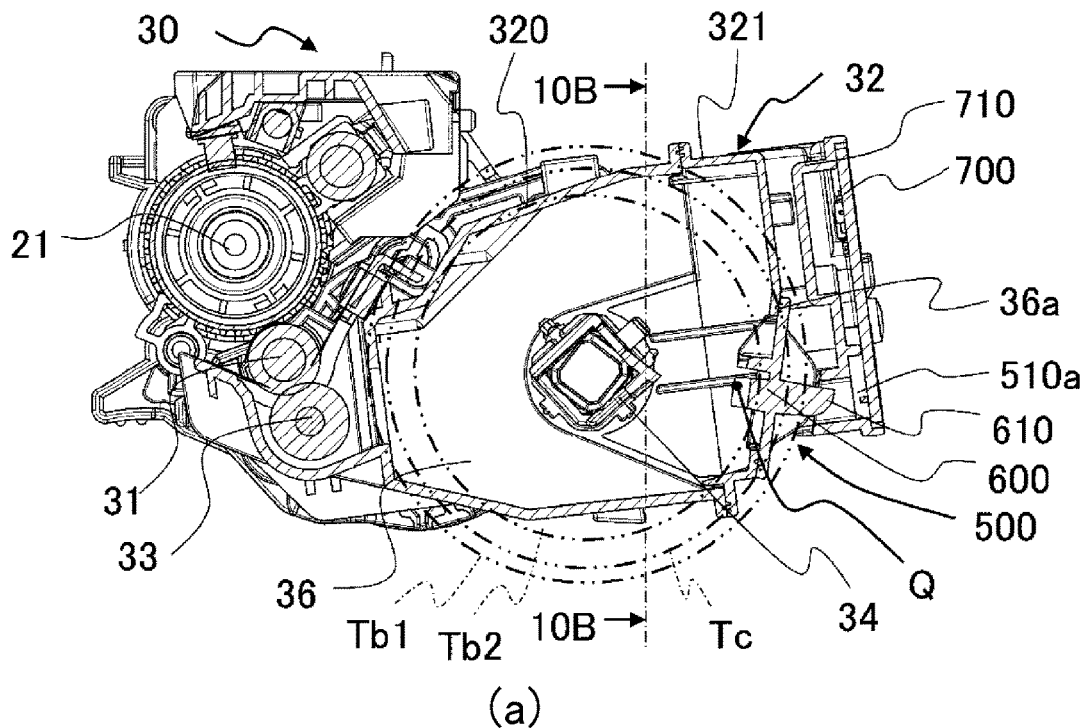
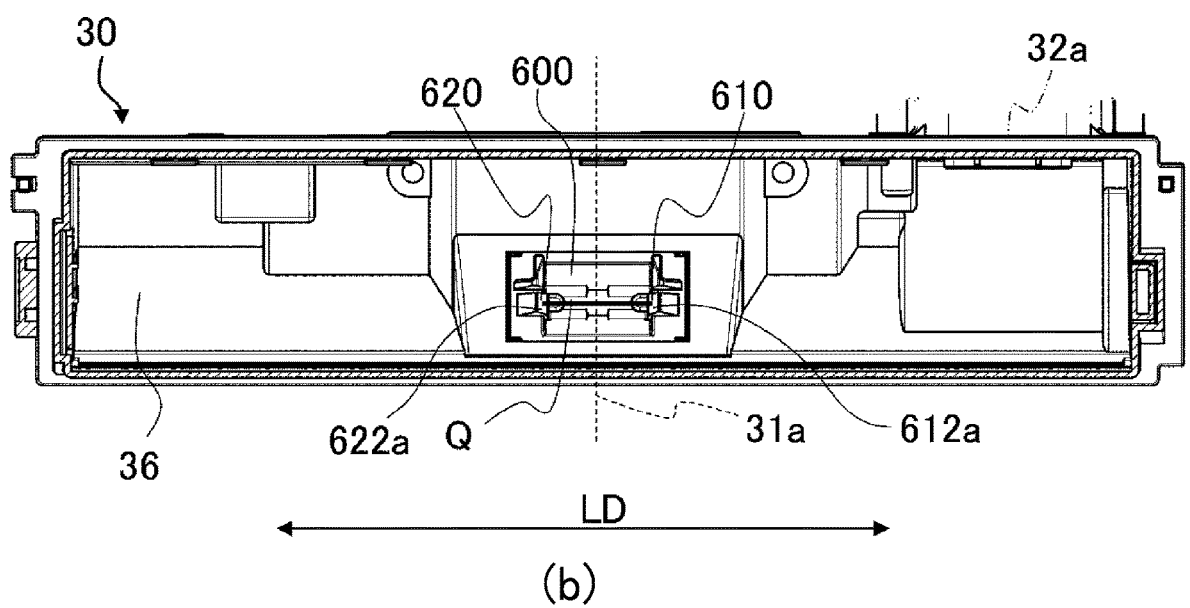
Fig. 37

(a)
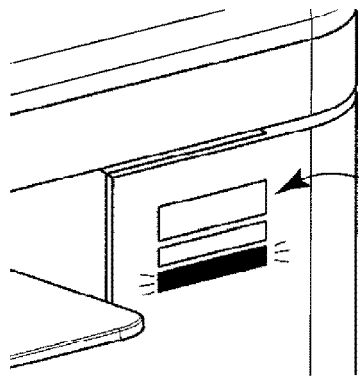
NearOut
(b)
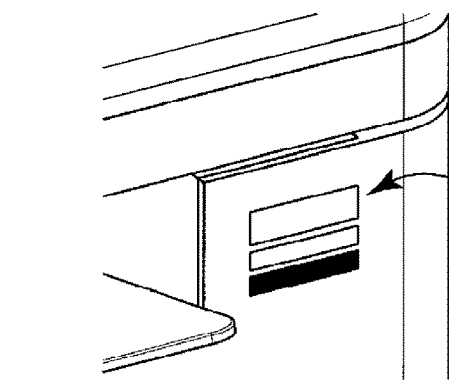
Low
(c)
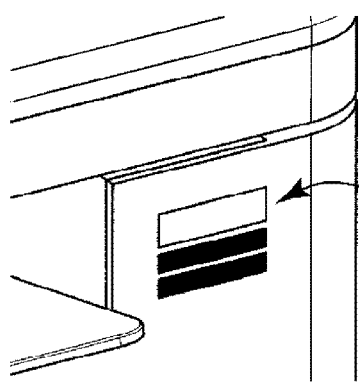
Mid
(d)
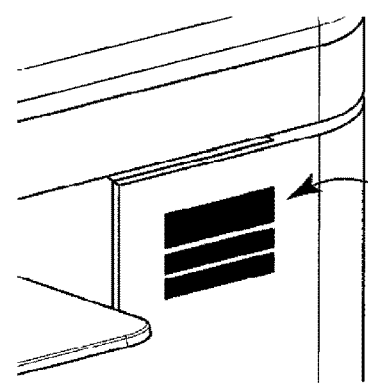
Full
Fig. 40

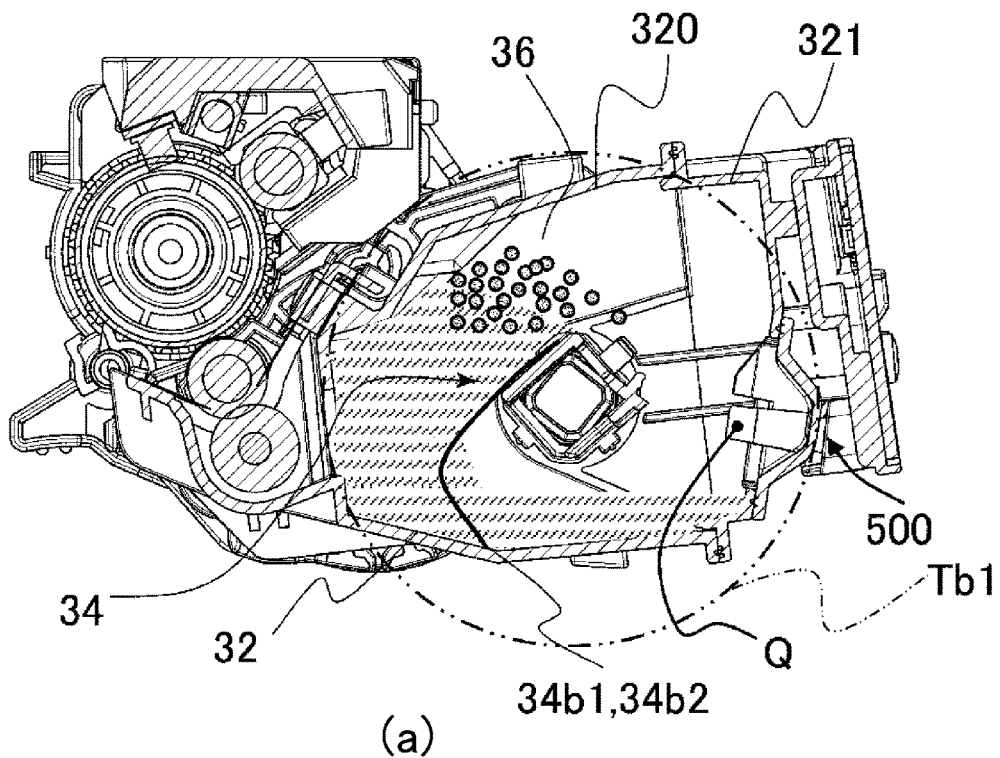
(a)
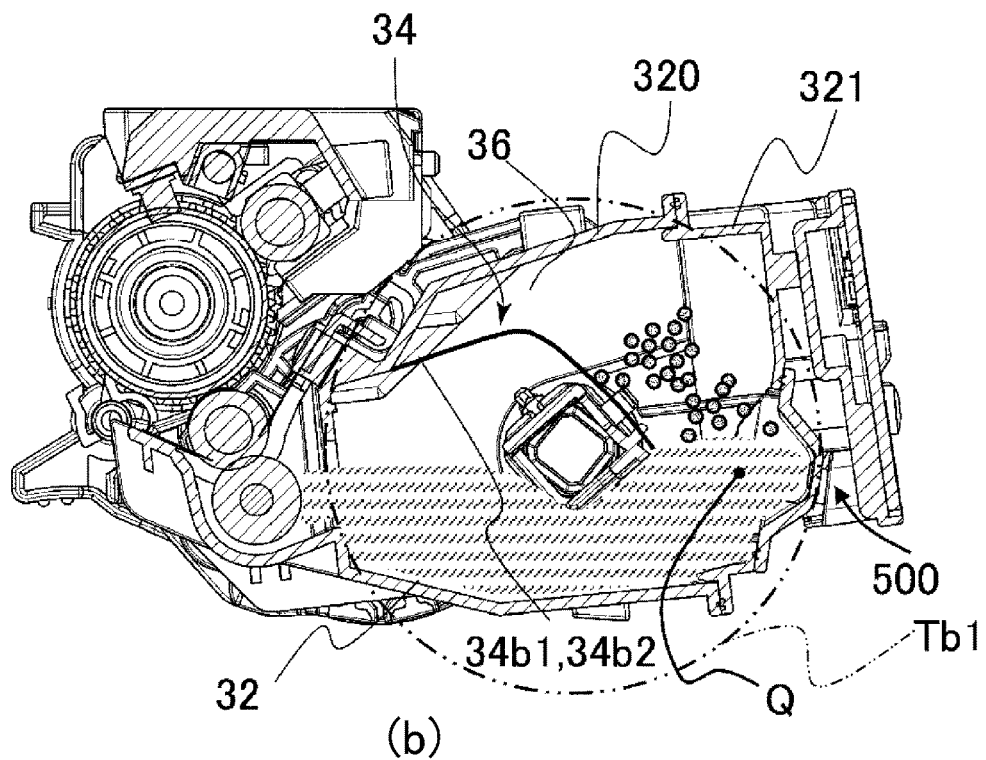
(b)
Fig. 41

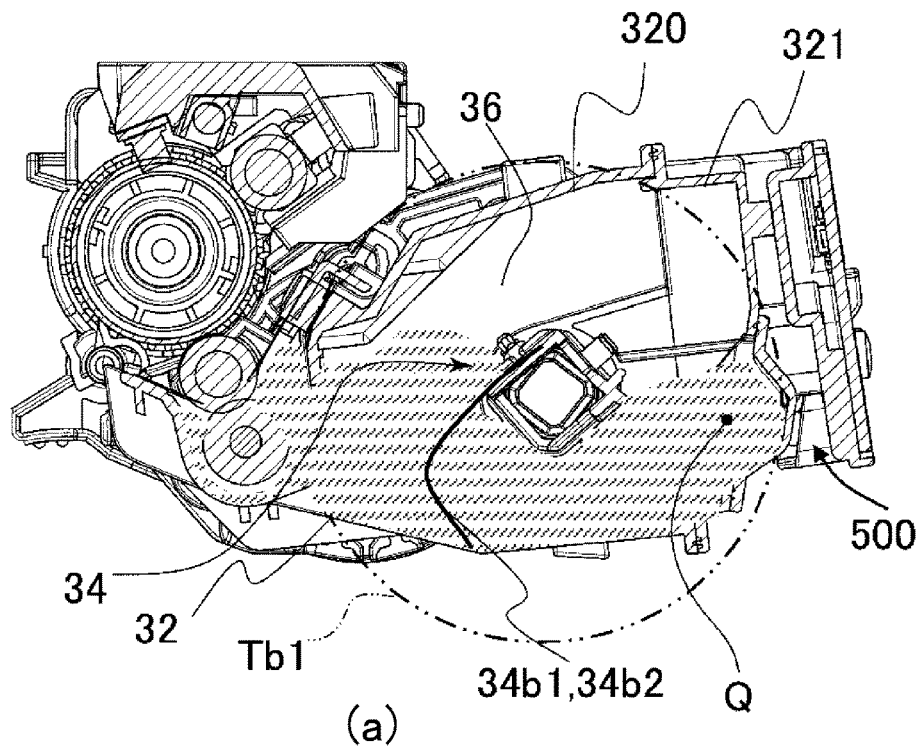
(a)
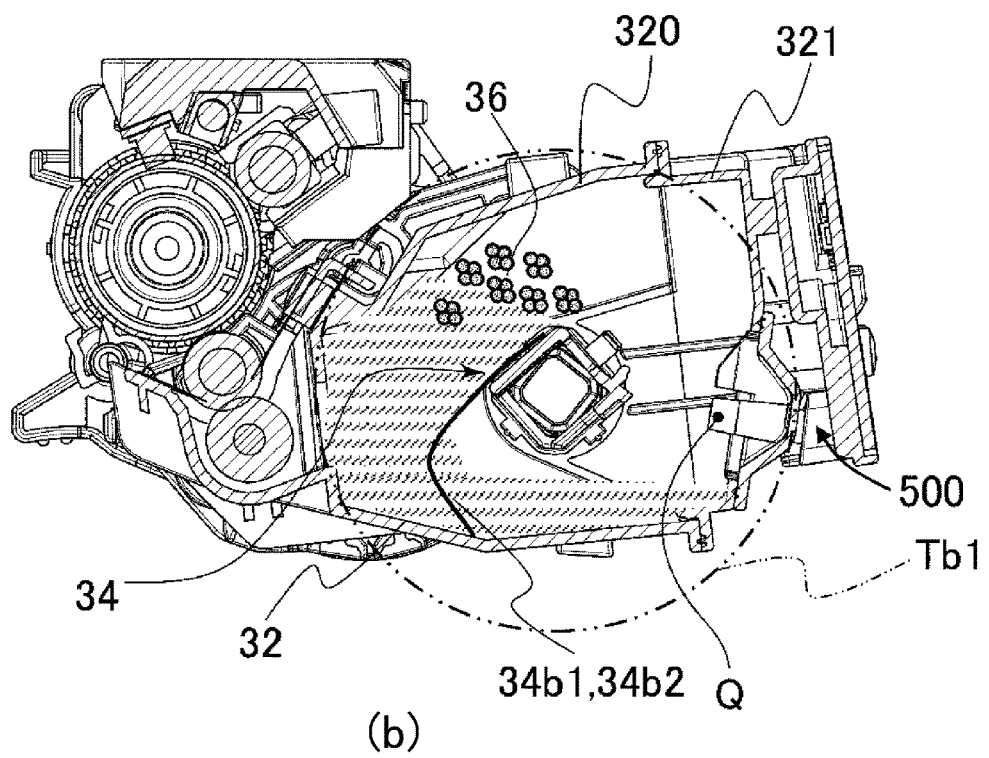
(b)
Fig. 42

IMAGE FORMING APPARATUS WITH SUPPRESSION OF LIGHT QUALITY ATTENUATION

FIELD OF THE INVENTION AND RELATED ART

The present invention relates to an image forming apparatus for forming an image on a recording material.

The image forming apparatus of an electrophotographic type is provided with a developing device for developing an electrostatic image with a developer containing toner into a toner image on a surface of an image bearing member such as a photosensitive drum. As a method of detecting a remaining amount (remaining toner amount) of the developer in the developing device, a remaining amount detecting method of a light transmission type using light has been known.

In Japanese Laid-Open Patent Application (JP-A) 2014-066899, a remaining amount detecting constitution provided with a light emitting-side light guiding portion and a light receiving-side light guiding portion which penetrate through a container of a developing device from an inside to an outside of the container has been disclosed. In this constitution, light emitted by a light emitting element is incident on the light emitting-side light guiding portion on the outside of the container and passes from the light emitting-side light guiding portion through an inside space of the container. Then, the light is incident on the light receiving-side light guiding portion and then is emitted from the light receiving-side light guiding portion on the outside of the container. Then, the light is received by a light receiving element.

However, in JP-A 2014-066899, the light emitting-side light guiding portion and the light receiving-side light guiding portion were projected to the inside of the container of the developing device. For that reason, aggregate of the developer grows with deposition of the developer in projected portions of the light emitting-side light guiding portion and the light receiving-side light guiding portion as a trigger, so that there was a possibility that the developer was deposited on surfaces of the light emitting-side light guiding portion and the light receiving-side light guiding portion which form an optical path therebetween and blocks the optical path, and thus detection accuracy of the developer amount lowered.

SUMMARY OF THE INVENTION

According to an aspect of the present invention, there is provided an image forming apparatus comprising: a container configured to accommodate a developer; and detecting means configured to output an output signal depending on an amount of the developer in the container, wherein the detecting means includes a light emitting element and a light receiving element which are provided outside the container, and light guiding means provided on a wall surface of the container and configured to guide light, emitted by the light emitting element, toward the light receiving element through an inside space of the container, wherein the light guiding means includes: a first projected portion projected to an outside of the container relative to the wall surface and having an incident surface on which the light emitted by the light emitting element is incident and which is provided at an end portion of the first projected portion with respect to a first direction in which the first projected portion is projected relative to the wall surface; a second projected portion projected to an inside of the container relative to the wall surface and configured to emit the light, incident on the first projected portion, to the inside space of the container, wherein an upper surface of the second projected portion is positioned above a first virtual rectilinear line along an upper surface of the first projected portion as viewed in a direction crossing both the first direction and a direction of gravitation, a third projected portion projected to the inside of the container relative to the wall surface and on which the light emitted to the inside space of the container is incident; and a fourth projected portion projected to the outside of the container relative to the wall surface and having a light emergent surface from which the light incident on the third projected portion is emitted toward the light receiving portion and which is provided on an end portion of the fourth projected portion with respect to a second direction in which the fourth projected portion is projected relative to the wall surface, and wherein an upper surface of the third projected portion is positioned above a second virtual rectilinear line along an upper surface of the fourth projected portion in a case where the upper surface of the third projected portion is viewed in a direction crossing the second direction and the direction of gravitation.

Further features of the present invention will become apparent from the following description of exemplary embodiments with reference to the attached drawings.

BRIEF DESCRIPTION OF THE DRAWINGS

Parts (a) and (b) of FIG. 1 are a sectional view and a perspective view, respectively, of an image forming apparatus according to a first embodiment.

Parts (a) and (b) of FIG. 2 are a sectional view and a perspective view, respectively, of the image forming apparatus of the first embodiment.

Parts (a) and (b) of FIG. 3 are perspective views of the image forming apparatus of the first embodiment.

Part (a) of FIG. 4 is a perspective view of a developing container and a toner pack in the first embodiment, part (b) of FIG. 4 is a front view of the developing container and the toner pack in the first embodiment, and part (c) of FIG. 4 is a perspective view of a stirring member in the first embodiment.

Part (a) of FIG. 5 is a sectional view in a 5A-5A cross section of part (b) of FIG. 4, and part (b) of FIG. 5 is a sectional view in a 5B-5B cross section of part (b) of FIG. 4.

Figure 6:
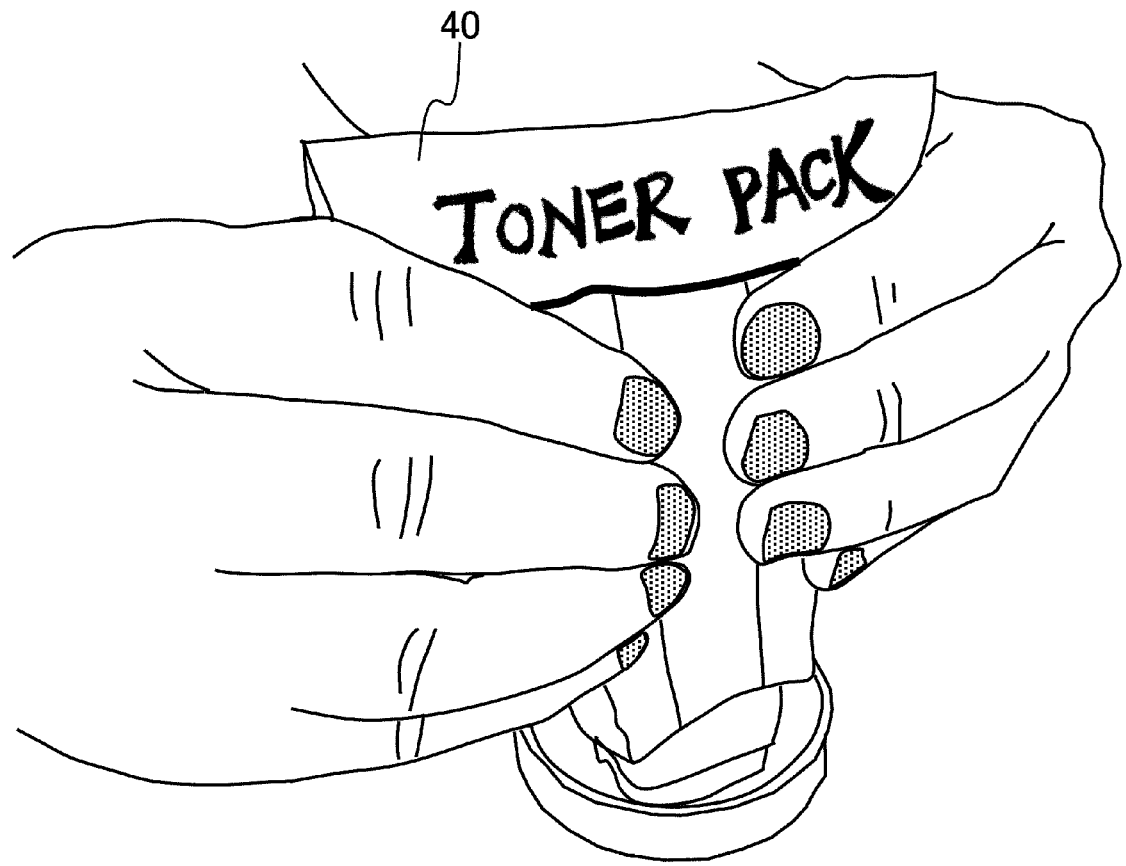

FIG. 6 is a perspective view showing the toner pack in the first embodiment.

Figure 7:
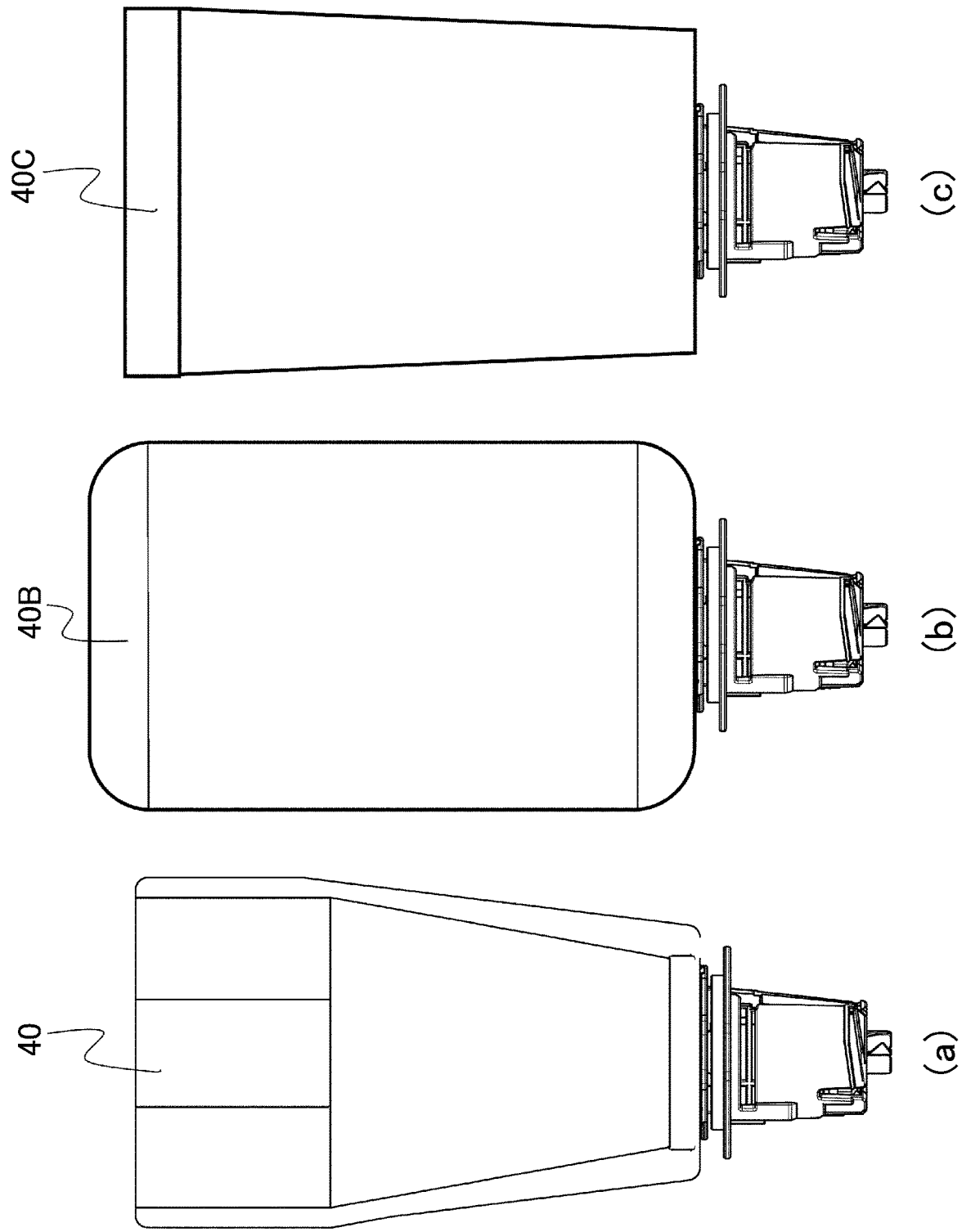

Part (a) of FIG. 7 is a schematic view showing the toner pack in the first embodiment, and parts (b) and (c) of FIG. 7 are schematic views each showing a modified example of the toner pack.

Figure 8:
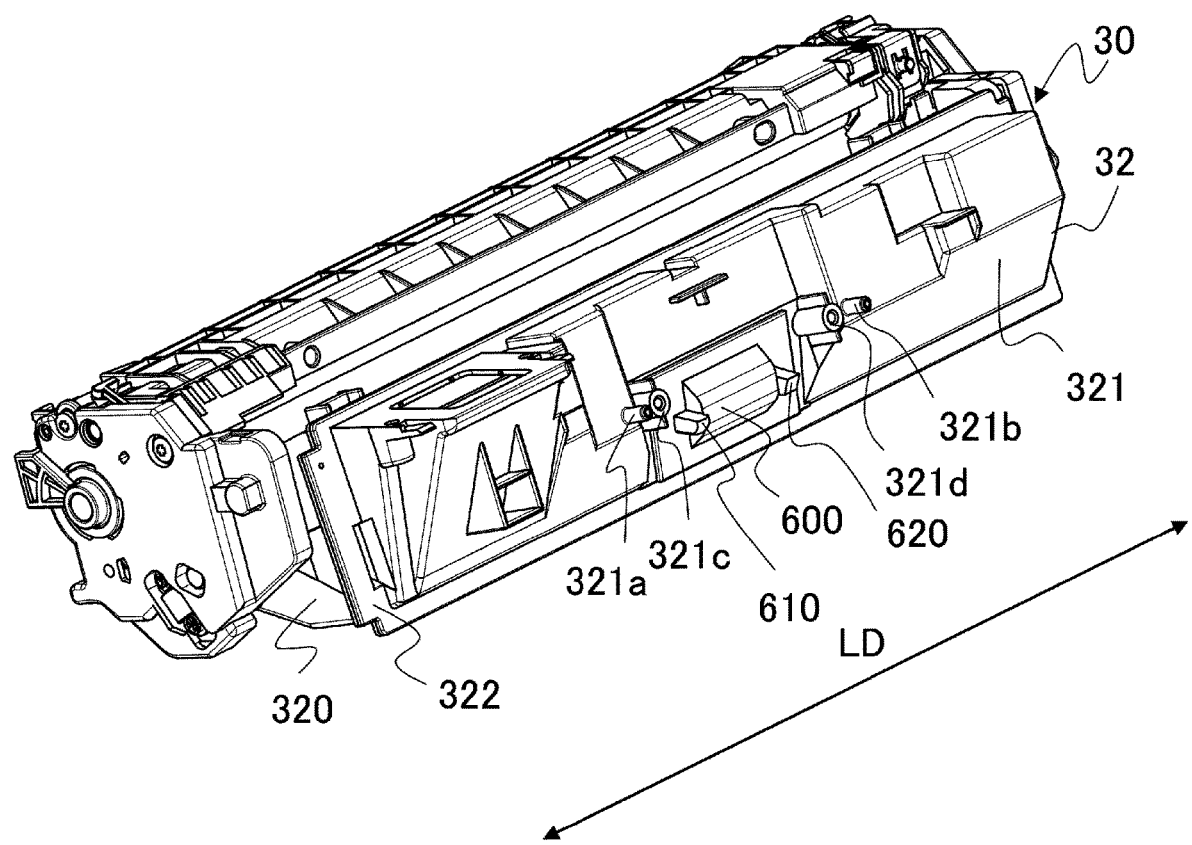

FIG. 8 is a perspective view of a developing device in the first embodiment.

Figure 9:
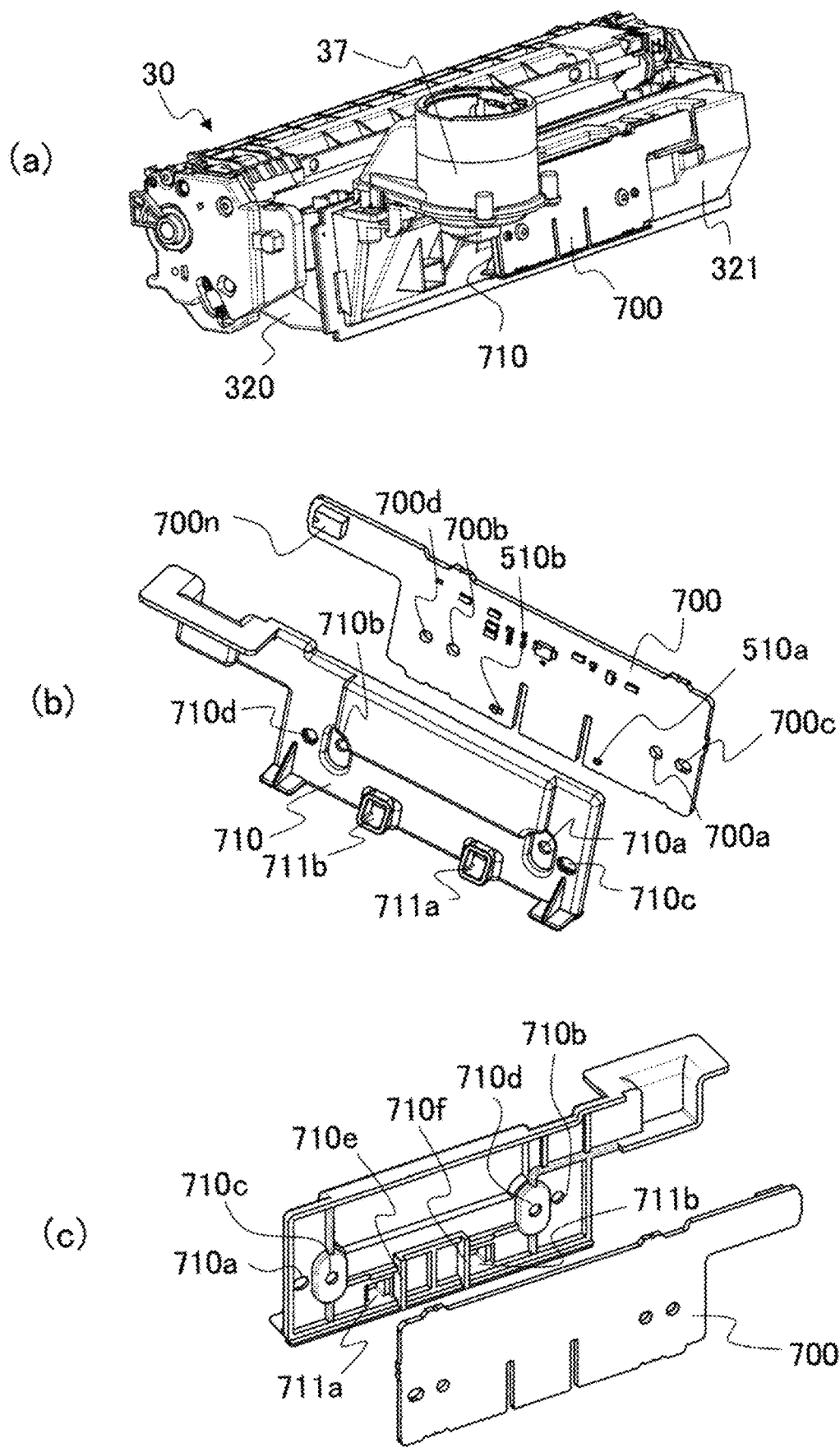

Part (a) of FIG. 9 is a perspective view showing a developing container and a substrate in the first embodiment, and parts (b) and (c) of FIG. 9 are perspective views each showing the substrate and a substrate holding member in the first embodiment.

Part (a) of FIG. 10 is a sectional view of the developing device in a cross section perpendicular to a longitudinal direction of the developing device in the first embodiment, and part (b) of FIG. 10 is a sectional view of the developing device in a cross section along the longitudinal direction in the first embodiment.

Figure 11:
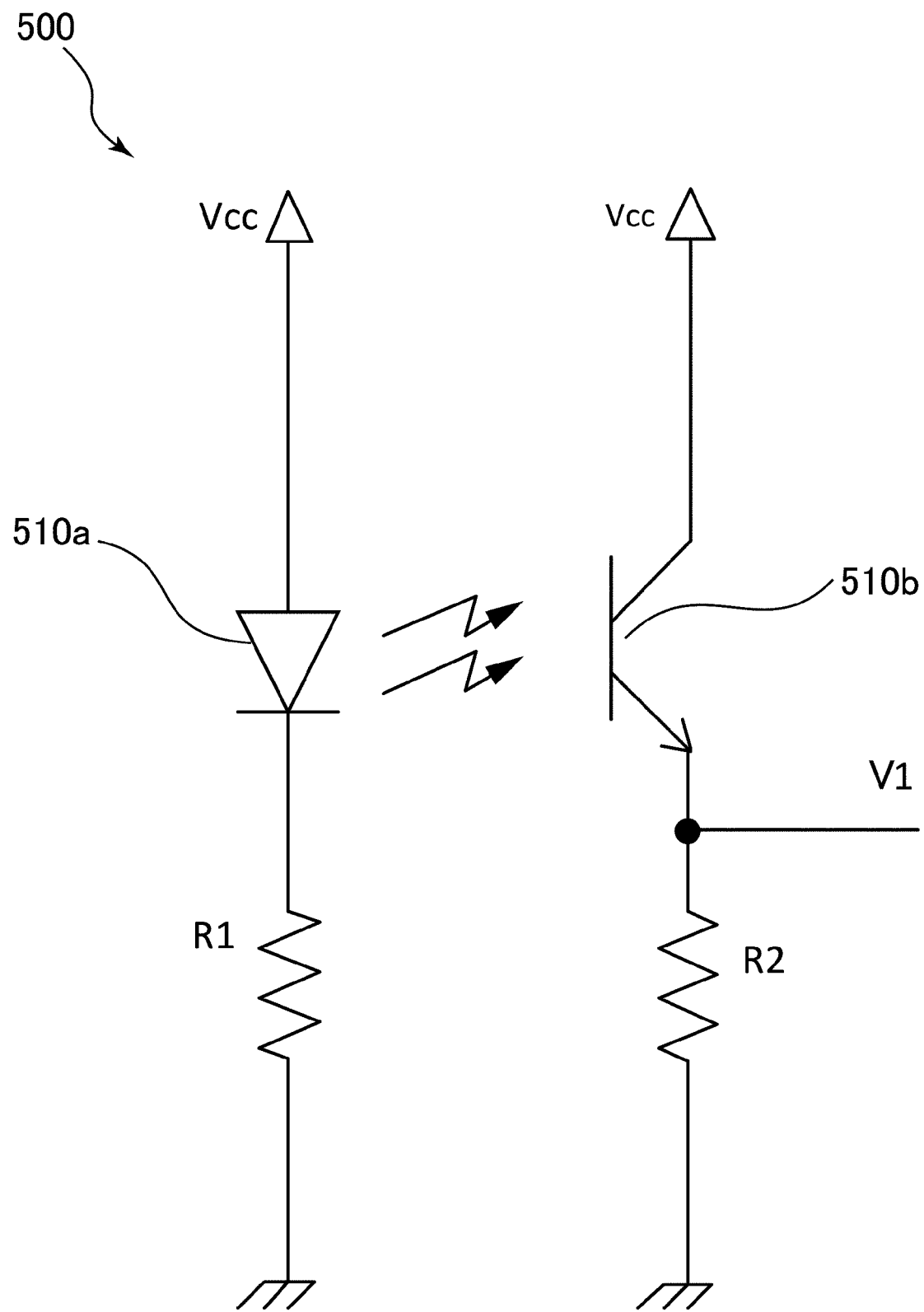

FIG. 11 is a circuit diagram showing a basic constitution of a remaining toner amount sensor in the first embodiment.

Parts (a) and (b) of FIG. 12 are sectional views each showing the developing container in the first embodiment.

Figure 13:
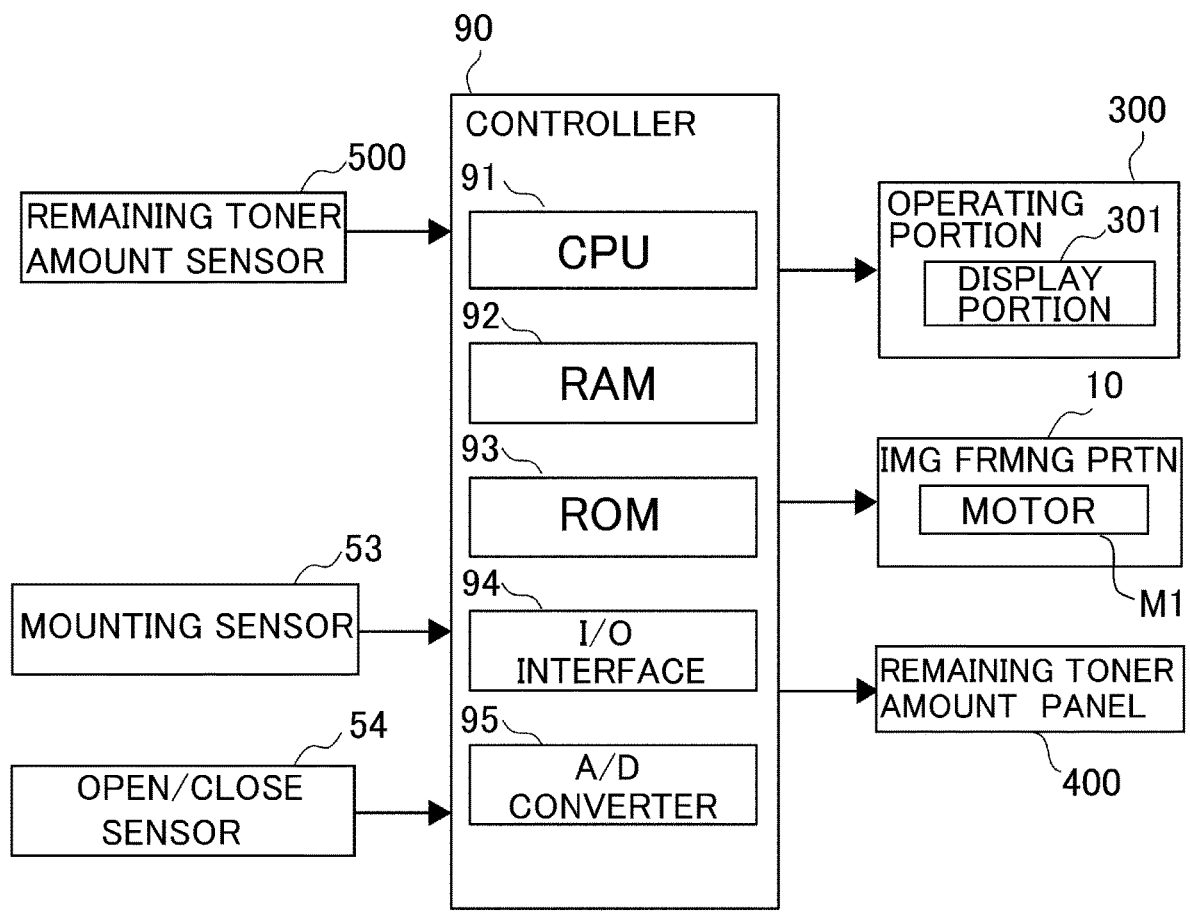

FIG. 13 is a block diagram showing a control system of the image forming apparatus of the first embodiment.

Figure 14:
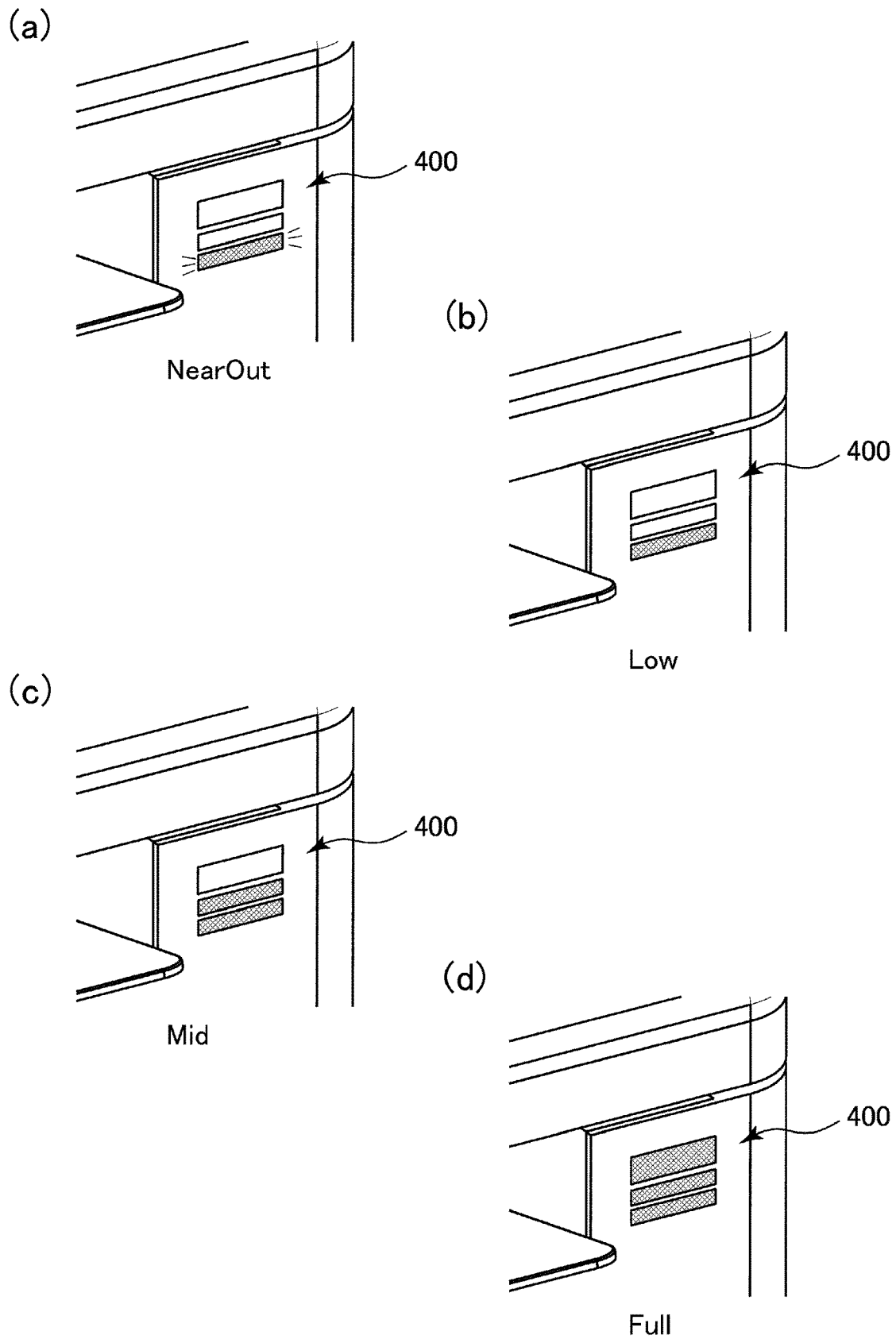

Parts (a) to (d) of FIG. 14 are perspective views each showing a remaining toner amount panel in the first embodiment.

Parts (a) and (b) of FIG. 15 are perspective views each showing a light guiding member in the first embodiment.

Figure 16:
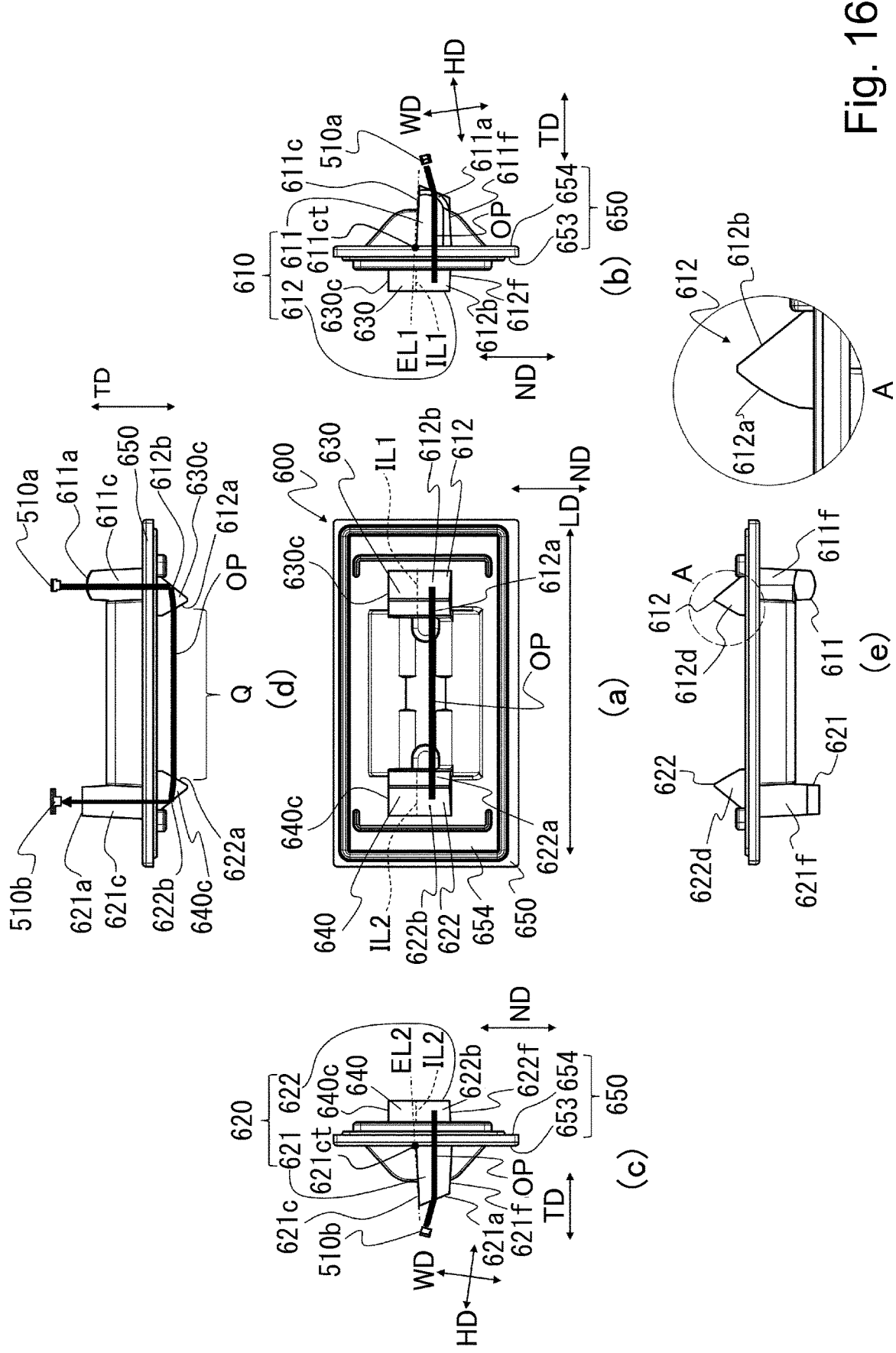

Part (a) of FIG. 16 is a front view of the light guiding member in the first embodiment, parts (b) and (c) of FIG. 16 are side views each showing the light guiding member in the first embodiment, part (b) of FIG. 16 is a (top) plan view of the light guiding member in the first embodiment, and part (e) of FIG. 16 includes a bottom view and an enlarged view of the light guiding member in the first embodiment.

Parts (a) and (b) of FIG. 17 are perspective views each showing a developing container lid (cover) and the light guiding member in the first embodiment.

Figure 18:
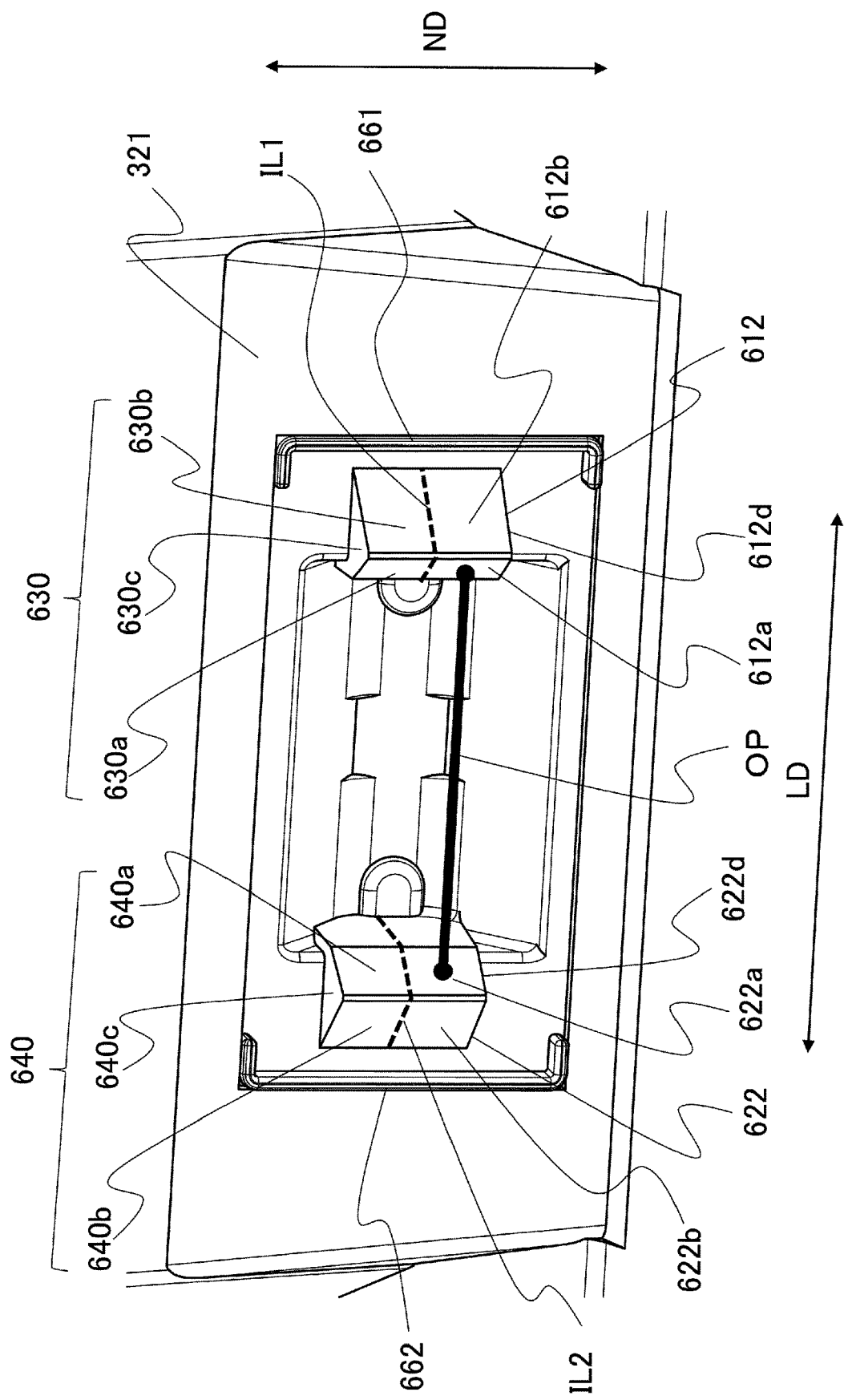

FIG. 18 is a perspective view of the light guiding member in the first embodiment.

Figure 19:
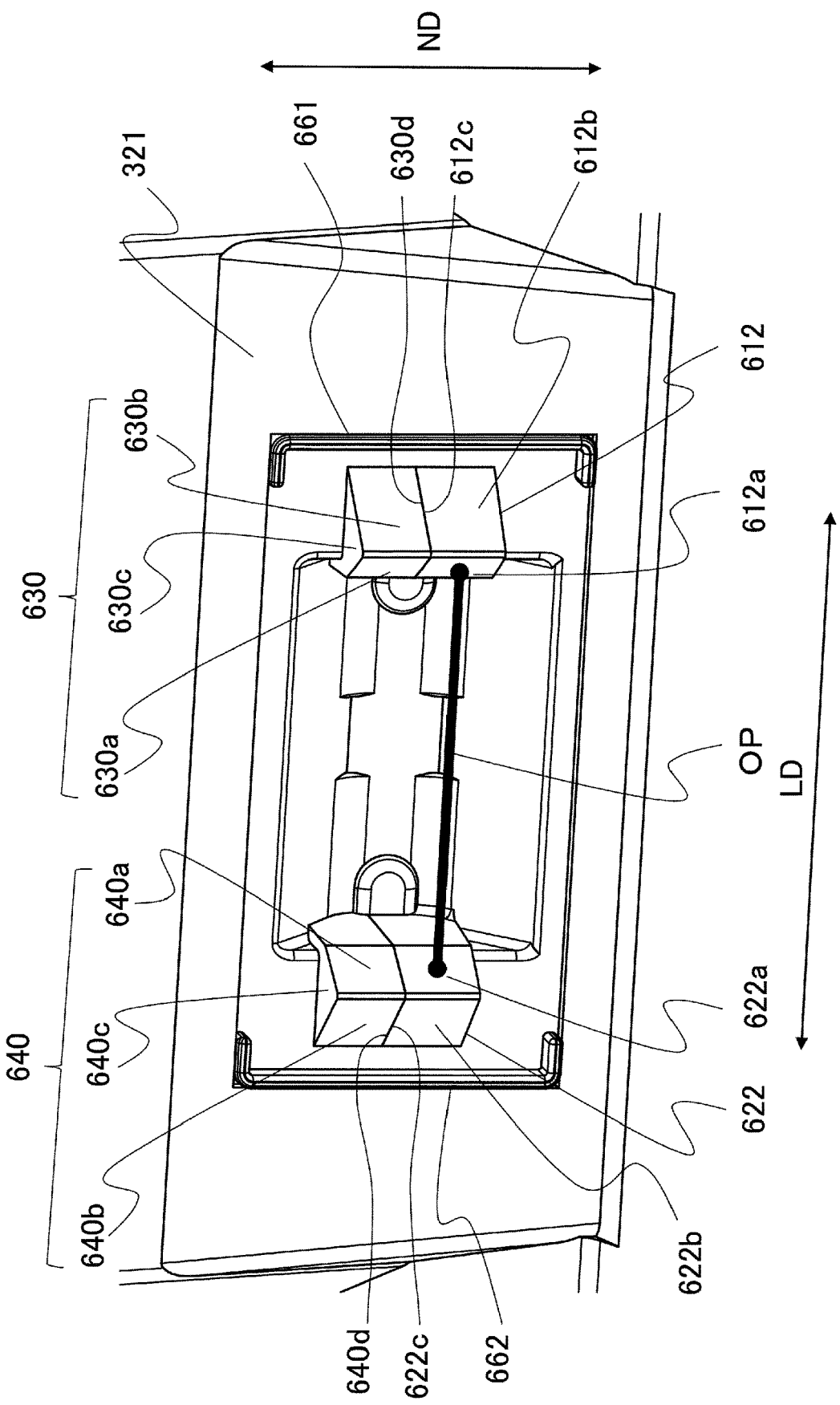

FIG. 19 is a perspective view of a light guiding member in a modified embodiment of the first embodiment.

Figure 20:
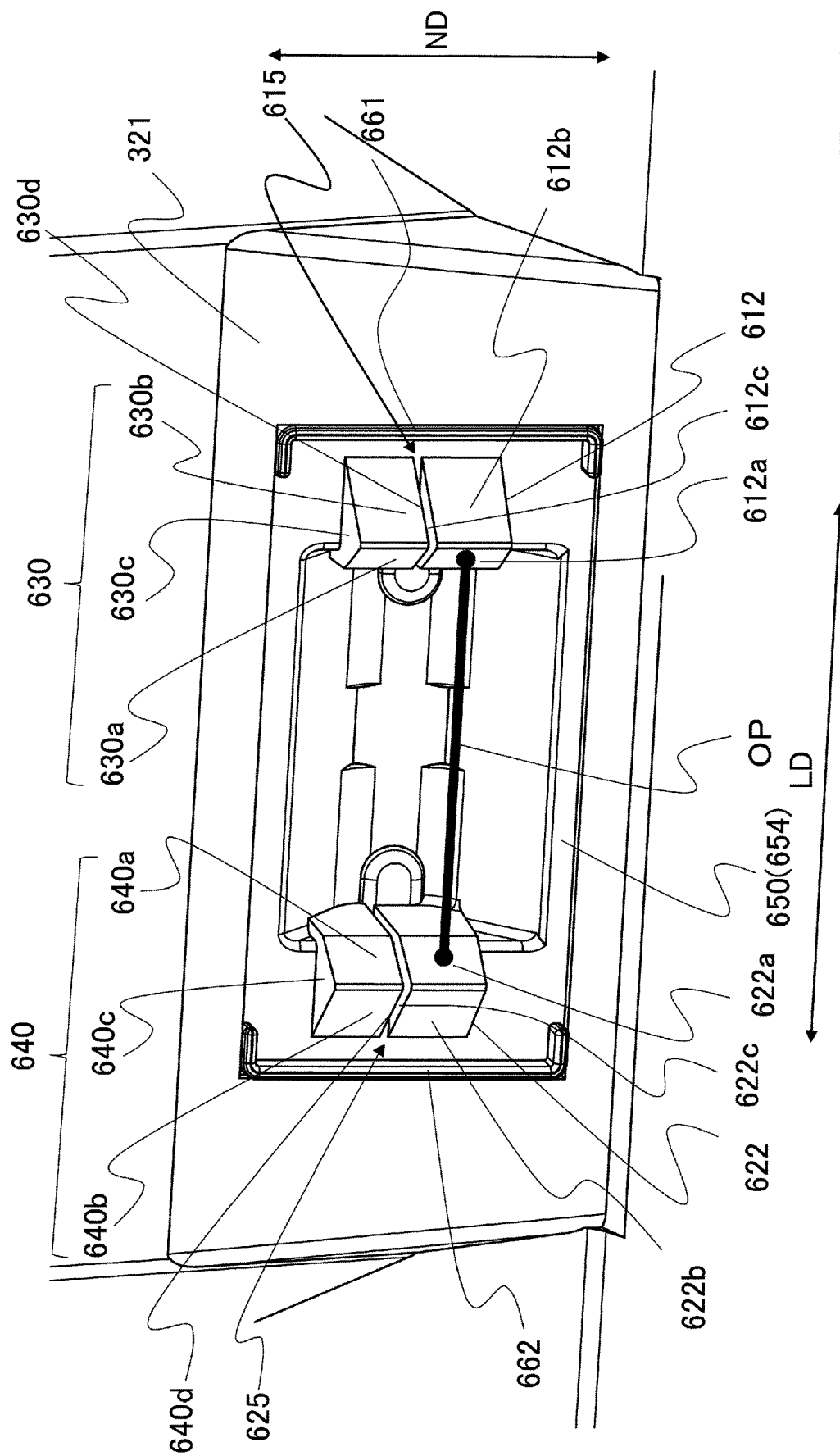

FIG. 20 is a perspective view of a light guiding member in a second embodiment.

Figure 21:
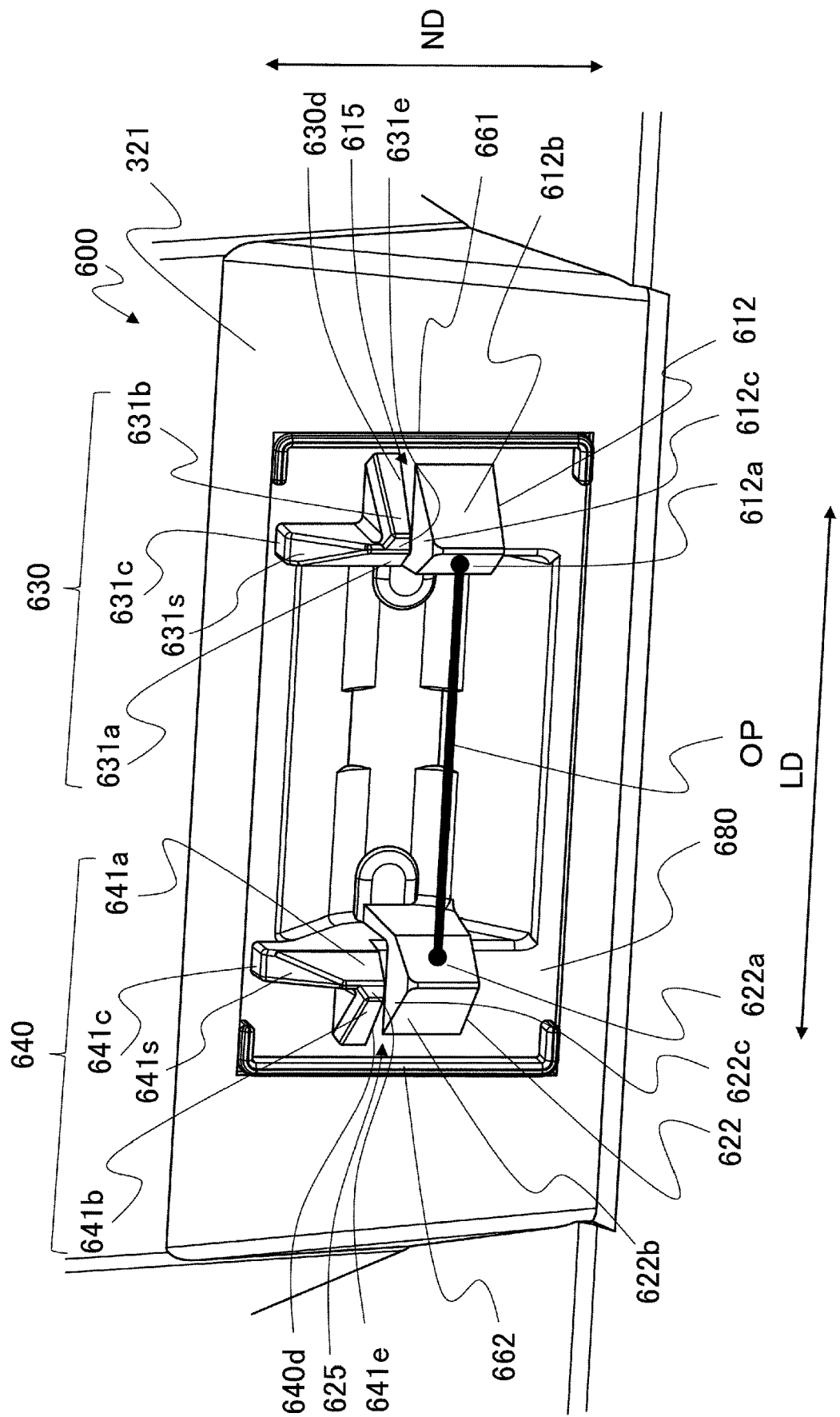

FIG. 21 is a perspective view of a light guiding member in a third embodiment.

Figure 22:
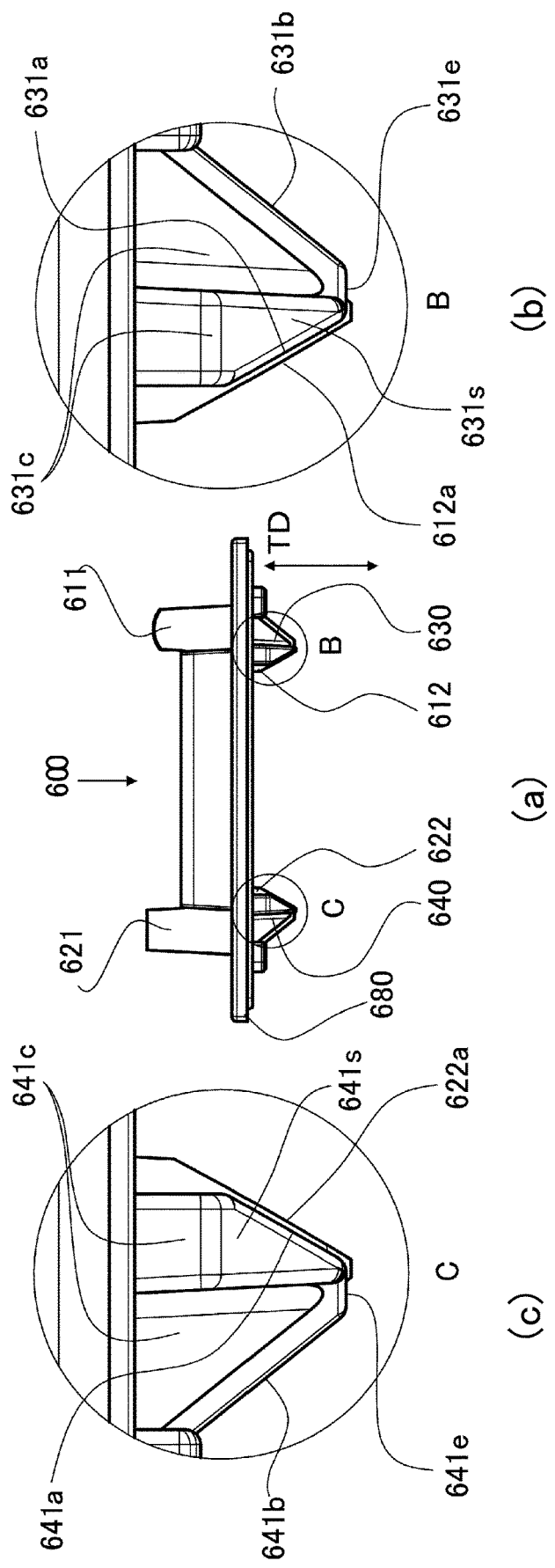

Part (a) of FIG. 22 is a plan view of the light guiding member in the third embodiment, and parts (b) and (c) of FIG. 22 are enlarged views each showing a part of the light guiding member in an enlarged manner in the third embodiment.

Part (a) of FIG. 23 is a front view of the light guiding member in the third embodiment, and parts (b) and (c) of FIG. 23 are side views each showing a part of the light guiding member in the third embodiment.

Figure 24:
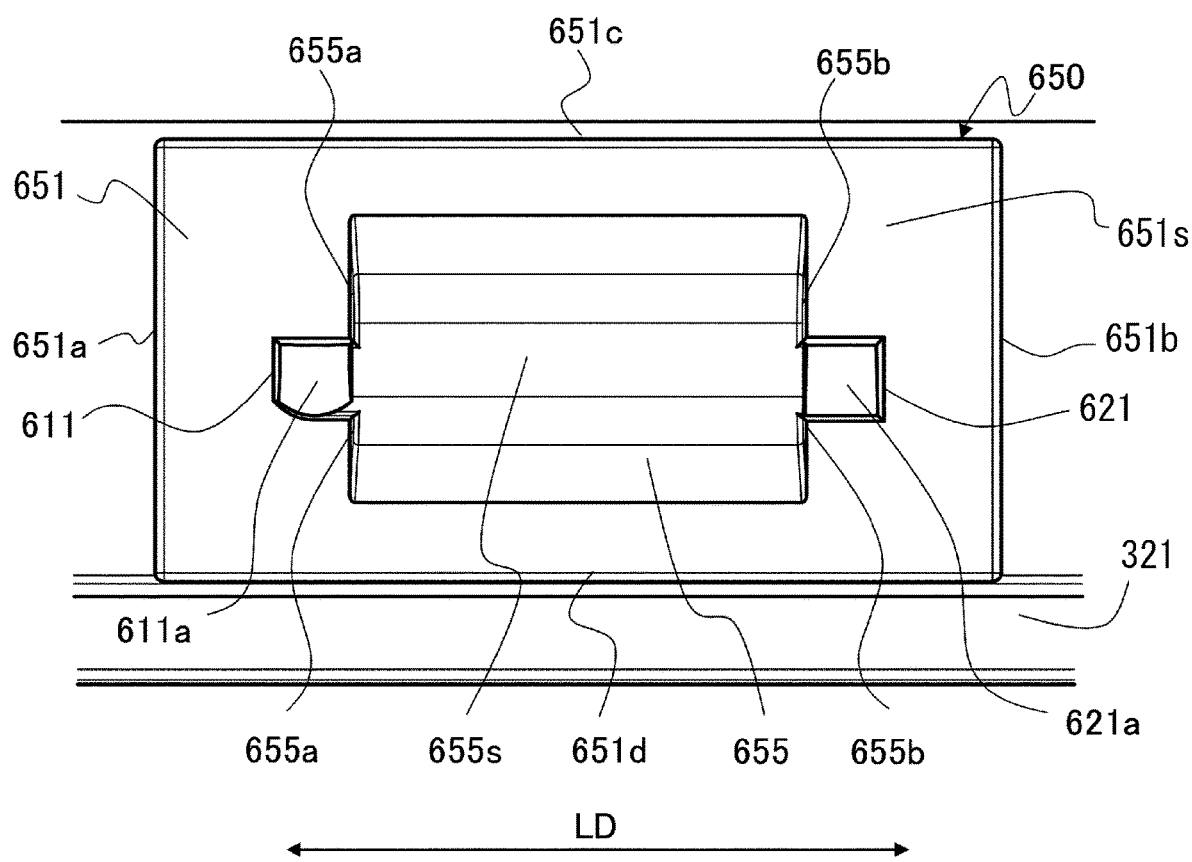

FIG. 24 is a schematic view of a light guiding member viewed from an outside of a developing container in a fourth embodiment.

Parts (a) and (b) of FIG. 25 are perspective views each showing a light guiding member in a fifth embodiment.

Figure 26:
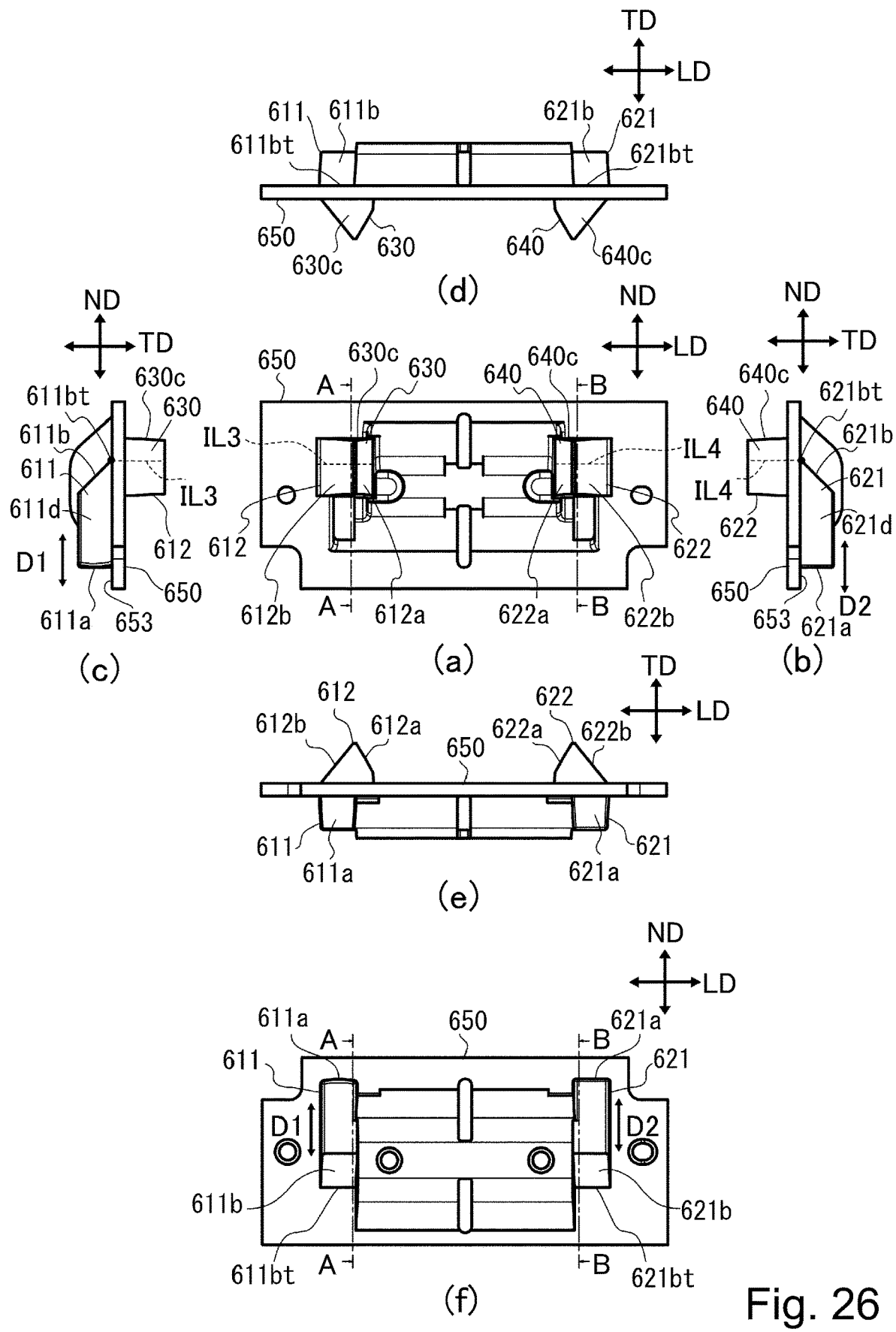

Part (a) of FIG. 26 is a front view of the light guiding member in the fifth embodiment, parts (b) and (c) of FIG. 26 are side views each showing the light guiding member in the fifth embodiment, part (d) of FIG. 26 is a plan view of the light guiding member in the fifth embodiment, part (e) of FIG. 26 is a bottom view of the light guiding member in the fifth embodiment, and part (f) of FIG. 26 is a rear view of the light guiding member in the fifth embodiment.

Figure 27:
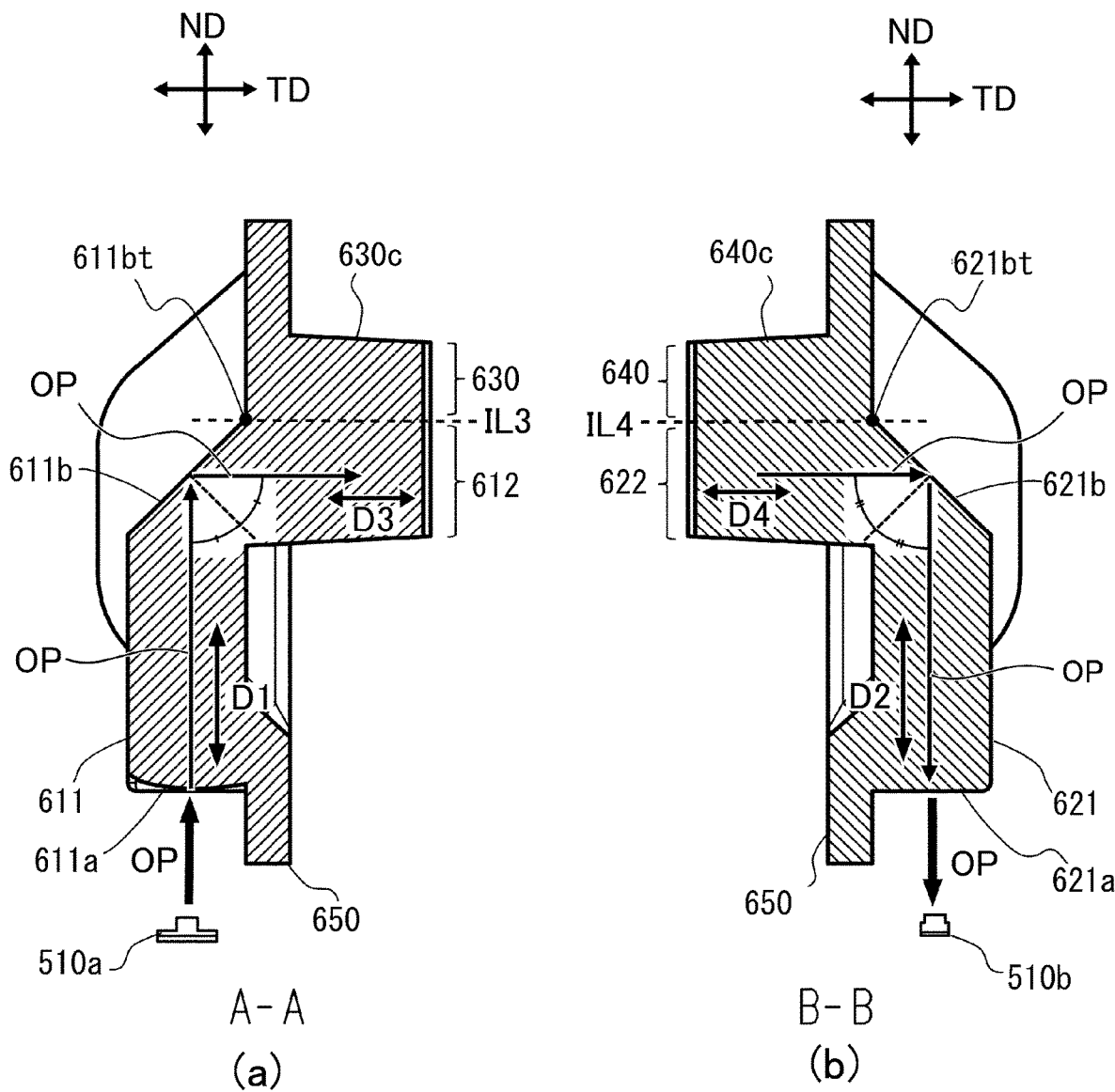

Parts (a) and (b) of FIG. 27 are sectional views in an A-A cross section and a B-B cross section, respectively, of parts (a) and (f) of FIG. 26 in the fifth embodiment.

Part (a) of FIG. 28 is a sectional view showing an image forming apparatus according to a sixth embodiment, and part (b) of FIG. 28 is a perspective view showing the image forming apparatus of the sixth embodiment.

Figure 29:
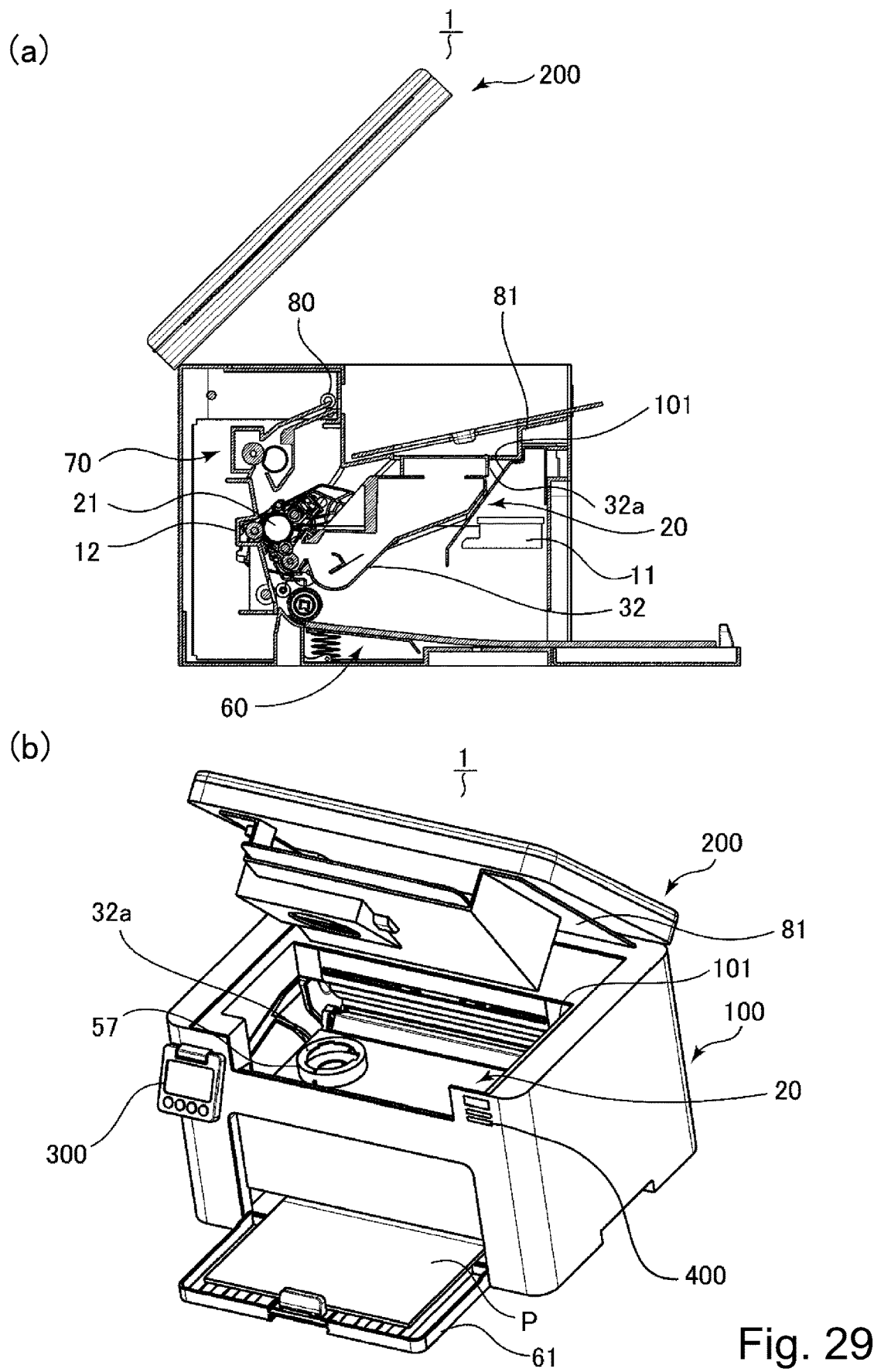

Part (a) of FIG. 29 is a sectional view showing the image forming apparatus, and part (b) of FIG. 29 is a perspective view showing the image forming apparatus in a state in which a discharge tray is open.

Part (a) of FIG. 30 is a perspective view showing the image forming apparatus in a state in which a pressure plate of a reading device (apparatus) is closed, and part (b) of FIG. 30 is a perspective view showing the image forming apparatus in a state in which the pressure plate of the reading device is open.

Figure 31:
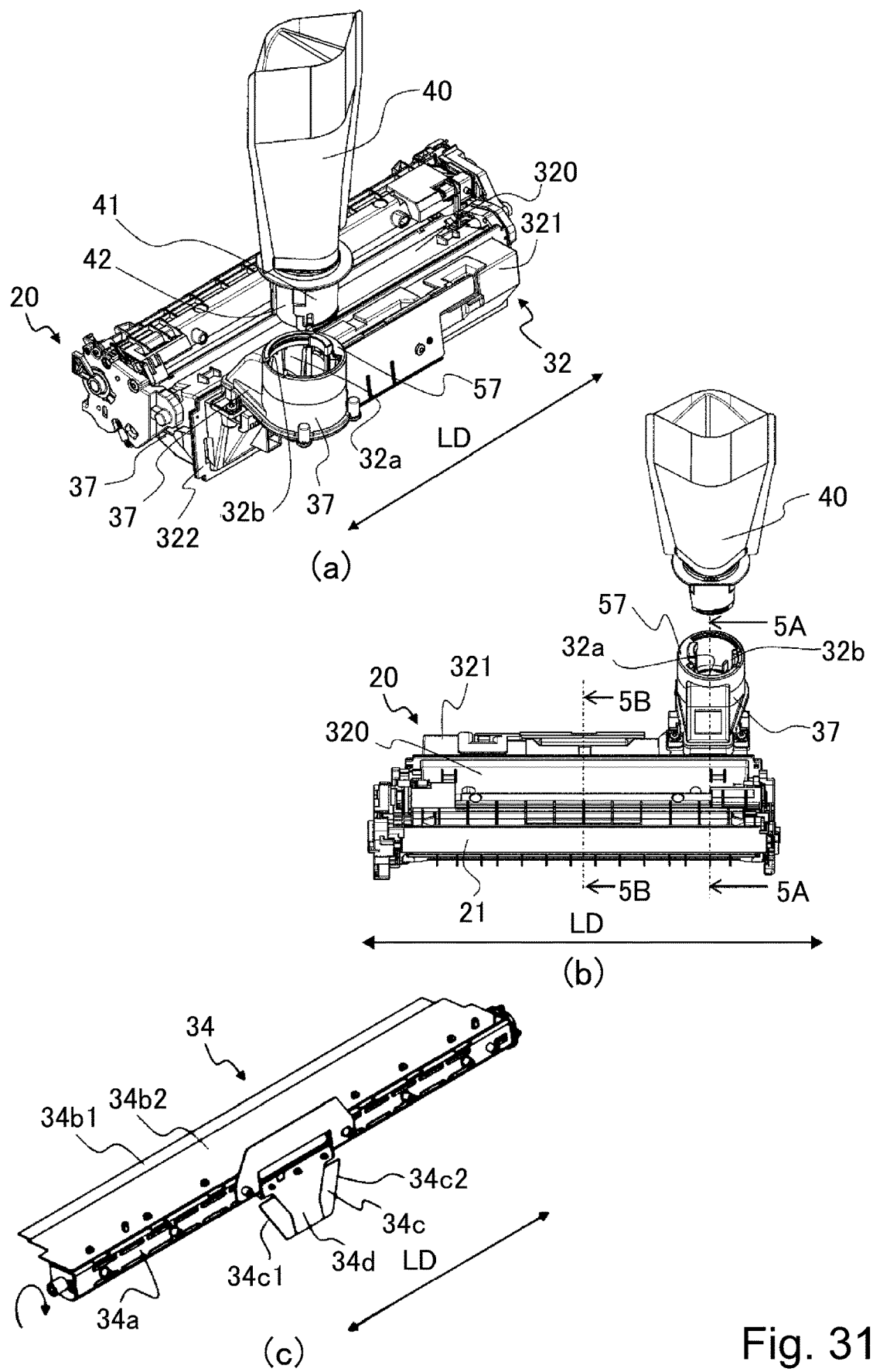

Part (a) of FIG. 31 is a perspective view showing a developing container and a toner pack, part (b) of FIG. 31 is a front view showing the developing container and the toner pack, and (c) of FIG. 31 is a perspective view showing a stirring member in the developing container.

Parts (a) and (b) of FIG. 32 are sectional views in the 5A-5A cross section and the 5B-5B cross section, respectively, of part (b) of FIG. 31.

Figure 33:
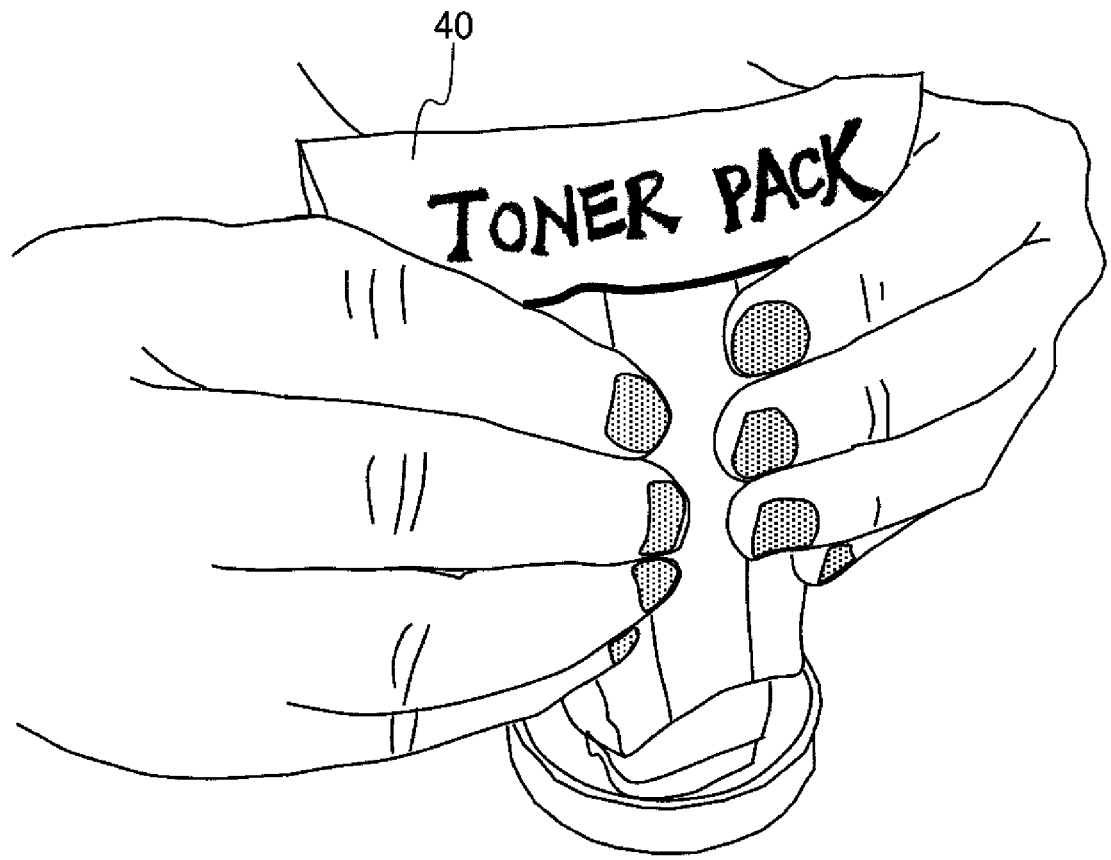

FIG. 33 is a perspective view showing a toner pack.

Parts (a), (b) and (c) of FIG. 34 are front views showing the toner pack, a toner pack of a first modified embodiment, and a toner pack of a second modified embodiment, respectively.

Figure 35:
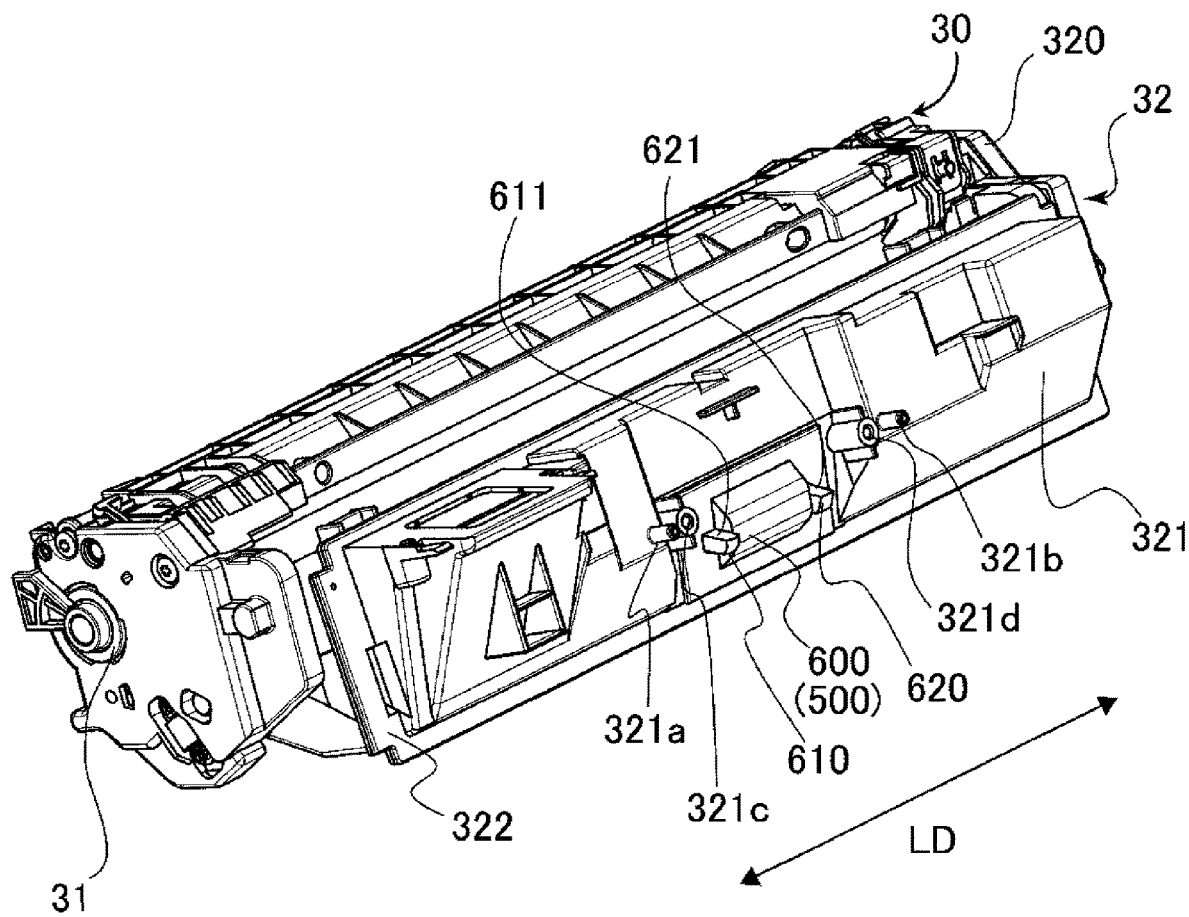

FIG. 35 is a perspective view showing a developing device.

Figure 36:
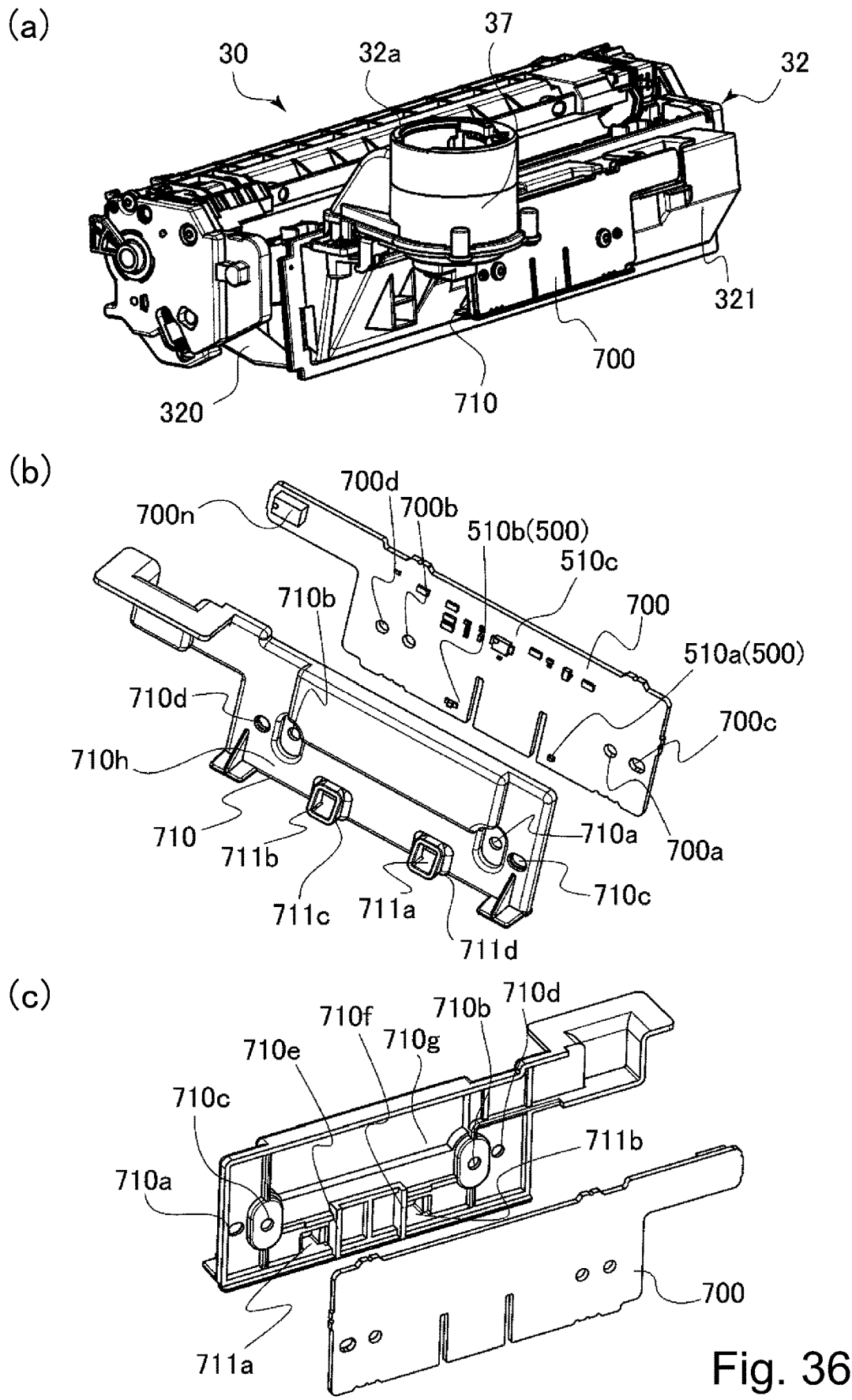

Part (a) of FIG. 36 is a perspective view showing a state in which a substrate and a substrate holding member are assembled with a developing container lid (cover), part (b) of FIG. 36 is a perspective view showing the substrate and the substrate holding member, and part (c) of FIG. 36 is another perspective view showing the substrate and the substrate holding member.

Part (a) of FIG. 37 is a sectional view of the developing device, and part (b) of FIG. 37 is a sectional view in a 10B-10B cross section of part (a) of FIG. 37.

Figure 38:
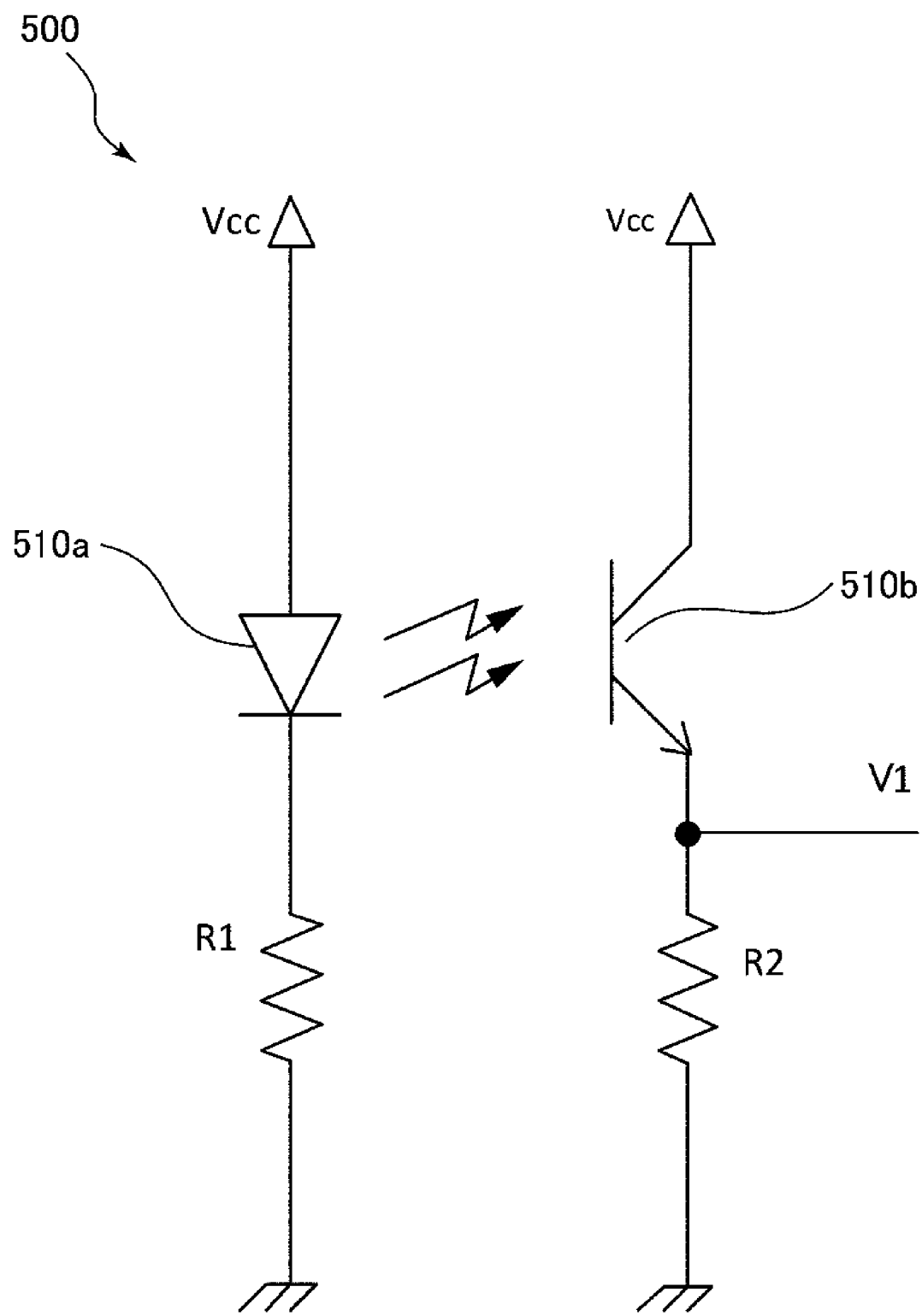

FIG. 38 is a circuit diagram showing a remaining toner amount sensor.

Figure 39:
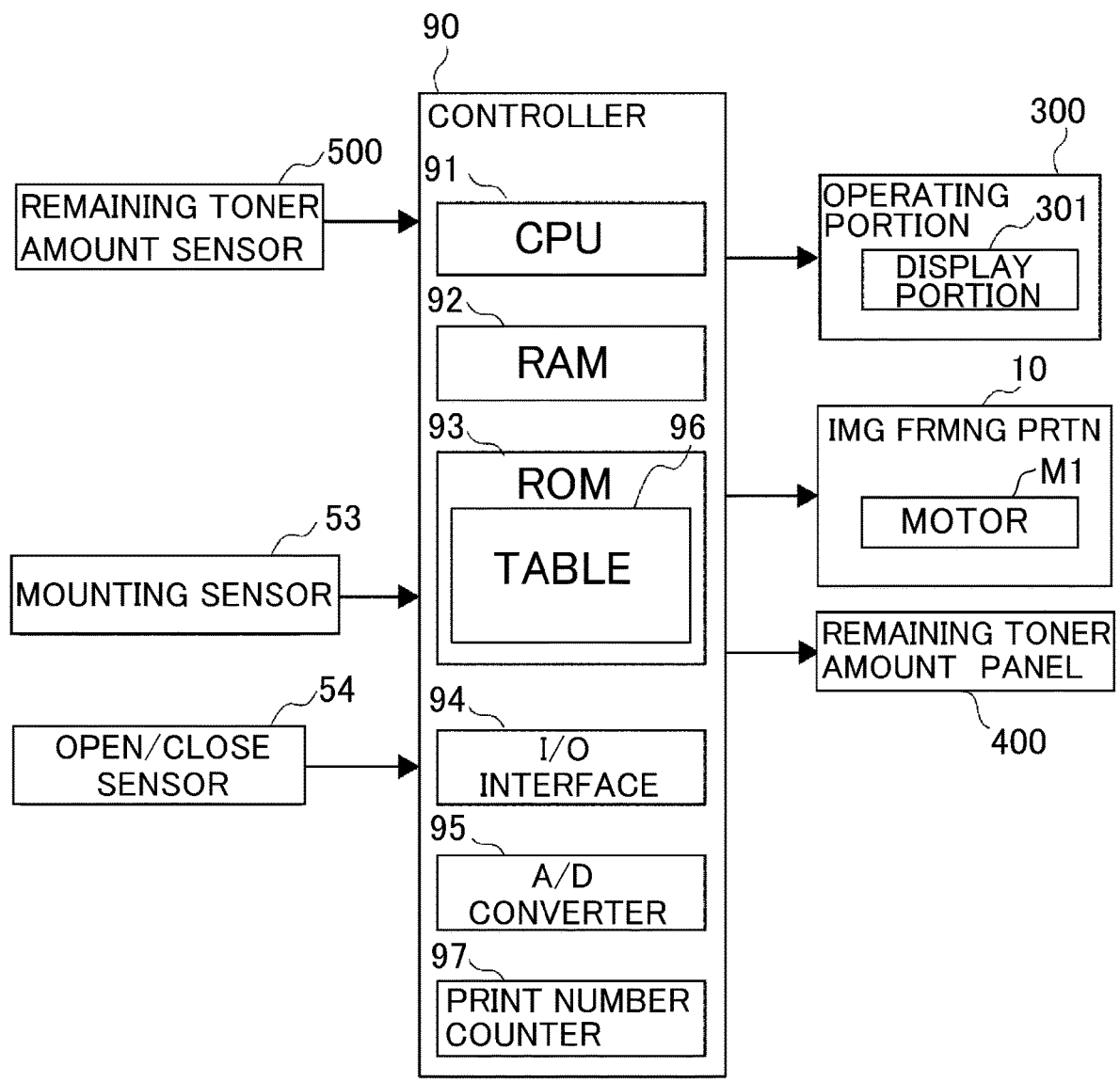

FIG. 39 is a block diagram showing a control system of the image forming apparatus.

Parts (a) to (d) of FIG. 40 are perspective views each showing a remaining toner amount panel, in which part (a) shows a "Near Out" level, part (b) shows a "Low" level, part (c) shows a "Mid" level, and part (d) shows a "Full" level.

Part (a) of FIG. 41 is a sectional view in the 5B-5B cross section of part (b) of FIG. 31, showing a state in which a remaining toner amount of the developing container is small, and part (b) of FIG. 41 is a sectional view in the 5B-5B cross section of part (b) of FIG. 31, showing a state in which the remaining toner amount of the developing container is small and which is different in phase of rotation of a stirring member from the state of part (a) of FIG. 41.

Part (a) of FIG. 42 is a sectional view in the 5B-5B cross section of part (b) of FIG. 31, showing a state in which the remaining toner amount of the developing container is large and which is the same in phase of rotation of the stirring member as the state of part (a) of FIG. 41, and part (b) of FIG. 42 is a sectional view in the 5B-5B cross section of part (b) of FIG. 31, showing a state in which the remaining toner amount of the developing container is small and in which a degree of aggregation of toner is high.

Figure 43:
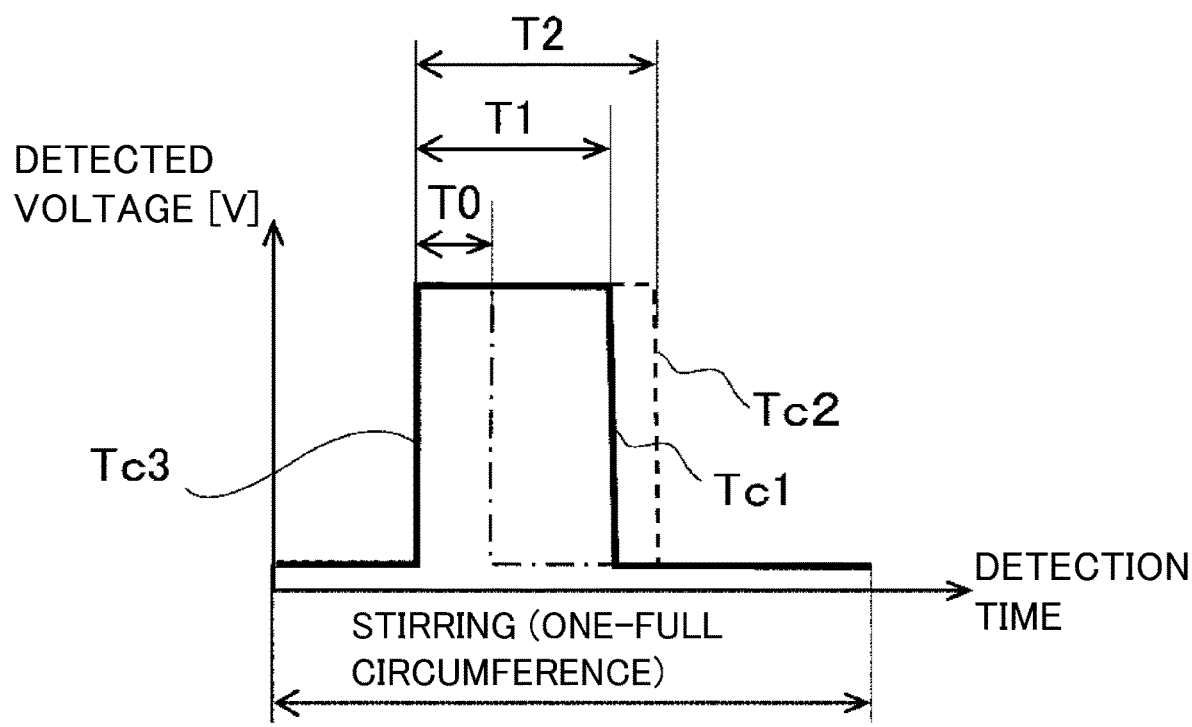

FIG. 43 is a graph showing a detection voltage when the remaining toner amount sensor detects light during one rotation (one-full circumference) of the stirring member.

Figure 44:
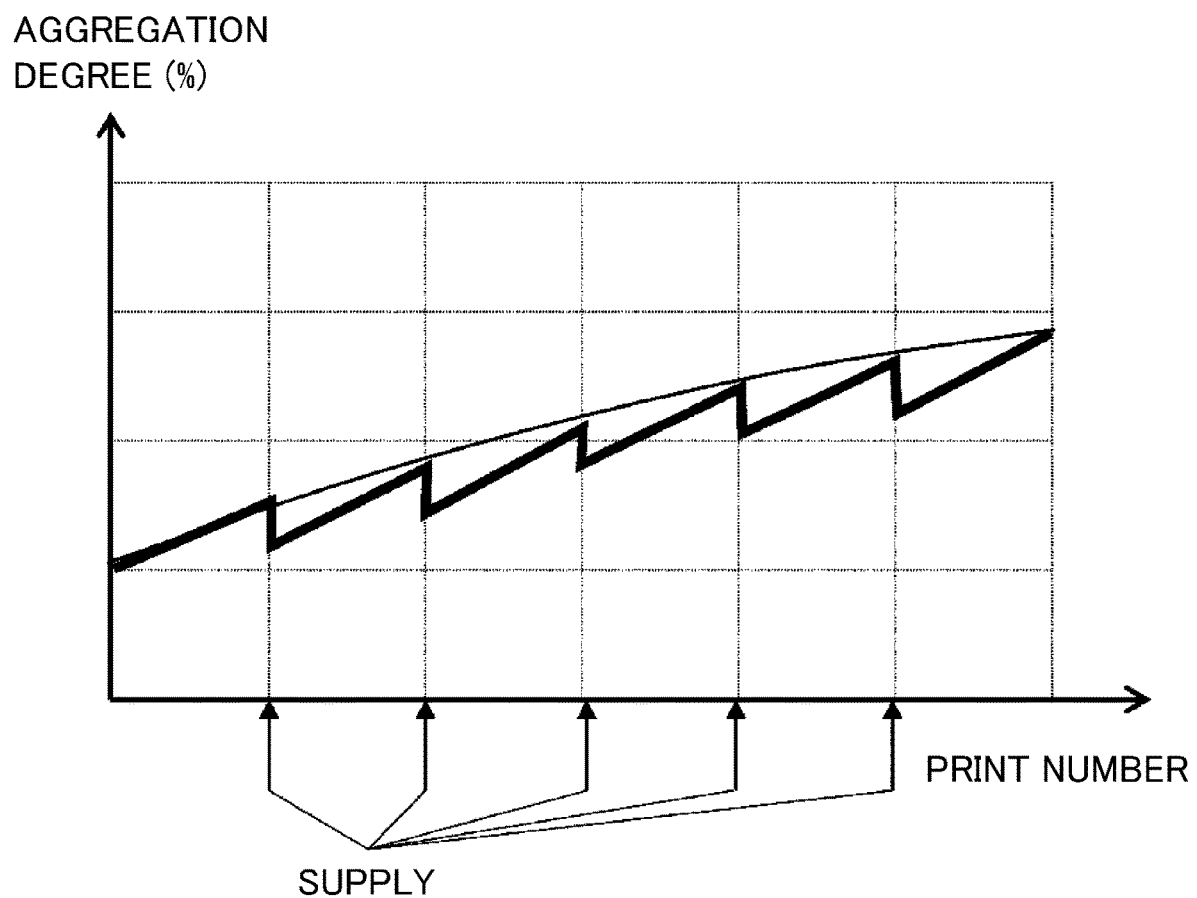

FIG. 44 is a graph showing progression of the degree of aggregation of the toner relative to a print number.

Figure 45:
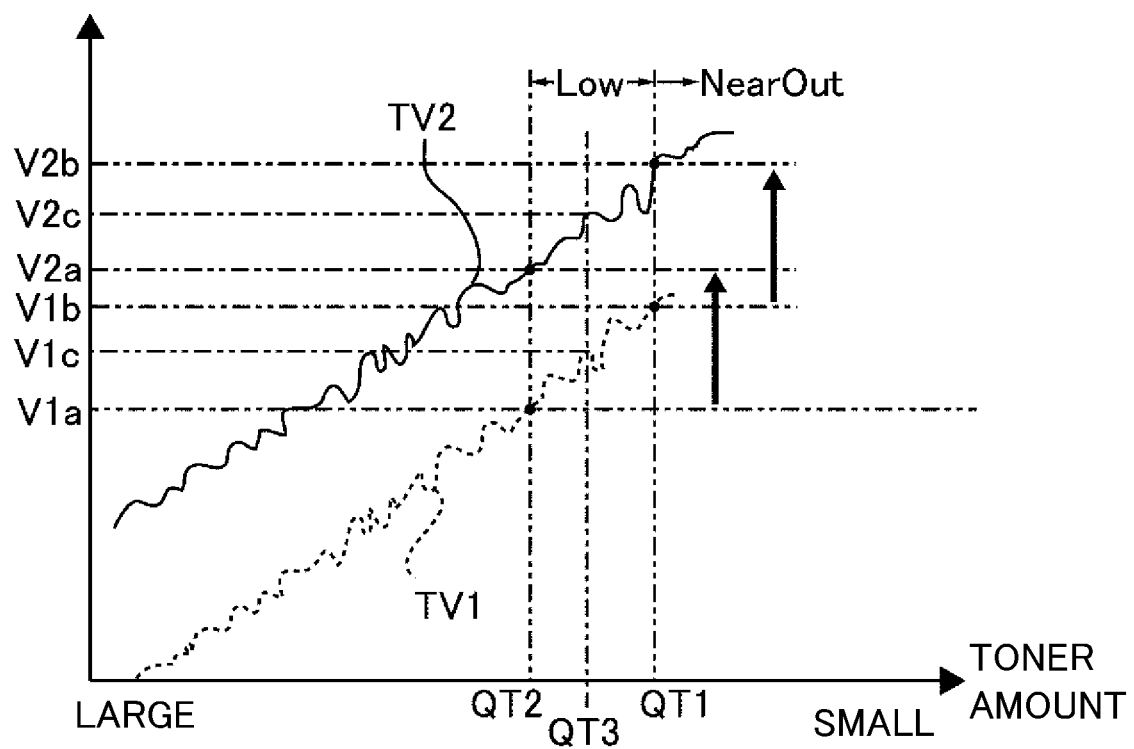

FIG. 45 is a graph showing a relationship between the remaining toner amount and a detection time of the remaining toner amount sensor.

Figure 46:
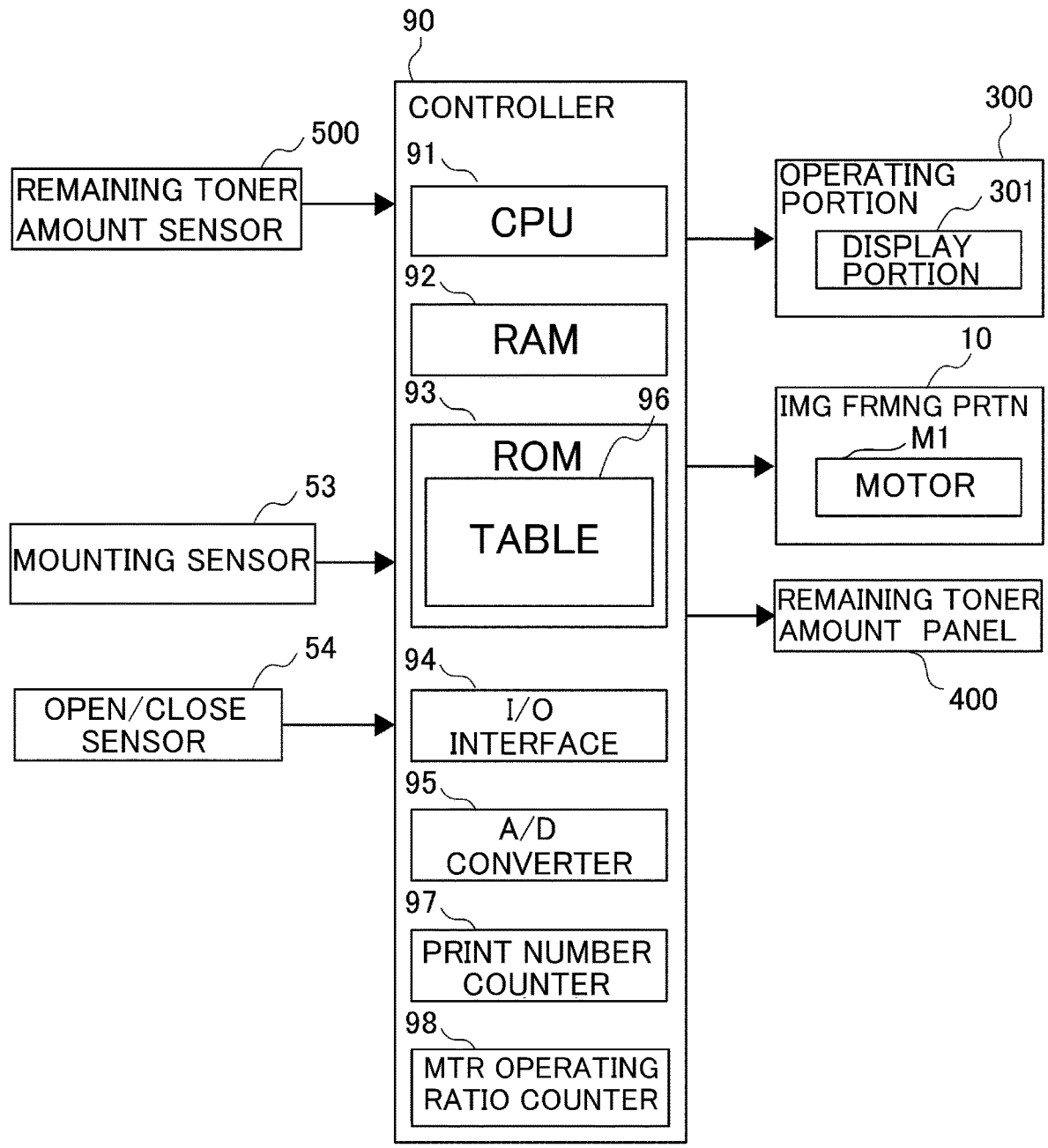

FIG. 46 is a block diagram showing a control system of the image forming apparatus according to a seventh embodiment.

Figure 47:
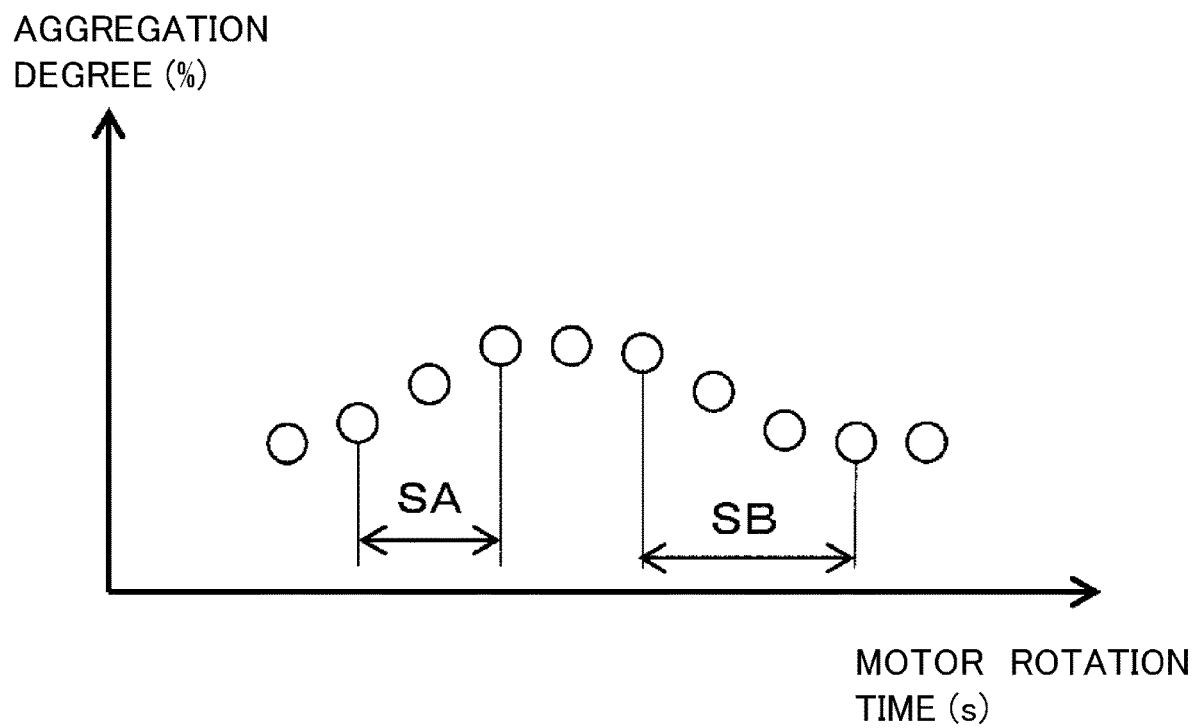

FIG. 47 is a graph showing a relationship between a motor rotation time and the degree of aggregation of the toner.

DESCRIPTION OF THE DRAWINGS

In the following, embodiments of the present invention will be described while making reference to the drawings.

First Embodiment

Part (a) of FIG. 1 is a schematic view showing a structure of an image forming apparatus 1 according to a first embodiment. The image forming apparatus 1 is a monochromatic printer for forming an image on a recording material on the basis of image information inputted from an external device. In the recording material, various sheet materials different in material including papers such as plain paper and thick paper, a plastic film such as a sheet for an overhead projector, special-shaped sheets such as an envelope and index paper, a cloth, and the like are included.

[General Structure]

The image forming apparatus 1 includes, as shown in parts (a) and (b) of FIG. 1, a printer main assembly 100 as an apparatus main assembly, a reading device 200 supported so as to be openable relative to the printer main assembly 100, and an operating portion 300 mounted to an outer casing surface of the printer main assembly 100. The printer main assembly 100 includes an image forming portion 10 for forming a toner image on the recording material, a feeding portion 60 for feeding the recording material to the image forming portion 10, a fixing portion 70 for fixing the toner image, formed by the image forming portion 10, on the recording material, and a discharging roller pair 80.

The image forming portion 10 includes a scanner unit 11, a process unit 20 of an electrophotographic type, and a transfer roller 12 for transferring the toner image as a developer image, formed on a photosensitive drum 21 of the process cartridge 20, onto the recording material. The process unit 20 includes, as shown in part (a) and (b) of FIG. 6, a developing device 30 including the photosensitive drum 21, a charging roller 22 disposed at a periphery of the photosensitive drum 21, a pre-exposure device 23, and a developing roller 31. The process unit 20 is mounted detachably to the printer main assembly 100. Incidentally, the process unit 20 may be fastened to the printer main assembly with screws and includes a process unit which is dismounted principally by a service person, not a user. On the other hand, the process unit 20 does not include a structural member of the printer main assembly, such as a casing frame for the printer main assembly 100.

The photosensitive drum 21 is a photosensitive member molded in a cylindrical shape. The photosensitive drum 21 in this embodiment includes, on a drum-shaped base material molded with aluminum, a photosensitive layer formed with a negatively chargeable organic photosensitive member. Further, the photosensitive drum 21 as an image bearing member is rotationally driven at a predetermined process speed in a predetermined direction (clockwise direction in the figure) by a motor.

The charging roller 22 contacts the photosensitive drum 21 at a predetermined press-contact force and forms a charging portion. Further, a desired charging voltage is applied to the charging roller 22 by a high charging voltage source, so that a surface of the photosensitive drum 21 is electrically charged uniformly to a predetermined potential. In this embodiment, the photosensitive drum 21 is charged to a negative polarity by the charging roller 22. The pre-exposure device 23 discharges a surface potential of the photosensitive drum 21 before entering the charging portion in order to generate stable electric discharge at the charging portion.

The scanner unit 11 irradiates the photosensitive drum 21, by using a polygonal mirror, with laser light corresponding to image information inputted from the external device or the reading device 200, so that the surface of the photosensitive drum 21 is subjected to scanning exposure. By this light exposure, an electrostatic latent image depending on the image information is formed on the surface of the photosensitive drum 21. Incidentally, the scanner unit 11 is not limited to a laser scanner device, but for example, an LED exposure device including an LED array in which a plurality of LEDs are arranged along a longitudinal direction of the photosensitive drum 21.

The developing device 30 includes the developing roller 31 as a developer carrying member for carrying a developer, a developing container 32 as a frame for the developing device 30, and a supplying roller 33 capable of supplying the developer to the developing roller 31. The developing roller 31 and the supplying roller 33 are rotatably supported by the developing container 32. Further, the developing roller 31 is disposed at an opening of the developing container 31 so as to oppose the photosensitive drum 21. The supplying roller 33 rotatably contacts the developing roller 31, and toner as the developer accommodated in the developing container 32 is applied onto the surface of the developing roller 31 by the supplying roller 33. Incidentally, when a constitution capable of supplying the toner sufficiently to the developing roller 31 is employed, the supplying roller 33 is not necessarily required.

The developing device 30 in this embodiment uses a contact development type as a development type. That is, a toner layer carried on the developing roller 31 contacts the photosensitive drum 21 at a developing portion (developing region) where the photosensitive drum 21 and the developing roller 31 oppose each other. To the developing roller 31, a developing voltage is applied by a high developing voltage source. Under application of the developing voltage, the toner carried on the developing roller 31 is transferred from the developing roller 31 onto the drum surface in accordance with a potential distribution of the surface of the photosensitive drum 21, so that the electrostatic latent image is developed into a toner image. Incidentally, in this embodiment, a reversal development type is employed. That is, the toner image is formed by being deposited on a surface region of the photosensitive drum 21 attenuated in charge amount by being exposed to light in an exposure step after being charged in a charging step.

Further, in this embodiment, the toner which is 6 μm in particle size and of which normal charge polarity is a negative polarity is used. As the toner in this embodiment, a polymerization toner formed by a polymerization method as an example is employed. Further, the toner in this embodiment is a so-called non-magnetic one-component developer which does not contain a magnetic component and in which the toner is carried on the developing roller 31 principally by an intermolecular force or an electrostatic force (mirror force). However, a one-component developer containing a magnetic component may also be used. Further, in the one-component developer, an additive (for example, wax or silica fine particles) for adjusting flowability and charging performance is contained in addition to toner particles in some cases. Further, as the developer, a two-component developer constituted by non-magnetic toner and a magnetic carrier may also be used. In the case where the developer having a magnetic property is used, as the developer carrying member, for example, a cylindrical developing sleeve inside of which a magnet is disposed is used.

At an inner portion of the developing container 32, a stirring member 34 is provided. The stirring member 34 not only stirs the toner in the developing container 32 but also conveys the toner toward the developing roller 31 and the supplying roller 33 by being driven and rotated by a motor M1 (see FIG. 13). Further, the stirring member 34 has a function of circulating the toner, peeled off from the developing roller 31 without being used for the development, in the developing container and of uniformizing the toner in the developing container. Incidentally, the stirring member 34 is not limited to a rotatable form. For example, a stirring member in a swingable form may also be employed. Further, in addition to the stirring member 34, another stirring member may be provided.

Further, at an opening of the developing container 32 where the developing roller 31 is disposed, a developing blade 35 for regulating an amount of the toner carried on the developing roller 31 is disposed. The toner supplied to the surface of the developing roller 31 passes through an opposing portion to the developing blade 35 with rotation of the developing roller 31, so that the toner is uniformly formed in a thin layer and is charged to the negative polarity by triboelectric charge.

A feeding portion 60 includes, as shown in parts (a) and (b) of FIG. 1, a front door 61 supported so as to be openable by the printer main assembly 100, a tray portion 62, an intermediary plate 63, a tray spring 64, and a pick-up roller 65. The tray portion 62 constitutes a bottom of a recording material accommodating space which appears by opening the front door 61, and the intermediary plate 63 is supported by the tray portion 62 so as to be capable of being raised and lowered. The tray spring 64 urges the intermediary plate 63 upward and presses the recording materials P, stacked on the intermediary plate 63, against the pick-up roller 65. Incidentally, the front door 61 closes the recording material accommodating space in a state in which the front door 61 is closed relative to the printer main assembly 100, and supports the recording materials P together with the tray portion 62 and the intermediary plate 63 in a state in which the front door 61 is opened relative to the printer main assembly 100.

The fixing portion 70 is a heat fixing type in which an image fixing process is performed by heating and melting the toner on the recording material. The fixing portion 70 includes a fixing film 71, a fixing heater such as a ceramic heater for heating the fixing film 71, a thermistor for measuring a temperature of the fixing heater, and a pressing roller 72 for press-contacting the fixing film 71.

Next, an image forming operation of the image forming apparatus 1 will be described. When an instruction of image formation is inputted to the image forming apparatus 1, on the basis of the image information inputted from an external computer connected to the image forming apparatus 1 or from the reading device 200, an image forming process by the image forming portion 10 is started. The scanner unit 11 emits the laser light toward the photosensitive drum 21 on the basis of the inputted image information. At this time, the photosensitive drum 21 is charged in advance by the charging roller 22, and is irradiated with the laser light, so that the electrostatic latent image is formed on the photosensitive drum 21. Thereafter, this electrostatic latent image is developed by the developing roller 31, so that the toner image is formed on the photosensitive drum 21.

In parallel to the above-described image forming process, the pick-up roller 65 of the feeding portion 60 sends the recording material P supported by the front door 61, the tray portion 62, and the intermediary plate 63. The recording material P is fed to the registration roller pair 15 by the pick-up roller 65, and is abutted against a nip of the registration roller pair 15, so that oblique movement of the recording material P is corrected. Further, the registration roller pair 15 is driven by being timed to a transfer timing of the toner image, and is conveyed toward a transfer nip formed by a transfer roller 12 and the photosensitive drum 21.

To the transfer roller 12 as a transfer means, a transfer voltage is applied from a high transfer voltage source, so that the toner image carried on the photosensitive drum 21 is transferred onto the recording material P conveyed by the registration roller pair 15. The recording material P onto which the toner image is transferred is conveyed to the fixing portion 70, where the toner image is heated and pressed when the recording material P passes through a nip between the fixing film 71 and the pressing roller 72 of the fixing portion 70. By this, the recording material P passing through the fixing portion 70 is thereafter fixed, so that the toner image is fixed on the recording material P. The recording material P passed through the fixing portion 70 is discharged to an outside of the image forming apparatus 1 (outside of the printer) by a discharging roller pair 80, so that the discharged recording materials P are stacked on a discharge tray 81 formed at an upper portion of the printer main assembly 100.

The discharge tray 81 is inclined upward toward a downstream in a discharging direction of the recording material, and the recording material discharged on the discharge tray 81 slides down on the discharge tray 81, so that a trailing end of the recording material is aligned by a restricting surface 84.

Incidentally, the type of the transfer means is not limited to a direct transfer type in which the toner image is directly transferred from the image bearing member onto the recording material, but may also be an intermediary transfer type in which the toner image is transferred onto the recording material by way of an intermediary transfer member. In that case, instead of the transfer roller 12, for example, an intermediary transfer unit including an endless intermediary transfer belt stretched by a plurality of rollers, primary transfer rollers opposing photosensitive drums through the intermediary transfer belt, and a secondary transfer roller opposing an outer surface of the intermediary transfer belt is used. The toner images formed on the photosensitive drums are primary-transferred onto the intermediary transfer belt by the primary transfer rollers and then are secondary-transferred onto the recording material by the secondary transfer roller. Such a secondary transfer unit is another example of the transfer means.

Further, in this embodiment, the monochromatic printer was described, but the following technique may be applied to an image forming apparatus for forming a color image by including plural pairs of image bearing members and developing devices and by using toners of a plurality of colors.

The reading device 200 includes, as shown in Parts (a) and (b) of FIG. 3, a read unit 201 in which an unshown reading portion is built, and a platen 202 supported by the reading unit 201 so as to be openable and closable. At an upper surface of the reading unit 201, an original supporting platen glass 203 permits transmission of light emitted from the reading portion and on which an original is to be placed.

In the case where a user intends to cause the reading device 200 to read an image of the original, the user places the original on the original supporting platen glass 203 in a state in which the platen 202 is opened. Then, the platen 202 is closed and a positional deviation of the original on the original supporting platen glass 203 is prevented, so that a reading instruction is outputted to the image forming apparatus 1 by operating the operating portion 300, for example. When a reading operation is started, the reading portion in the reading unit 201 reciprocates in a sub-scan direction, i.e., the reading portion reciprocates in a left-right direction in a state in which the user faces the operating portion 300 of the image forming apparatus 1 on a front (surface) side. The reading portion receives light reflected by the original by a light receiving portion while emitting light from a light emitting portion toward the original, and photoelectrically converts the light, so that the reading portion reads the image of the original. Incidentally, in the following, on the basis of a state in which the user faces the operating portion 300 on the front side, a front-rear direction, the left-right direction, and an up-down direction are defined.

As shown in parts (a) and (b) of FIG. 2, at an upper portion of the printer main assembly 100, a first opening 101 which opened upward is formed, and the first opening 101 is covered with a discharge tray 81 in a normal use state (state in which an image forming operation is capable of being executed). The discharge tray 81 is supported so as to be openable and closable relative to the printer main assembly 100, about a rotation shaft extending in the left-right direction. The discharge tray 81 is opened from the front side toward a rear side in a state in which the reading device 200 is opened relative to the printer main assembly 100. Further, a constitution in which to the first opening 101, a mounting portion including a supply opening 32a through which a toner pack 40 is mountable as described later is exposed is employed (see parts (a) and (b) of FIG. 4). The user has access to the mounting portion 57 by opening the discharge tray 81. Incidentally, the reading device 200 and the discharge tray 81 may also be constituted so as to be held in an opened state and a closed state by a holding mechanism such as a hinge mechanism.

Thus, in this embodiment, a type (direct supply type) in which the user is supplied the toner from the toner pack 40 (parts (a) and (b) of FIG. 1) as a toner container to the developing device 30 while maintaining a state in which the developing device 30 is mounted in the image forming apparatus 1 is employed.

This embodiment employs a cleaner-less type in which transfer residual toner remaining on the photosensitive drum 21 without being transferred onto the recording material P is collected in the developing device 30 and is utilized again. The transfer residual toner is removed in the following step. In the transfer residual toner, toner charged to the positive polarity and toner which is charged to the negative polarity out which does not have sufficient electric charges are present in mixture. The photosensitive drum 21 after the transfer is charge-removed by the pre-exposure device 23, and the charging roller 22 is caused to generate uniform electric discharge, so that the transfer residual toner is charged again to the negative polarity. The transfer residual toner charged again to the negative polarity at the charging portion reaches a developing portion with rotation of the photosensitive drum 21. Then, a surface region of the photosensitive drum 21 passing through the charging portion is exposed to light by the scanner unit 11 while being in a state in which the transfer residual toner is deposited on the surface, so that the electrostatic latent image is written (formed).

Here, behavior of the transfer residual toner reached the developing portion will be described by dividing a portion of the photosensitive drum 21 into an exposure portion and a non-exposure portion. The transfer residual toner deposited on the non-exposure portion of the photosensitive drum 21 is transferred onto the developing roller 31 at the developing portion by a potential difference between a non-exposure portion potential (dark-portion potential) of the photosensitive drum 21 and the developing voltage, and is collected in the developing container 32. This is because the developing voltage applied to the developing roller 31 on the assumption that a normal charge polarity of the toner is negative is a positive polarity relative to the non-exposure portion potential. Incidentally, the toner collected in the developing container 32 is stirred and dispersed with the toner in the developing container by the stirring member 34, and is carried on the developing roller 31, so that the toner is used again in the developing step.

On the other hand, the transfer residual toner deposited on the exposure portion of the photosensitive drum 21 remains on the drum surface without being transferred from the photosensitive drum 21 onto the developing roller 31 at the developing portion. This is because the developing voltage applied to the developing roller 31 on the assumption that the normal charge polarity of the toner is the negative polarity becomes a further negative potential than an exposure portion potential (light-portion potential). The transfer residual toner remaining on the drum surface is carried on the photosensitive drum 21 together with another toner transferred from the developing roller 31 onto the exposure portion, and is moved to a transfer portion, so that the toner is transferred onto the recording material P at the transfer portion.

Thus, this embodiment employs the cleaner-less constitution (simultaneous development and collection type) in which the transfer residual toner is collected in the developing device 30 and is utilized again, but may also employ a conventionally well-known constitution in which the transfer residual toner is collected using a cleaning blade contacting the photosensitive drum 21. In that case, the transfer residual toner collected by the cleaning blade is collected in a collecting container provided separately from the developing device 30. However, by employing the cleaner-less constitution, a mounting space for collecting container for collecting the transfer residual toner or the like becomes unnecessary and further downsizing of the image forming apparatus 1 becomes possible, and further, it is also possible to realize printing cost reduction by re-utilizing the transfer residual toner.

[Constitution of Developing Container and Toner Pack]

Next, constitutions of the developing container 32 and the toner pack 40 will be described. Part (a) of FIG. 4 is a perspective view showing the developing container 32 and the toner pack 40, and part (b) of FIG. 4 is a front view showing the developing container 32 and the toner pack 40. Part (c) of FIG. 4 is a perspective view showing the stirring member 34 in the developing container 32. Part (a) of FIG. 5 is a 5A-5A sectional view of part (b) of FIG. 4, and part (b) of FIG. 5 is a 5B-5B sectional view of part (b) of FIG. 4.

As shown in part (a) of FIG. 4 to part (b) of FIG. 5, the developing container 32 as a part of the developing device 30 includes a feeding chamber 36 for accommodating the stirring member 34, and the feeding chamber 36 as an accommodating portion for accommodating the toner extends over a full length of the developing container 32 in a longitudinal direction LD (left-right direction). The longitudinal direction LD of the developing container 32 is a rotational axis direction of the developing roller 31 as the developer carrying member. Further, the developing container 32 is constituted by connecting a developing container frame 320 and a developing container lid (cover) 321 by a connecting portion 322. Further, the developing roller 31 and the supplying roller 33 are rotatably supported by the developing container frame 320.

Further, the developing container 32 includes a projected supply portion 37 which projects upward from one end portion of the feeding chamber 36 in the longitudinal direction and which communicates with the feeding chamber 36. Specifically, the projected supply portion 37 is provided at one end portion of the developing container lid 321 in the rotational axis direction (longitudinal direction LD) of the developing roller 31. The projected supply portion 37 projects toward the discharge tray 81 than the central portion projects in the crossing direction (particularly, an upward direction with respect to the direction of gravitation) crossing the rotational axis direction.

In this embodiment, the projected supply portion 37 is formed in a hollow shape at an inside thereof, and is disposed on the left side of the developing container 32. At an end portion of the projected supply portion 37, a mounting portion 57 where the toner pack 40 is mountable is provided, and at the mounting portion 57, a rotatable supply opening 32a for permitting supply of the developer from the toner pack 40 to the feeding chamber 36 is formed. To the mounting portion 57, the toner pack 40 can be mounted in a state in which the toner pack 40 is exposed to an outside of the apparatus.

The projected supply portion 37 obliquely extends from the feeding chamber 36 toward the front of and above the apparatus. That is, the projected supply portion 37 projects toward a downstream end in a discharge direction of the discharging roller pair 80 and upward. For this reason, the supply opening 32a disposed at the projected supply portion 37 is disposed on the front side of the image forming apparatus 1, so that a supplying operation of the toner to the developing container 32 can be easily carried out.

Further, the projected supply portion 37 where the supply opening 32a is disposed on one side in the longitudinal direction of the developing container 32, so that it is possible to ensure a laser passing space through which the laser (light) emitted from the scanner unit 11 is capable of passing, and the image forming apparatus 1 can be downsized.

The toner pack 40 is constituted so as to be mountable to and dismountable from the mounting portion 57 of the first projected portion 37 as shown in part (a) of FIG. 4 to part (b) of FIG. 5. Further, the toner pack 40 includes a shutter member 41 which is provided at an opening of the toner pack 40 and which is openable and closable, and a projection 42 formed corresponding to a groove 32b formed at the mounting portion 57. In the case where the user supplies the toner to the developing container 32, the user performs alignment so that the projections 42 of the toner pack 40 pass through the grooves 32b of the mounting portion 57, so that the user connects the toner pack 40 with the mounting portion 57. Then, in this state, a shutter member 41 of the toner pack 40 is rotated 90 degrees by operating an unshown lever device in the image forming apparatus 1. Then, the supply opening 32a is rotated together with the shutter member 41 and is abutted against an unshown abutting portion of the mounting portion 57, so that the shutter member 41 is completely opened and at the same time, the supply opening 32a and the opening of the toner pack 40 communicate with each other. By this, the toner accommodated in the toner pack 40 falls through the opening of the toner pack 40 and enters from the hollow-shaped projected supply portion 37 into the feeding chamber 36 through the supply opening 32a.

Here, the stirring member 34 includes, as shown in part (c) of FIG. 4, a stirring shaft 34a extending in the longitudinal direction LD, and a first blade portion 34b1 and a second blade portion 34b2 which extend from the stirring shaft 34a toward an outside in a radial direction. The first blade portion 34b1 and the second blade portion 34b2 are formed with flexible sheets and are different in length extending toward the outside in the radial direction from each other. The first blade portion 34b1 is longer than the second blade portion 34b2. In parts (a) and (b) of FIG. 5, a rotational locus of the first blade portion 34b1 on assumption that the first blade portion 34b1 is rotated in a straightly extending state in disregard of the wall surface of the developing container 32 is represented by Tb1. Similarly, in parts (a) and (b) of FIG. 5, a rotation locus of the second blade portion 34b2 on assumption that the second blade portion is rotated in a straightly extending state in disregard of the wall surface of the developing container 32 is represented by Tb2. Incidentally, a wiping portion 34c of the stirring member 34 shown in part (c) of FIG. 4 will be described later.

As shown in part (a) of FIG. 5, the toner supplied from the supply opening 32a disposed on an upstream side in a (recording material) feeding direction of the stirring member 34 is sent toward the developing roller 31 and the supplying roller 33 with rotation of the stirring member 34. The supply opening 32a and the projected supply portion 37 are disposed at one end portion of the developing container 32 in the longitudinal direction LD, but the toner is spread over a full length of the developing container 32 by repeating the rotation of the stirring member 34. That is, the feeding direction of the stirring member 34 is not only a direction parallel to the longitudinal direction LD of the developing container 32 (see part (a) of FIG. 4) but also a direction (direction from the feeding chamber 36 toward the developing roller 31 and the supplying roller 31) crossing the longitudinal direction LD. Here, as indicated by the rotation loci Tb1 and Tb2, the first blade portion 34b1 which is a longer blade portion functions as a principal portion for feeding the toner toward the developing roller 31 and the supplying roller 33. On the other hand, the second blade portion 34b2 which is a shorter blade portion functions as an auxiliary portion for feeding, for example, toner which cannot be satisfactorily fed by the first blade portion 34b1 due to belly abutment.

In this embodiment, the toner pack 40 is constituted by a deformable bag member made of a plastic film as shown in FIG. 6 and part (a) of FIG. 7, but the present invention is not limited thereto. For example, the toner pack 40 (supply container) may be constituted by a substantially cylindrical-shaped bottle container 40B as shown in part (b) of FIG. 7, and may be constituted by a paper container 40C made of paper as shown in part (c) of FIG. 7. In either case, the toner pack 40 (supply container) may be any one in material and shape. Further, as regards a method of ejecting the toner from the toner pack 40 (supply container), a method such that the user squeezes the toner pouch with fingers if the toner pouch is the toner pack 40 (supply container) or the paper container 40C is suitable, and a method such that the user leaks down the toner by tapping the container or the like while vibrating the container if the toner pouch is the bottle container 4B is suitable. Further, in order to discharge the toner from the bottle container 40B, a discharging mechanism may be provided in the bottle container 40B. Further, the discharging mechanism may be a constitution for receiving a driving force from the printer main assembly 100 by engaging with the printer main assembly 100.

Further, in either toner pack, the shutter member 41 may be omitted, or a shutter of a slide type may be applied instead of the shutter member 41. Further, the shutter member 41 may be a constitution in which the shutter member 41 is broken by mounting the toner pack on the supply opening 32a or by rotating the toner pack in a mounted state, or may be a dismountable lid (cover) structure such as a seal.

Further, in this embodiment, the stirring member 34 is provided with the two blade portions 34b1 and 34b2 different in length, but a length and the number thereof are not limited thereto. For example, the length and the number of the blade portions may be freely set in consideration of the shape of the developing container, feeding efficiency, and the like.

[Detecting Method of Remaining Toner Amount]

In the following, using FIGS. 8 to 14, a constitution of the developing device 30 relating to remaining toner amount detection in this embodiment will be specifically described. FIG. 8 is a perspective view showing the developing device 30. Part (a) of FIG. 9 is a perspective view showing a state in which a substrate 700 and a substrate holding member 710 are assembled with the developing container lid 321. Part (b) of FIG. 9 is a perspective view showing the substrate 700 and the substrate holding member 710, and part (c) of FIG. 9 is another perspective view showing the substrate 700 and the substrate holding member 710. Part (a) of FIG. 10 is a sectional view passing through a light emitting element 510a of the developing device 30 in an attitude of the developing device 30 when the remaining toner amount is detected, and part (b) of FIG. 10 is a sectional view of a 10B-10B cross section of part (a) of FIG. 10. FIG. 11 is a schematic circuit diagram showing an example of a circuit constitution of a remaining toner amount sensor 500. Part (a) of FIG. 12 is a sectional view showing the developing container 32 in a state of a small remaining toner amount in the attitude of the developing device 30 when the remaining toner amount is detected. Part (b) of FIG. 12 is a sectional view showing the developing container 32 in a state of a large remaining toner amount in the attitude of the developing container 32 when the remaining toner amount is detected.

As shown in FIG. 8, the developing container lid 321 constituting a part of the developing container 32 includes substrate positioning portions 321a and 321b and surface fixing portions 321c and 321d. With respect to the longitudinal direction LD, in a position between the substrate fixing portions 321c and 321d of the developing container lid 321, a light guiding member 600 as a light guiding means is provided. The light guiding member 600 includes a light emitting-side light guiding member 610 and a light receiving-side light guiding member 620. The light emitting-side light guiding member 610 guides light, emitted from the light emitting element 510a described later, to an inside of the feeding chamber 36. The light receiving-side light guiding member 620 guides the light, outgoing from the light emitting-side light guiding member 610 and traveling through a space optical path Q (see parts (a) and (b) of FIG. 10) in the feeding chamber 36, to a light receiving element 510b described later. The light guiding member 600 is provided on the developing container lid 321 as the wall surface of the developing container 32 and functions as the light guiding means for guiding the light emitted by the light emitting element 510a so as to reach the light receiving element 510b through the inside space of the developing container 32.

Further, by the light guiding member 600, the light emitting element 510a, and the light receiving element 510b, the remaining toner amount sensor 500 as a developer amount detecting means is constituted.

The substrate positioning portions 321a and 321b as positioning portions are disposed outside the substrate fixing portions 321c and 321d, respectively, with respect to the longitudinal direction LD of the developing container 32, and each has a boss shape such that the substrate positioning portion is projected in a direction of being separated from the developing container 32. The shape of each of the substrate positioning portions 321a and 321b is not limited to the boss shape but may also be an arbitrary shape. Further, the longitudinal direction LD of the developing container 32 is the same as the longitudinal direction LD (see part (a) of FIG. 4) of the process unit 20. With the substrate fixing portions 321c and 321d, a fixing tool such as screws is threadably engageable.

In this embodiment, as shown in part (a) of FIG. 9, the substrate 700 and the substrate holding member 710 are assembled with the developing container lid 321. The substrate holding member 710 is assembled with the developing container lid 321 in a state in which the substrate holding member 710 is sandwiched between the developing container lid 321 and the substrate 700. Incidentally, a constitution in which by simplifying a holding structure of the substrate 700, the substrate 700 is directly assembled with the developing container lid 321 without via the substrate holding member 710 can be employed.

As shown in part (b) of FIG. 9, the substrate 700 is provided with the light emitting element 510a and the light receiving element 510b which are disposed on opposite surfaces of the substrate holding member 710 and which are used for detecting the remaining toner amount in the feeding chamber 36.

In this embodiment, an LED is used as the light emitting element 510a, and as the light receiving element 510b, a phototransistor put in an ON state by light from the light emitting element 510a is used, but the present invention is not limited thereto. For example, a halogen lamp or a fluorescent lamp may be used as the light emitting element 510a, and a photodiode or an avalanche photodiode may be used as the light receiving element 510b.

Further, the substrate 700 is provided with a cable connector 700n, and the cable connector 700n is connected to a controller 90 described later by a cable.

Further, the substrate 700 includes positioning holes 700a and 700b through which the substrate positioning portions 321a and 321b are inserted and engaged, respectively, and includes substrate fixing holes 700c and 700d through which screws to be threadably engaged with the substrate fixing portions 321c and 321d are capable of penetrating.

Similarly, the substrate holding member 710 includes positioning holes 710a and 710b through which the substrate positioning portions 321a and 321b are inserted and engaged, respectively, and includes substrate fixing holes 710c and 710d through which screws to be threadably engaged with the substrate fixing portions 321c and 321d are capable of penetrating. Further, the substrate holding member 710 is provided with a first hole 711a through which the light emitting-side light guiding member 610 of the light guiding member 600 is inserted and a second hole 711b through which the light receiving-side light guiding member 620 of the light guiding member 600 is inserted. Each of these first and second holes 711a and 711b has a cylindrical shape. The substrate holding member 710 functions as a holder for holding the substrate 700.

Further, on a side where the substrate holding member 710 opposes the substrate 700, light-blocking plates 710e and 710f as shielding portions are provided. These light-blocking plates 710e and 710f are disposed between the light emitting element 510a and the light receiving element 510b with respect to the longitudinal direction LD and are close to the substrate 710 in a state in which the substrate 700 and the substrate holding member 710 are assembled with the developing container lid 321.

As shown in FIG. 8 to part (a) of FIG. 10, the substrate holding member 710 is positioned relative to the developer container lid 321 by engagement of the positioning portions 321a and 321b of the developer container lid 321 with the positioning holes 710a and 710b, respectively, through penetration. Further, the substrate 700 is positioned relative to the developing container lid 321 by engagement of the positioning portions 321a and 321b of the developing container lid 321 with the positioning holes 700a and 700b, respectively, through penetration. Thus, the substrate positioning portions 321a and 321b are used common to the substrate holding member 710 and the substrate 700, so that the developing container lid 321, the substrate holding member 710, and the substrate 700 can be accurately positioned relative to each other.

Further, in a state in which the substrate holding member 710 and the substrate 700 are positioned relative to the developing container lid 321, screws are inserted into the substrate fixing holes 700c, 700d, 710c and 710d, and thus are threadably engaged with the substrate fixing portions 321a and 321b of the developing container lid 321. By this, the substrate holding member 710 and the substrate 700 are co-fastened to the developer container lid 321, so that the substrate holding member 710 and the substrate 700 are fixed to the developing container lid 321.

As shown in FIG. 8 to part (b) of FIG. 10, when the substrate holding member 710 and the substrate 700 are assembled with the developing container lid 321, the light emitting-side light guiding member 610 of the light guiding member 600 is in a state in which the light emitting-side light guiding member 610 is inserted (engaged) in the first hole 711a of the substrate holding member 710. Then, the light emitting-side light guiding member 610 is positioned in a position where the substrate 700 is close to the light emitting element 510a of the substrate 700. Similarly, the light receiving-side light guiding member 620 of the light guiding member 600 is in a state in which the light receiving-side light guiding member 620 is inserted (engaged) in the second hole 711b of the substrate holding member 710. Then, the light receiving-side light guiding member 620 is positioned in a position where the light receiving-side light guiding member 620 is close to the light receiving element 510b of the substrate 700.

As described above, the substrate holding member 710 and the substrate 700 are positioned relative to the developer container lid 321 with accuracy, and therefore, a ratio of a light quantity of the light incident on the light emitting-side light guiding member 610 to a light quantity of the light emitted from the light emitting element 510a can be enhanced. Then, the light passing through the inside of the light emitting-side light guiding member 610 guided to the inside of the developing container 32 is emitted from the light emitting-side light guiding member 610 toward the longitudinal direction LD.

Then, the light traveling along the space optical path Q in the inside of the feeding chamber 36 is incident on the light receiving-side light guiding member 620 and passes through the inside of the light receiving-side light guiding member 620, and is guided to the outside of the developing container 32. The light receiving-side light guiding member 620 is disposed close to the light receiving element 510b, and therefore, a ratio of a light quantity of the light received by the light receiving element 510b to a light quantity of the light outgoing from the light receiving-side light guiding member 620 can be enhanced.

Further, as shown in parts (b) and (c) of FIG. 9, the substrate holding member 710 is provided with the light-blocking plates 710e and 710f disposed between the light emitting element 510a and the light receiving element 510b in a position close to the substrate 700. For this reason, the light traveling toward the light receiving element 510b without via the light emitting-side light guiding member 610 and the light receiving-side light guiding member 620 is shielded (blocked) by the light-blocking plates 710e and 710f. By this, erroneous detection due to reception of light (stray light), which does not pass through the space optical path Q, by the light receiving element 510b is suppressed.

Here, arrangement of the light emitting element 510a and the light receiving element 510b will be specifically described.

The light emitting element 510a and the light receiving element 510b are disposed opposed to a side surface 36a of the developing container 32 opposite from the developing roller 31 as shown in parts (a) and (b) of FIG. 10. Further, the light emitting element 510a and the light receiving element 510b are provided at a central portion of the feeding chamber 36 with respect to the longitudinal direction LD. Specifically, as shown in part (b) of FIG. 10, with respect to the longitudinal direction LD, the light emitting element 510a and the light receiving element 510b are disposed so that a central portion 31a (broken line) of the developing roller 31 is positioned therebetween. Thus, by providing the light emitting element 510a and the light receiving element 510b at the central portion of the feeding chamber 36, the remaining toner amount in the feeding chamber 36 can be satisfactorily detected. That is, at an end portion of the feeding chamber 36, the developer is localized in some instances, but the localization of the developer at the central portion is small in degree, so that the remaining toner amount can be detected with high accuracy.

As shown in the circuit diagram of the remaining toner amount sensor 500 of FIG. 11, between the light emitting element 510a and the power source voltage Vcc, an unshown switch is provided. By putting the switch in an ON state, a voltage from the power source voltage Vcc is applied to the light emitting element 510a, so that the light emitting element 510a is in a conduction state. On the other hand, the light receiving element 510b is also provided with an unshown switch between itself and a power source voltage (voltage source) Vcc, and by putting the switch in an ON state, the light receiving element 510b is in a conduction state by a current depending on a light quantity detected.

To the light emitting element 510a, the power source voltage Vcc and a current limiting resistor R1 are connected, and the light emitting element 510a emits light by a current determined by the current limiting resistor R1. The light emitted from the light emitting element 510a passes through the space optical path Q (part (b) of FIG. 10) in the inside of the above-described developing container 32 and is received by the light receiving element 510b. To a collector terminal of the light receiving element 510b, the power source voltage Vcc is connected, and to an emitter terminal, a detection resistor R2 is connected. The light receiving element 510b which is the phototransistor receives the light emitted from the light emitting element 510a and outputs a signal (current) depending on a quantity of the received light. This signal is converted into a voltage V1 by the detection resistor R2 and is inputted to an A/D converting portion 95 of a controller 90 (see FIG. 11). That is, the light receiving element 510b changes a value (voltage value) depending on an amount of the toner (developer) accommodated in the feeding chamber 36.

The controller 90 (CPU 91) discriminates, on the basis of an inputted voltage value, whether or not the light emitting element 510b receive the light from the light emitting element 510a. The controller 90 (CPU 91) calculates a toner amount (developer amount) in the developing container 32 on the basis of a length of a time in which each light is detected by the light receiving element 510b and perspective viewed light intensity when the toner in the developing container 32 is stirred for a certain time by the stirring member 34. That is, a ROM 93 stores, in advance, a table capable of outputting a remaining toner amount from a light receiving time and the light intensity when the toner is fed by the stirring member 34, and the controller 90 predicts/calculates the remaining toner amount on the basis of an input to the A/D converting portion 95 and the table.

More specifically, as shown in part (a) of FIG. 10, the space optical path Q of the remaining toner amount sensor 500 is set so as to cross the rotation loci Tb1 and Tb2 of the stirring member 34 as viewed in an axial direction of the rotation shaft of the stirring member 34. In other words, the light emitted from the light emitting element 510a of the remaining toner amount sensor 500 passes through the inside of the rotation loci Tb1 and Tb2 of the stirring member 34 in the feeding chamber 36 as viewed in the axial direction of the stirring member 34. Further, a time in which the space optical path Q is light-blocked by the toner fed by the stirring member 34 when the stirring member 34 rotates once, i.e., a time in which the light receiving element 510b does not detect the light from the light emitting element 510a, changes depending on the remaining toner amount. Further, the intensity (received light quantity) of the light incident on the light receiving element 510b also changes depending on the remaining toner amount.

That is, the space optical path Q is liable to be blocked by the toner when the remaining toner amount is large, and therefore, a time in which the light receiving element 510b receives the light becomes short, and the received light intensity of the light received by the light receiving element 510b becomes weak (the received light amount becomes small). On the other hand, the time in which the light receiving element 510b receives the light becomes long when the remaining toner amount is small, and the received light intensity of the light received by the light receiving element 510b becomes strong (the received light amount becomes large). Accordingly, the controller 90 is capable of discriminating a remaining toner amount level in the following manner on the basis of the light receiving time and the received light intensity of the light receiving element 510b.

For example, in the case where the time in which the light receiving element 510b receives the light becomes longer than a predetermined threshold or the received light intensity of the light receiving element 510b is stronger than a predetermined threshold, as shown in part (a) of FIG. 12, discrimination that the remaining toner amount in the feeding chamber 36 of the developing container 32 is small is made. On the other hand, in the case where the time in which the light receiving element 510b receives the light becomes shorter than the predetermined threshold or the received light intensity of the light receiving element 510b is weaker than the predetermined threshold, as shown in part (b) of FIG. 12, discrimination that the remaining toner amount in the feeding chamber 36 of the developing container 32 is large is made.

[Control System of Image Forming Apparatus]

FIG. 13 is a block diagram showing a control system of the image forming apparatus 1. The controller 90 as a control means of the image forming apparatus 1 includes the CPU 91 as a calculating device, a RAM 92 used as an operation area of the CPU 91, and the ROM 93 for storing various programs. Further, the controller 90 includes an I/O interface 94 as an input/output port through which the controller 90 is connected to an external device, and an A/D converting portion 95 for converting an analog signal into a digital signal.

To an input side of the controller 90, the remaining toner amount sensor 500, a mounting sensor 53, and an open/close sensor 54 are connected. The mounting sensor 53 detects that the toner pack 40 is mounted on the supply opening 32a of the developing container 32. For example, the mounting sensor 53 is provided at the supply opening 32a and is constituted by a pressure-sensitive switch for outputting a detection signal by being pressed by the projections of the toner pack 40. Further, the open/close sensor 54 detects whether or not the discharge tray 81 is opened. The open/close sensor 54 is constituted by, for example, a pressure-sensitive switch or a magnetic sensor.

Further, to the controller 90, the operating portion 300, the image forming portion 10, and a remaining toner amount panel 400 as a notifying means capable of notifying information on the remaining toner amount are connected, and the operating portion 300 includes a display portion 301 capable of displaying various setting screens, and physical keys and the like. The display portion 301 is constituted by a liquid crystal panel, for example. The image forming portion 10 includes a motor M for driving the photosensitive drum 21, the developing roller 31, the supplying roller 33, the stirring member 34, and the like. Incidentally, a constitution in which the photosensitive drum 21, the developing roller 31, the supplying roller 33, and the stirring member 34 are driven by separate motors may also be employed.

The remaining toner amount panel 400 is provided on a right side of a front surface of a casing of the printer main assembly 100, i.e., on a side opposite from the operating portion 300 disposed on a left side, and displays information on the remaining toner amount in the developing container 32 as shown in part (b) of FIG. 1 and parts (a) to (d) of FIG. 14. In this embodiment, the remaining toner amount panel 400 is a panel member consisting of a plurality (three in this embodiment) of scales arranged vertically in parallel, and the respective scales correspond to the Low level, the Mid level, and the Full level, which are described above.

That is, as shown in part (a) of FIG. 14, in the case where only a lower scale blinks, the remaining toner amount of the developing container 32 indicates a Near Out level. As shown in part (b) of FIG. 14, in the case where only the lower scale is lighted, the remaining toner amount of the developing container 32 indicates the Low level. As shown in part (c) of FIG. 14, in the case where lower and central scales are lighted and an upper scale is turned off, the remaining toner amount of the developing container 32 indicates the Mid level. As shown in part (d) of FIG. 14, all three scales are lighted, and the remaining toner amount of the developing container 32 indicates the Full level.

The NearOut level shows the remaining toner amount of an extent such that the toner in the developing container 32 is used up soon and thus the image cannot be properly formed. The Lw level shows the remaining toner amount larger than the remaining toner amount of the NearOut level and smaller than the remaining toner amount of the Mid level. The Mid level shows the remaining toner amount larger than the remaining toner amount of the Low level and smaller than the remaining toner amount of the Full level.

Incidentally, the remaining toner amount panel 400 is not limited to the liquid crystal panel, but may be constituted by a light source such as an LED or an incandescent lamp and a diffusion lens. Further, the position of the remaining toner amount panel 400 is not limited to the right side. For example, the remaining toner amount panel 400 may be disposed on a left side which is the same as the side where the operating portion 300 is disposed. Further, a constitution in which without separately providing the remaining toner amount panel 400, the display of the scales as described in this embodiment is made at a display of the operating portion 300 may be employed. Further, when the remaining toner amount of the developing container 32 becomes the Low level, supply notification for prompting the user to supply the toner may be displayed on the operating portion 300. Further, when the toner runs out, the supply notification for prompting the user to supply the toner may also be displayed, on the operating portion 300.

Further, in this embodiment, the constitution in which the four states are displayed by the three levels was described, but the number of the scales is not limited thereto. The number of the scales may be appropriately set depending on the structure or the like of the image forming apparatus. Further, the remaining toner amount panel 400 may be constituted so as to display the remaining toner amount continuously by percentage display or gauge display. Further, notification of the remaining toner amount to the user may be carried out by voice (sound) with use of a speaker.

Further, in the examples shown in parts (a) to (d) of FIG. 14, the remaining toner amount panel 400 was described as a notifying means for notifying the remaining toner amount, but is not limited thereto. For example, the display of part (b) of FIG. 14 may display that the toner supply is needed, the display of part (c) of FIG. 14 may be display that the toner supply is not needed, and the display of part (d) of FIG. 14 may display that the toner supply is made sufficiently.

Further, the light emitting element 510a and the light receiving element 510b in this embodiment are disposed side by side along the longitudinal direction LD of the process unit 20 and are disposed on the same side relative to the feeding chamber 36 as viewed in the longitudinal direction LD. For this reason, the light emitting element 510a and the light receiving element 510b can be disposed in a compact form. Further, the light emitting element 510a and the light receiving element 510b are provided collectively on the substrate 700. For this reason, electric power can be easily supplied to the light emitting element 510a and the light receiving element 510b, and in addition, transfer of signals to the light emitting element 510a and the light receiving element 510b can be easily carried out. Therefore, the process unit 20 can be downsized.

[Light Guiding Member]

Next, a structure of the light guiding member 600 in this embodiment will be described specifically. Parts (a) and (b) of FIG. 15 are perspective views each showing the light guiding member 600 as a single component part before the light guiding member 600 is assembled, with the developing container lid 321. Part (a) of FIG. 15 shows a front side of the light guiding member 600, i.e., a side where the light guiding member 600 does not contact the developer in the developing container 32 and a side where the light guiding member 600 is exposed to the outside of the developing container 32. Part (b) of FIG. 15 shows a rear side of the light guiding member 600, i.e., a side where the light guiding member 600 contacts the developer in the developing container 32 and a side where the light guiding member 600 is exposed to an inside of the developing container 32. Detection light OP shown in parts (a) and (b) of FIG. 15 represents a representative optical path (optical axis) of the light which is emitted from the above-described light emitting element 510a and which is received by the light receiving element 510b after passing through the light guiding member 600. The above-described space optical path Q is a part of a path along which the detection light OP travels, along which the detection light OP passes through the inside space.

Parts (a) to (e) of FIG. 16 are schematic views showing the light guiding member and the detection light OP with the rear side of the light guiding member 600 as a front surface (side) as viewed in five directions in accordance with third angle projection method. Part (a) of FIG. 16 is a front view showing the rear side of the light guiding member 600. Part (b) of FIG. 16 is a side view of the light guiding member 600 as viewed from the light emitting element 510a side with respect to the longitudinal direction LD. Part (c) of FIG. 16 is a side view of the light guiding member 600 as viewed from the light receiving element 510b side with respect to the longitudinal direction LD. Part (d) of FIG. 16 is a plan view of the light guiding member 600 as viewed from above with respect to a height direction ND. Part (e) of FIG. 16 includes a plan view of the light guiding member as viewed from below with respect to the height direction ND and an enlarged view of a part A indicated by a broken line in the plan view.

Incidentally, the up-down direction used in the following description shows a direction of gravitation WD (vertical direction) in an attitude when the light guiding member 600 detects the developer amount (see FIG. 12). The direction of gravitation WD does not always coincide with a height direction ND of the light guiding member 600 described layer. Further, a direction perpendicular to both the longitudinal direction LD and the direction of gravitation WD is a horizontal direction HD.

As shown in part (a) to part (d) of FIG. 16, the light guiding member 600 is a member prepared by integrally forming the light emitting-side light guiding member 610, the light receiving-side light guiding member 620, and the frame portion 650. The light guiding member 600 is constituted by a light transmission resin material permitting transmission of the light emitted by the light emitting element 510a, and is prepared by integral molding through a molding method such as injection molding. Incidentally, the light guiding means is not limited to the light guiding member 600 prepared by integrally molding the light emitting-side light guiding member 610 and the light receiving-side light guiding member 620 through the frame portion 650, but for example, a constitution in which the light emitting-side light guiding member 610 and the light receiving-side light guiding member 620 are molded as separate members and each of these members is mounted on the developing container lid 321 may be employed.

(Frame Portion)

The frame portion 650 is a plate-like member constituting the wall surface of the developing container in combination with the developing container lid 321. The frame portion 650 includes an installation surface 680 (parts (a) and (b) of FIG. 17) of which is a surface contacting a mounting bearing surface 3211 of the developing container lid 321 described later.

(Light Emitting-Side Light Guiding Member)

The light emitting-side light guiding member 610 is a light guiding member for guiding the detection light OP emitted from the light emitting element 510*a*, on the outside of the developing container 32, into the feeding chamber 36. The light emitting-side light guiding member 610 includes an outside light guiding portion 611 projecting from a front surface 653 of the frame portion 650 toward an outside of the developing container 32 and an inside light guiding portion 612 projecting from a back surface 654 of the frame portion 650 toward an inside of the developing container 32. Above the inside light guiding portion 612, an inside upper portion 630 which is a portion extended upward from the inside light guiding portion 612 is provided. The inside upper portion 630 projects together with the inside light guiding portion 612 from the back surface 654 of the frame portion 650 toward the inside of the developing container 32.

The outside light guiding portion 611 of the light emitting-side light guiding member 610 projects toward the outside (right side of part (b) of FIG. 16) of the developing container 32 from the front surface 653 of the frame portion 650 constituting a part of the outer surface of the developing container 32. The outside light guiding portion 611 is a first projected portion in this embodiment. The inside light guiding portion 612 and the inside upper portion 630 of the light emitting-side light guiding member 610 project toward the inside (left side of part (b) of FIG. 16) of the developing container 32 from the back surface 654 of the frame portion 650 constituting a part of an inner surface of the developing container 32. The inside light guiding portion 612 and the inside upper portion 630 are a second projected portion in this embodiment. The inside light guiding portion 612 is a lower portion of the second projected portion in this embodiment, and the inside upper portion 630 is an upper portion of the second projected portion in this embodiment.

A projection direction TD of the outside light guiding portion 611 relative to the frame portion 650 and a projection direction TD of the inside light guiding portion 612 and the inside upper portion 630 relative to the frame portion 650 and a direction (direction perpendicular to both the longitudinal direction LD and the height direction ND) substantially perpendicular to the installation surface 680 which is a surface of the frame portion 650 contacting the developing container lid 321. However, the outside light guiding portion 611, the inside light guiding portion 612 or the inside upper portion 630 may project in a direction perpendicular to the installation surface 680 at an obliquely crossing angle. The projection direction TD is also an optical axis direction of the detection light OP guided from the outside light guiding portion 611 toward the inside light guiding portion 612 in the inside of the light emitting-side light guiding member 610.

A side surface of the inside upper portion 630 in this embodiment is continuous to a side surface of the inside light guiding portion 612, and the inside upper portion 630 and the inside light guiding portion 612 are formed integrally with the same material. However, the inside upper portion 630 and the inside light guiding portion 612 may be formed with different materials.

The inside upper portion 630 is different from the inside light guiding portion 612 in that the inside upper portion 630 does not have a shape provided for guiding the detection light OP, and therefore, a boundary line between the inside light guiding portion 612 and the inside upper portion 630 is illustrated as a first virtual line IL1. The first virtual line IL1 is a rectilinear line which passes through a boundary portion 611*ct* between the upper surface 611*c* of the outside light guiding portion 611 and the surface 653 of the frame portion 650 and which extends in the optical axis direction of the detection light OP from the outside light guiding portion 611 toward the inside light guiding portion 612 as viewed in the longitudinal direction LD.

That is, of the second projected portion, a portion (portion lower than the first virtual line IL1) substantially forming the optical path of the detection light OP is the inside light guiding portion 612, and a portion (portion upper them the first virtual line IL1) which does not substantially contribute to formation of the optical path of the detection light OP is the inside upper portion 630.

(Light Receiving-Side Light Guiding Member)

The light receiving-side light guiding member 620 is a light guiding member for guiding incident light through the space optical path Q to the light receiving element 510*b*, on the outside of the developing container 32. The light receiving-side light guiding member 620 includes an outside light guiding portion 621 projecting from a front surface 653 of the frame portion 650 toward an outside of the developing container 32 and an inside light guiding portion 622 projecting from a back surface 654 of the frame portion 650 toward an inside of the developing container 32. Further, above the inside light guiding portion 622, an inside upper portion 640 is a portion extended upward from the inside light guiding portion 622. The inside upper portion 640 projects together with the inside light guiding portion 622 from the back surface 654 of the frame portion 650 toward the inside of the developing container 32.

The outside light guiding portion 621 of the light receiving-side light guiding member 620 is a fourth projected portion in this embodiment which projects toward the outside (left side of part (c) of FIG. 16) of the developing container 32 from the front surface 653 of the frame portion 650 constituting a part of the outer surface of the developing container 32. The inside light guiding portion 622 and the inside upper portion 640 of the light receiving-side light guiding member 620 are a third projected portion which projects toward the inside (right side of part (c) of FIG. 16) of the developing container 32 from the back surface 654 of the frame portion 650 constituting a part of an inner surface of the developing container 32. The inside light guiding portion 622 is a lower portion of the third projected portion in this embodiment, and the inside upper portion 640 is an upper portion of the third projected portion in this embodiment.

A projection direction TD of the outside light guiding portion 621 relative to the frame portion 650 and a projection direction TD of the inside light guiding portion 622 and the inside upper portion 640 relative to the frame portion 650 and a direction (direction perpendicular to both the longitudinal direction LD and the height direction ND) substantially perpendicular to the installation surface 680 which is a surface of the frame portion 650 contacting the developing container lid 321. That is, the projection direction of the outside light guiding portion 621 of the light receiving-side light guiding member 620 relative to the frame portion 650 and the projection direction of the inside light guiding portion 622 and the inside upper portion 640 relative to the frame portion 650 are substantially the same direction as the projection direction TD of the outside light guiding portion 611 of the light emitting-side light guiding member 610, the inside light guiding portion 612, and the inside upper portion 630. However, the outside light guiding portion 621, the inside light guiding portion 622 or the inside upper portion 640 of the light receiving-side light guiding member 620 may project in a direction perpendicular to the installation surface 680 at an obliquely crossing angle. The projection direction TD is also an optical axis direction of the detection light OP guided from the outside light guiding portion 621 toward the inside light guiding portion 622 in the inside of the light receiving-side light guiding member 620.

A side surface of the inside upper portion 640 of the light receiving-side light guiding member 620 in this embodiment is continuous to a side surface of the inside light guiding portion 622, and the inside upper portion 640 and the inside light guiding portion 622 are formed integrally with the same material. However, the inside upper portion 640 may be formed with a material different from a material of the inside light guiding portion 622.

The inside upper portion 640 of the light receiving-side light guiding member 620 is different from the inside light guiding portion 622 in that the inside upper portion 640 does not have a shape provided for guiding the detection light OP, and therefore, a boundary line between the inside light guiding portion 622 and the inside upper portion 640 is illustrated as a second virtual line IL2. The second virtual line IL2 is a rectilinear line which passes through a boundary portion 621ct between the upper surface 621c of the outside light guiding portion 621 and the front surface 653 of the frame portion 650 and which extends in the optical axis direction of the detection light OP from the inside light guiding portion 622 toward the outside light guiding portion 621 as viewed in the longitudinal direction LD.

That is, of the third projected portion, a portion (portion lower than the second virtual line IL2) substantially forming the optical path of the detection light OP is the inside light guiding portion 622, and a portion (portion upper them the second virtual line IL2) which is not substantially required for forming the optical path of the detection light OP is the inside upper portion 640.

(Optical Path Design)

The outside light guiding portion 611 of the light receiving-side light guiding member 610 has an incident surface 611a (first incident surface) on which the detection light OP emitted from the light emitting element 510a is incident. The incident surface 611a is provided at an end of the outside light guiding portion 611 with respect to the projection direction TD of the outside light guiding portion 611 relative to the front surface 653 of the frame portion 650 (outer surface of the developing container 32). The light emitting element 510a (part (b) of FIG. 9) is disposed so as to oppose the incident surface 611a. The light emitted from the light emitting element 510a is diffusion light in general in many instances, and in order to rectify this diffusion light to light beams in the same direction, the incident surface 611a has a convex lens shape. This lens shape is designed in consideration of a distance between the light emitting element 510a and the incident surface 611a, and the like.

The inside light guiding portion 612 of the light emitting-side light guiding member 610 includes a reflecting surface 612b and a light emitting window 612a. The reflecting surface 612b is a surface for changing a direction of the detection light OP inside the light emitting-side light guiding member 610 by mirror-reflecting, toward the light emitting window 612a, the detection light OP which is incident on the incident surface 611a and which passes from the outside light guiding portion 611 to the inside light guiding portion 612. The light emitting window 612a is a light emergent surface (second light emergent surface) from which the detection light OP reflected by the reflecting surface 612b is emitted to the space optical path Q in the feeding chamber 36.

The inside light guiding portion 622 of the light receiving-side light guiding member 620 includes a light receiving window 622a and a reflecting surface 622b. The light receiving window 622a is an incident surface (second incident surface) through which the detection light OP which passed through the space optical path Q in the feeding chamber 36 enters the light receiving-side light guiding member 620. The reflecting surface 622b is a surface where a direction of the detection light OP is changed inside the light emitting-side light guiding member 610 by mirror-reflecting the detection light OP, incident on the light receiving window 622a, toward the outside light guiding portion 621.

The outside light guiding portion 621 of the light receiving-side light guiding member 620 includes a light emergent surface (first light emergent surface) from which the detection light OP which is incident on the light receiving window 622a of the inside light guiding portion 622 and which is changed in direction by the reflecting surface 622b is emitted toward the light receiving element 510b. The light emergent surface 621a is provided at an end of the outside light guiding portion 621 with respect to the projection direction TD of the outside light guiding portion 621 relative to the front surface 653 (part (b) of FIG. 9) is disposed so as to oppose the light emergent surface 621a of the light receiving-side light guiding member 620.

The light emitting window 612a of the light emitting-side light guiding member 610 and the light receiving window 622a of the light receiving-side light guiding member 620 are disposed so as to oppose each other. Further, between the light emitting window 612a and the light receiving window 622a, the space optical path Q along which the detection light OP passes is formed. In this embodiment, the light emitting window 612a and the light receiving window 622a oppose each other inside the developing container 32 with respect to the longitudinal direction LD. Further, in this embodiment, the direction of the space optical path Q is substantially parallel to the longitudinal direction LD of the developing container 32, but may be set at a direction different from the longitudinal direction LD. Incidentally, in this embodiment, the direction of the space optical path Q is set at the longitudinal direction LD, and the light guiding member 600 is disposed that the space optical path Q passes through a position (broken line of part (b) of FIG. 10) of a center portion 31a of the developing roller 31. By this, the influence of localization of the developer in the feeding chamber 36 is not readily exerted on the light guiding member 600, so that improvement in detection accuracy of the developer amount can be expected, but the light guiding member 600 may be disposed in another position.

(Relationship Between Stirring Member and Light Guiding Member)

Here, a structure of the stirring member 34 relating to the light guiding member 600 will be described. As shown in part (c) of FIG. 4, the stirring member 34 is provided with a wiping portion 34c including a light emitting-side wiping end 34c1 and a light receiving-side wiping end 34c2 and with an auxiliary wiping portion 34c2. The auxiliary wiping portion 34d is disposed on a downstream space of the stirring member 34 so as to overlap with the wiping portion 34c. Each of these wiping portion 34c and auxiliary wiping portion 34d is a flexible sheet. Further, as viewed in an axial direction (longitudinal direction LD) of the stirring member 34, a rotation locus Tc of the wiping portion 34c is set so as to overlap with the space optical path Q (see part (a) of FIG. 10). Incidentally, the rotation locus Tc of the wiping portion 34c is indicated as a circle of a rotation radius in the case where a state in which with respect to the rotational axis of the stirring member 34 as a center, the wiping portion 34c extends straightly without regard to the wall surface of the developing container 32 is assumed.

When the stirring member 34 is rotated, the light emitting-side wiping end 34c1 passes through the light guiding member 600 while rubbing the light emitting window 612a of the light emitting-side light guiding member 610, and the light receiving-side wiping end 34c2 passes through the light guiding member 600 while rubbing the light receiving window 622a of the light receiving-side light guiding member 620. That is, in every (one) rotation of the stirring member 34, the developer deposited on the light emitting window 612a and the light receiving window 622a is wiped by the wiping portion 34c. Further, the auxiliary wiping portion 34d is used for adjusting a contact pressure and an entering angle of each of the light emitting window 612a and the light receiving window 622a relative to the wiping portion 34c, and is designed in consideration of shapes, a positional relationship, and the like of the light guiding member 600 and the stirring member 34. Incidentally, the auxiliary wiping portion 34d may be omitted when a wiping performance of the wiping portion 34c alone can be sufficiently ensured. Further, a constitution in which the wiping portion 34c is omitted and in which the light emitting window 612a and the light receiving window 622a of the light guiding member 600 are cleaned by the blade portions of the stirring member 34 may be employed.

As shown in an enlarged view A of part (e) of FIG. 16 which is a bottom view of the light guiding member 600, the light emitting window 612a is not a completely flat surface and has a convexly curved surface shape toward the space optical path Q side (inside of the developing container 32) in a state in which the light emitting window 612a is viewed in the height direction ND. By this, the wiping portion 34c of the stirring member 34 strongly contacts locally the neighborhood of curved apexes of the light emitting window 612a and the light receiving window 622a, and thus can strongly wipe the developer.

(Positioning and Integration of Light Guiding Member with Developing Container)

Here, a method in which the light guiding member 600 is positioned and integrated with the developing container 32 (developing container lid 321) will be described. Parts (a) and (b) of FIG. 17 are perspective views each showing the light guiding member 600 as a single component part before the light guiding member 600 is integrated with the developing container lid 321.

The developing container lid 321 has two surfaces 3212a and 3212b for positioning the light guiding member 600 with respect to the longitudinal direction LD, and two surfaces 3212c and 3212d for positioning the light guiding member 600 with respect to the height direction ND. The surfaces 3212a and 3212b oppose each other with respect to the longitudinal direction LD and extend in the height direction ND. The surfaces 3212c and 3212d oppose each other with respect to the height direction ND and extend in the longitudinal direction LD. Each of these surfaces 3212a to 3212d is provided with a rectangular opening 3212 for exposing the light guiding member 600 to the inside of the developing container 32.

The height direction ND of the light guiding member 600 is a direction perpendicular to the longitudinal direction LD and parallel to the mounting bearing surface 3211. The height direction ND does not always coincide with the direction of gravitation WD in an attitude (attitude during detection of the developer amount) when the light guiding member 600 is integrated with the developing container 32 and is assembled with the image forming apparatus 2. In this embodiment, as viewed in the longitudinal direction LD, the light guiding member 600 is inclined so that the height direction ND crosses the direction of gravitation WD at a small angle (part (a) of FIG. 10). The light guiding member 600 is inclined, so that a locus portion thereof is close to a rotation center of the stirring member 34 with respect to the horizontal direction HD and so that an upper portion thereof is spaced from the rotation center of the stirring member 34 with respect to the horizontal direction HD.

As shown in parts (a) and (b) of FIG. 17, the light guiding member 600 includes a first positioning rib 661 and a second positioning rib 662 on a surface (installation surface 680) contacting the mounting bearing surface 3211 of the developing container lid 321. The first positioning rib 661 and the second positioning rib 662 project from the installation surface 680 so as to project to a space inside the opening 3212 of the mounting bearing surface 3211 in a state in which the installation surface 680 contacts the mounting bearing surface 3211.

The first positioning rib 661 has a surface 661a for determining a position with respect to the longitudinal direction LD and surfaces 661c and 661d for determining a position with respect to the height direction ND. The second developing rib 662 has a surface 662b for determining a position with respect to the longitudinal direction LD and surfaces 662c and 662d for determining a position with respect to the height direction ND. By engagement between the surfaces 3212a and 3212b of the developing container lid 321 and the surfaces 661a and 662b of the light guiding member 600, the position of the light guiding member 600 relative to the developing container lid 321 with respect to the longitudinal direction is determined. By engagement between the surfaces 3212c and 3212d of the developing container lid 321 and the surfaces 661c, 662c, 661d and 662d, the position of the light guiding member 600 relative to the developing container lid 321 with respect to the height direction ND is determined.

The developing container lid 321 and the light guiding member 600 are integrated with each other by welding a director portion 670 of the light guiding member 600 to the mounting bearing surface 3211 of the developing container lid 321 through ultrasonic welding. The director portion 670 is a welding margin provided in a rectangular region surrounding a periphery of the opening 3212 of the developing container lid 321 (see also part (b) of FIG. 15). Further, as described above, the developing container 32 is integrated by bonding the developing container frame 320 and the developing container lid 321 together.

Incidentally, in this embodiment, by the ultrasonic welding, the developing container lid 321 and the light guiding member 600 are integrated with each other (bonded together), but an integrating method (bonding method) is not limited thereto. If the method is a method in which the light guiding member 600 and the developing container lid 321 can be integrated with each other with no gap, for example, the light guiding member 600 and the developing container lid 321 may be integrated with each other with a double-side tape or an adhesive.

(Details of Light Emitting-Side Upper Portion and Light Receiving-Side Upper Portion)

Next, constitutions of the inside upper portion 630 of the light emitting-side light guiding member 610 and the inside upper portion 640 of the light emitting-side light guiding member 620 in this embodiment will be described. FIG. 18 is a perspective view showing a back side of the light guiding member 600 mounted on the developing container lid 321 as viewed from the inside of the feeding chamber 36 in which the developer is accommodated.

First, the inside upper portion 630 of the light emitting-side light guiding member 610 will be described. The inside upper portion 630 has a first side surface 630a extending upward from the light emitting window 612a along the height direction ND and a second side surface 630b extending upward from the reflecting surface 612b along the height direction ND. Further, the inside upper portion 630 has an upper surface 630c (first upper surface) for connecting an upper end of the first side surface 630a and the second side surface 630b with the back surface 654 (wall surface of the developing container 32) of the frame portion 650. The upper surface 630c covers a region enclosed by the light emitting window 612a, the reflecting surface 612b, and the back surface 654 of the frame portion 650 as viewed in the height direction ND. In other words, the upper surface of the second projected portion covers a region enclosed by the wall surface, the first light emergent surface, and the first reflecting surface as viewed in the height direction perpendicular to the longitudinal direction and parallel to the wall surface of the container.

The upper surface 630c of the inside upper portion 630 is a surface crossing the direction of gravitation WD and the height direction ND. The upper surface 630c in this embodiment is perpendicular to the height direction ND or is somewhat inclined, as a draft during molding, relative to the height direction ND. An inclination direction is a direction toward a lower portion with respect to the height-direction Nd as the upper surface 630c is spaced from the back surface 654 (wall surface of the developing container) of the frame portion 650 with respect to the projection direction TD (projection direction of the second projected portion) of the inside light guiding portion 612 and the inside upper portion 630.

As shown in part (b) of FIG. 16, as viewed in the longitudinal direction LD in an attitude during the detection of the developer amount, the upper surface 630c of the inside upper portion 630 is positioned above a first extension line EL1 of the upper surface 611c of the outside light guiding portion 611 of the light emitting-side light guiding member 610. The first extension line EL1 is a virtual rectilinear line (first virtual rectilinear line) drawn along the upper surface 611c of the outside light guiding portion 611 in a state in which the first extension line EL1 is viewed in the longitudinal direction LD. The first virtual line EL1 is paralleled to and is on the upper surface 611c of the outside light guiding portion 611 as viewed in the longitudinal direction LD. Incidentally, the light emitting window 612a forming the optical path of the detection light OP is positioned below the first extension line EL1 as viewed in the longitudinal direction LD.

Further, as shown in part (b) of FIG. 16, the upper surface 630c of the inside upper portion 630 is positioned above the above-described first virtual line IL1 as viewed in the longitudinal direction LD in the attitude during the developer amount detection. The upper surface 630c is positioned above a horizontal plane, perpendicular to the direction of gravitation WD, passing through a boundary portion 611ct between the upper surface 611c of the outside light guiding portion 611 and the front surface 653 of the frame portion 650. As described above, a region on an upper side than the first virtual line IL1 is a portion which does not substantially contribute to the formation of the optical path of the detection light OP.

Here, the outside light guiding portion 611 of the light emitting-side light guiding member 610 is formed in a quadrangular prism shape extending in the projection direction TD or in a truncated pyramid shape provided with a same shaft such that a cross-sectional area becomes smaller toward the outside of the developing container 32 in order to improve a parting property during the molding. For that reason, inside the developing container 32, the first extension line EL1 of the upper surface 611c of the outside light guiding portion 611 overlaps with the first virtual line IL1 or is positioned above the first virtual line IL1. Accordingly, as viewed in the longitudinal direction LD in the attitude during the developer amount detection, the upper surface 630c of the inside upper portion 630 of the light emitting-side light guiding member 610 is positioned above the first extension line EL1 of the upper surface 611c of the outside light guiding portion 611.

That is, in this embodiment, above the inside light guiding portion 612 (first lower portion) of the light emitting-side light guiding member 610, the inside upper portion (first upper portion) which is not originally needed to form the optical path of the detection light OP is provided. Further, the upper surface 630c (first upper surface) of the inside upper portion 630 was positioned above the first extension line EL1 (first virtual rectilinear line) drawn along the upper surface 611c of the outside light guiding portion 611 of the light emitting-side light guiding member 610. In other words, the upper surface 630c (first upper surface) of the inside upper portion 630 is positioned above the first extension line EL1 (first virtual rectilinear line) as viewed in the direction crossing both the projection direction TD (first direction) of the outside light guiding portion 611 (first projected portion) relative to the wall surface of the developing container 32 and the direction of gravitation WD. Here, the direction crossing both the first direction and the direction of gravitation WD may preferably be a direction which is perpendicular to the direction of gravitation WD and which extends along the wall surface of the developing container 32 provided with the light guiding member 600. Further, the direction crossing both the first direction and the direction of gravitation WD may preferably be a direction in which the inside light guiding portions 612 and 622 (second projected portion and third projected portion) oppose each other inside the developing container 32, and is the longitudinal direction LD of the developing container 32 in this embodiment.

Next, the inside upper portion 640 of the light emitting-side light guiding member 620 will be described. The inside upper portion 640 has a first side surface 640a extending upward from the light receiving window 622a along the height direction ND and a second side surface 640b extending upward from the reflecting surface 622b along the height direction ND. Further, the inside upper portion 640 has an upper surface 640c (second upper surface) for connecting an upper end of the first side surface 640a and the second side surface 640b with the back surface 654 (wall surface of the developing container 32) of the frame portion 650. The upper surface 640c covers a region enclosed by the light receiving window 622a, the reflecting surface 622b, and the back surface 654 of the frame portion 650 as viewed in the height direction ND. In other words, the upper surface of the third projected portion covers a region enclosed by the wall surface, the second light surface, and the second reflecting surface as viewed in the height direction perpendicular to the longitudinal direction and parallel to the wall surface of the container.

The upper surface 640c of the inside upper portion 640 is a surface crossing the direction of gravitation WD and the height direction ND. The upper surface 640c in this embodiment is perpendicular to the height direction ND or is somewhat inclined, as a draft during molding, relative to the height direction ND. An inclination direction is a direction toward a lower portion with respect to the height-direction Nd as the upper surface 640c is spaced from the back surface 654 (wall surface of the developing container) of the frame portion 650 with respect to the projection direction TD (projection direction of the second projected portion) of the inside light guiding portion 612 and the inside upper portion 640.

As shown in part (c) of FIG. 16, as viewed in the longitudinal direction LD in an attitude during the detection of the developer amount, the upper surface 640c of the inside upper portion 640 is positioned above a second extension line EL2 of the upper surface 621c of the outside light guiding portion 621 of the light emitting-side light guiding member 620. The second extension line EL2 is a virtual rectilinear line (second virtual rectilinear line) drawn along the upper surface 621c of the outside light guiding portion 621 in a state in which the second extension line EL2 is viewed in the longitudinal direction LD. The first virtual line IL2 is paralleled to and is on the upper surface 621c of the outside light guiding portion 621 as viewed in the longitudinal direction LD. Incidentally, the light receiving window 622a forming the optical path of the detection light OP is positioned below the second extension line EL2 as viewed in the longitudinal direction LD.

Further, as shown in part (c) of FIG. 16, the upper surface 640c of the inside upper portion 640 is positioned above the above-described second virtual line IL2 as viewed in the longitudinal direction LD in the attitude during the developer amount detection. The upper surface 640c is positioned above a horizontal plane, perpendicular to the direction of gravitation WD, passing through a boundary portion 621ct between the upper surface 621c of the outside light guiding portion 621 and the front surface 653 of the frame portion 650. As described above, a region on an upper side than the second virtual line IL2 is a portion which does not substantially contribute to the formation of the optical path of the detection light OP.

Here, the outside light guiding portion 621 of the light emitting-side light guiding member 620 is formed in a quadrangular prism shape extending in the projection direction TD or in a truncated pyramid shape provided with a same shaft such that a cross-sectional area becomes smaller toward the outside of the developing container 32 in order to improve a parting property during the molding. For that reason, inside the developing container 32, the second extension line EL2 of the upper surface 621c of the outside light guiding portion 621 overlaps with the second virtual line IL2 or is positioned above the second virtual line IL2. Accordingly, as viewed in the longitudinal direction LD in the attitude during the developer amount detection, the upper surface 640c of the inside upper portion 640 of the light receiving-side light guiding member 620 is positioned above the second extension line EL2 of the upper surface 621c of the outside light guiding portion 621.

That is, in this embodiment, above the inside light guiding portion 622 (second lower portion) of the light receiving-side light guiding member 620, the inside upper portion (first upper portion) which is not originally needed to form the optical path of the detection light OP is provided. Further, the upper surface 640c (second upper surface) of the inside upper portion 640 was positioned above the second extension line EL2 (second virtual rectilinear line) drawn along the upper surface 621c of the outside light guiding portion 621 of the light receiving-side light guiding member 620. In other words, the upper surface 640c (second upper surface) of the inside upper portion 640 is positioned above the second extension line EL2 (second virtual rectilinear line) as viewed in the direction crossing both the projection direction TD (second direction) of the outside light guiding portion 621 (second projected portion) relative to the wall surface of the developing container 32 and the direction of gravitation WD. Here, the direction crossing both the second direction and the direction of gravitation WD may preferably be a direction which is perpendicular to the direction of gravitation WD and which extends along the wall surface of the developing container 32 provided with the light guiding member 600. Further, the direction crossing both the second direction and the direction of gravitation WD may preferably be a direction in which the inside light guiding portions 612 and 622 (second projected portion and third projected portion) oppose each other inside the developing container 32, and is the longitudinal direction LD of the developing container 32 in this embodiment.

Advantage of this Embodiment

When the developer in the feeding chamber 36 is stirred by the stirring member 34, the developer is deposited on the upper surfaces 630c and 640c of the inside upper portions 630 and 640 of the light emitting-side light guiding member 610 and the light receiving-side light guiding member 620, respectively, by gravitation and inertial force. When a deposition amount of the developer becomes large, by an electrostatic force, a liquid cross-linking force, and the like which action between developer particles, the developer becomes aggregate and grows, so that there is a possibility that the aggregate is extended to and deposited on the first side surfaces 630a and 640a of the inside upper portions 630 and 640, for example.

Here, in the conventional constitution in which the inside upper portions 630 and 640 of the light emitting-side light guiding member 610 and the light receiving-side light guiding member 620 are not provided, the upper surfaces of the inside light guiding portions 612 and 622 (upward surfaces thereof at positions of the first virtual line IL1 and the second virtual line IL2) are exposed to the inside of the feeding chamber 36. In this constitution, there is a possibility that the aggregate of the developer which is deposited on the upper surfaces of the inside light guiding portions 612 and 622 and which then grows on the upper surfaces reaches the light emitting window 612 and the light receiving window 622a which are adjacent to the upper surfaces and then is deposited on the light emitting window 612a or the light receiving window 622a. In this case, there was a possibility that detection accuracy of the developer amount is lowered due to black of the optical path of the detection light OP by the developer deposited on the light emitting window 612a or the light receiving window 622a.

On the other hand, in this embodiment, the upper surface 620c of the inside upper portion 630 of the light emitting-side light guiding member 610 is positioned above the first extension line EL1 of the upper surface 611c of the outside light guiding portion 611 (part (b) of FIG. 16). Further, the upper surface 640c of the inside upper portion 640 of the light receiving-side light guiding member 620 is positioned above the second extension line EL2 of the upper surface 621c of the container light guiding portion 621 (part (c) of FIG. 16). For this reason, even in the case where the developer is deposited on the upper surfaces 630c and 640c and grows as the aggregate, the aggregate does not readily reach the light emitting window 612a or the light receiving window 622a. As a result, a degree of the possibility that the optical path of the detection light OP is blocked by the developer deposited on the light emitting window 612a or the light receiving window 622a is reduced.

Accordingly, by the constitution of this embodiment, it is possible to suppress a lowering in detection accuracy of the remaining toner amount sensor. That is, erroneous detection (lowering in detection accuracy) of the developer amount due to shortening of a time in which the light receiving element 510b receives the detection light OP (or due to a decrease in received light intensity) by the block of the light emitting window 612a or the light receiving window 622a with the developer at an unexpected timing can be reduced.

Further, in this embodiment, the erroneous detection of the developer amount can be reduced by a simple constitution such that with the light emitting-side light guiding member 610 and the light receiving-side light guiding member 620, the inside upper portions 630 and 640 are integrally molded by a material which is the same as the material of the inside light guiding portions 612 and 622.

Incidentally, with a longer distance between the upper surface 630c of the inside upper portion 630 of the light emitting-side light guiding member 610 and the light emitting window 612a with respect to the height direction ND, the aggregate of the developer growing from the upper surface 630c does not readily reach the light emitting window 612a. Similarly, with a longer distance between the upper surface 640c of the inside upper portion 640 of the light receiving element light guiding member 620 and the light receiving window 622a with respect to the height direction ND, the aggregate of the developer growing from the upper surface 640c does not readily reach the light receiving window 622a. Accordingly, as the upper surfaces 630c and 640c are spaced from the light emitting windows 612a and the light receiving window 622a, respectively, the erroneous detection of the developer amount can be reduced with a reliability.

Specifically, a height of the second projected portion in an adjacent position to the frame portion 650 is set at, for example, not less than 120%, preferably not less than 150%, of a height of the first projected portion (see part (b) of FIG. 16). The height of the second projected portion is a distance from the lower surface 612f of the inside light guiding portion 612 to the upper surface 630c of the inside upper portion 630 with respect to the height direction ND, and the height of the first projected portion is a distance from the lower surface 611f of the outside light guiding portion 611 to the upper surface 611c of the outside light guiding portion 611 with respect to the height direction ND. Further, as viewed in the longitudinal direction LD, entirety of the upper surface 630c of the inside upper portion 630 may suitably be spaced upward by at least 2 mm, preferably 5 mm or more, from the first extension line EL1. By this, a distance from the upper surface 630c to an upper edge of the light emitting window 612a is ensured.

Similarly, a height of the third projected portion in an adjacent position to the frame portion 650 is set at, for example, not less than 120%, preferably not less than 150%, of a height of the fourth projected portion (see part (c) of FIG. 16). The height of the third projected portion is a distance from the lower surface 622f of the inside light guiding portion 622 to the upper surface 640c of the inside upper portion 640 with respect to the height direction ND, and the height of the first projected portion is a distance from the lower surface 621f of the outside light guiding portion 621 to the upper surface 621c of the outside light guiding portion 621 with respect to the height direction ND. Further, as viewed in the longitudinal direction LD, entirety of the upper surface 640c of the inside upper portion 640 may suitably be spaced upward by at least 2 mm, preferably 5 mm or more, from the second extension line EL2. By this, a distance from the upper surface 640c to an upper edge of the light receiving window 622a is ensured.

In the case where actual positions of the upper surfaces 630c and 640c of the inside upper portions 630 and 640 are determined, the inside upper portions 630 and 640 may only be required to be optimally desired in consideration of an aggregation characteristic of the developer, interference with other component parts, sink marks of the light guiding member 600, and the like.

Modified Embodiment

Next, a modified embodiment of the first embodiment will be described. FIG. 19 is a perspective view showing a back side of a light guiding member 600 provided on the developing container lid 321 as viewed from the inside of the feeding chamber 36. As shown in FIG. 19, the inside upper portions 630 and 640 of the light emitting-side light guiding member 610 and the light receiving-side light guiding member 620 are constituted as separate members from the inside light guiding portions 612 and 622, respectively, and are fixed to the inside light guiding portions 612 and 622, respectively. For example, the lower surface 630d of the inside upper portion 630 of the light emitting-side light guiding member 610 is bonded to the upper surface 612c of the inside light guiding portion 612 by an adhesive means such as a double-side tape or an adhesive. Further, the lower surface 640d of the inside upper portion 640 of the light receiving-side light guiding member 620 is bonded to the upper surface 622c of the inside light guiding portion 622 by the adhesive means such as the double-side tape or the adhesive. Incidentally, a bonding method of the inside upper portions 630 and 640 to the inside light guiding portions 612 and 622 is not limited to the adhesive bonding, but may be mechanical bonding such as snap-fitting or welding such as ultrasonic welding.

Thus, when the inside upper portions 630 and 640 of the light emitting-side light guiding member 610 and the light receiving-side light guiding member 620 are constituted as the separate members from the inside light guiding portions 612 and 622, respectively, the following advantage can be obtained. The inside upper portions 630 and 640 are portions which do not contribute to the formation of the optical path of the detection light OP, and therefore, even when the inside upper portions 630 and 640 are prepared separately from other portions of the light guiding member 600, a light guiding performance of the light guiding member 600 is maintained. Further, in the first embodiment, the light guiding member 600 is made thick by the inside upper portions 630 and 640, and correspondingly, there is a need to pay attention to occurrence of the sink marks during the molding. On the other hand, in this modified embodiment, the occurrence of the sink marks due to the increase in thickness is suppressed. Accordingly, by this modified embodiment, it is possible to suppress the occurrence of the sink marks when the portions of the light guiding member 600 excluding the inside upper portions 630 and 640 are molded, while maintaining the light guiding performance of the light guiding member 600.

Further, there is no need that the material of the inside upper portions 630 and 640 of the light emitting-side light guiding member 610 and the light receiving-side light guiding member 620 is the same as the material of the inside light guiding portions 612 and 622. The inside upper portions 630 and 640 can be formed with a material (for example, matted black polyethylene resin material or polypropylene resin material) lower in light transmission property of the detection light OP than the inside light guiding portions 612 and 622. Or, onto the surfaces of the inside upper portions 630 and 640 formed with the same material as the material of the inside light guiding portions 612 and 622, black paint blocking the detection light OP may be applied. By this, stray light via the inside upper portions 630 and 640 is reduced, so that erroneous detection of the developer amount due to the stray light can be suppressed.

Second Embodiment

A second embodiment of the present invention will be described. This embodiment is different from the first embodiment in positional relationship of the inside upper portions 630 and 640 of the light emitting-side light guiding member 610 and the light receiving-side light guiding member 620 with the inside light guiding portions 612 and 622. Other constitutions of the image forming apparatus 1 and the process unit 20 are common to the first embodiment and the second embodiment. In the following, elements represented by the reference numerals or symbols common to the first embodiment and the second embodiment have constitutions and functions which are substantially the same as those described in the first embodiment, and a portion different from the first embodiment will be principally described.

FIG. 20 is a perspective view showing a back side of the light guiding member 600 mounted on the developer container lid 321 as viewed from the inside of the feeding chamber 36. As shown in FIG. 20, between the inside upper portion 630 and the inside light guiding portion 612 of the light emitting-side light guiding member 610, a slit 615 (first slit) is provided, and between the inside upper portion 640 and the inside light guiding portion 622 of the light receiving-side light guiding member 620, a slit 625 (second slit) is provided.

These slits 615 and 625 extend in a direction crossing the direction of gravitation WD in a state in which the process unit 20 is provided in the image forming apparatus 1, i.e., in an attitude during the developer amount detection (see FIG. 12). The slit 615 is a first space formed between the lower surface 630d of the inside upper portion 630 (first upper portion) of the light emitting-side light guiding member 610 and the upper surface 612c of the inside light guiding portion 612 (first lower portion). The slit 625 is a second space formed between the lower surface 640d of the inside upper portion 640 (second upper portion) of the light receiving-side light guiding member 620 and the upper surface 622c of the inside light guiding portion 622 (second lower portion).

By the slit 615, the inside light guiding portion 612 and the inside upper portion 630 of the light emitting-side light guiding member 610 are separated from each other, and therefore, as regards the detection light OP, the stray light traveling from the inside light guiding portion 612 and finally reaching the light receiving element 510b through the inside upper portion 630 is suppressed. Similarly, by the slit 625, the inside light guiding portion 622 and the inside upper portion 640 of the light receiving-side light guiding member 620 are separated from each other, and therefore, as regards the detection light OP, the tray light traveling from the inside upper portion 640 and finally reaching the light receiving element 510b through the inside light guiding portion 622 is suppressed.

Incidentally, the lower surface 630d of the inside upper portion 630 of the light emitting-side light guiding member 610 and the upper surface 612c of the inside light guiding member 612 are not required to establish a parallel relationship. In this embodiment, by the draft during the molding, the lower surface 630d of the inside upper portion 630 and the upper surface 612c of the inside light guiding portion 612 are inclined relative to each other. That is, as viewed in the longitudinal direction as those portions are spaced from the back surface 654 of the frame portion 650 with respect to the projection direction of the inside upper portion 630 and the inside light guiding portion 612 relative to the frame portion 650, a distance between the lower surface 630d of the inside upper portion 630 and the upper surface 612c of the inside light guiding portion 612 is increased.

Similarly, the lower surface 640d of the inside upper portion 640 of the light emitting-side light guiding member 620 and the upper surface 622c of the inside light guiding member 622 are not required to establish a parallel relationship. In this embodiment, by the draft during the molding, the lower surface 640d of the inside upper portion 640 and the upper surface 622c of the inside light guiding portion 622 are inclined relative to each other.

Incidentally, a width of each of the slits 615 and 625 may preferably be narrow in order to prevent that the aggregate of the developer grows from the developer, as a starting point, entered the slit (615, 625) and then is deposited on the light emitting window 612a (or the light receiving window 622a). In this embodiment, in consideration of a molding property (parting property) depending on the draft during the molding, a minimum width (width in a position adjacent to the back surface 654 of the frame portion 650) of each of the slits 615 and 625 is designed with a nominal width of 1 mm. The present invention is not limited to this. For example, when a developer which does not readily aggregate is employed, in consideration of the molding property, the width of each of the slits 615 and 625 may be set much broader.

Also in this embodiment, as viewed in the longitudinal direction LD in the attitude during the developer amount detection, the upper surface 630c of the inside upper portion 630 of the light emitting-side light guiding member 610 is positioned above the first extension line EL1 of the upper surface 611c of the outside light guiding portion 611 of the light emitting-side light guiding member 610. Further, as viewed in the longitudinal direction LD in the attitude during the developer amount detection, the upper surface 640c of the inside upper portion 640 of the light receiving-side light guiding member 620 is positioned above the second extension line EL2 of the upper surface 621c of the outside light guiding portion 621 of the light receiving-side light guiding member 620. Accordingly, similarly as in the first embodiment, it is possible to reduce the possibility that the aggregate of the developer grows from the upper surfaces 612c and 622c, as the start points, of the inside light guiding portions 612 and 622 and then reaches the light emitting window 612a and the light receiving window 622a. By this, the erroneous detection (lowering in detection accuracy) of the developer by the remaining toner amount sensor 500 can be suppressed.

In addition, according to this embodiment, the slits 615 and 625 are provided between inside light guiding portion 612 and the inside upper portion 630 and between the inside light guiding portion 622 and the inside upper portion 640, respectively, so that the erroneous detection of the developer amount due to the stray light can be suppressed.

Incidentally, the inside upper portion 630 of the light emitting-side light guiding member 610 may be provided as a separate member from the inside light guiding portion 612, and the inside upper portion 640 of the light receiving-side light guiding member 620 may be provided as a separate member from the inside light guiding portion 622. By this modified embodiment, while maintaining the light guiding performance of the light guiding member 600, the occurrence of the sink marks when the portions of the light guiding member 600 excluding the inside upper portions 630 and 640 are molded can be suppressed. Further, the inside upper portions 630 and 640 are formed with the material through which the detection light OP does not readily transmit them through the inside light guiding portions 612 and 622, so that the erroneous detection of the developer amount due to the stray light can be further suppressed.

Third Embodiment

A third embodiment of the present invention will be described. This embodiment is different from the first embodiment in positional relationship of the inside upper portions 630 and 640 of the light emitting-side light guiding member 610 and the light receiving-side light guiding member 620 with the inside light guiding portions 612 and 622. Other constitutions of the image forming apparatus 1 and the process unit 20 are common to the first to third embodiments. In the following, elements represented by the reference numerals or symbols common to the first to third embodiments have constitutions and functions which are substantially the same as those described in the first and second embodiments, and a portion different from the first and second embodiments will be principally described.

FIG. 21 is a perspective view showing a back side of the light guiding member 600 mounted on the developer container lid 321 as viewed from the inside of the feeding chamber 36.

FIG. 21 is a perspective view showing a back side of a light guiding member 600 mounted on the developing container lid 321 as viewed from the inside of the feeding chamber 36. Parts (a) to (c) of FIG. 22 are schematic views showing the light guiding member 600 as a single component part. Part (a) of FIG. 22 is a front view of the light guiding member 600. Part (b) of FIG. 22 is an enlarged view of a light emitting-side region B in part (a) of FIG. 22. Part (c) of FIG. 22 is an enlarged view of a light receiving-side region C in part (a) of FIG. 22. Parts (a) to (c) of FIG. 23 are schematic views showing the light guiding member 600 as viewed in three directions by third angle projection. In FIG. 23, part (a) shows a front view of the light guiding member 600 on a back side, part (b) shows a side view of the light guiding member 600 on a light emitting element 610a side with respect to the longitudinal direction LD, and part (c) shows a side view of the light guiding member 600 on a light receiving element 510b side with respect to the longitudinal direction LD.

As shown in FIG. 21, an inside upper portion 630 of a light emitting-side light guiding member 610 includes a first side surface 631a (first offset surface) positioned above the light emitting window 612a and a second side surface 631b positioned above the reflecting surface 612b. Further, the inside upper portion 630 includes an upper surface 631c (first upward surface) positioned above the first side surface 631a and the second side surface 631b and an end surface 631e (first end surface) provided at an end of the installation surface 680 of the frame portion 650 with respect to the normal direction (projection direction TD). The upper surface 631c is a surface extending in a direction crossing the direction of gravitation in the attitude during the developer amount detection (see FIG. 12). The end surface 631e is adjacent to each of the first side surface 631a and the second side surface 631b and is disposed between the first side surface 631a and the second side surface 631b with respect to the longitudinal direction LD.

As shown in part (b) of FIG. 22, the first side surface 631a and the end surface 631e are disposed so as to be offset toward a base side (upper side in the figure) of the inside light guiding portion 612 with respect to the projection direction TD so that a state in which these surfaces are projected toward the light emitting window 612a is not formed as viewed in the height direction ND. By this, the first side surface 631a or the end surface 631e does not prevent wiping of the light emitting window 612 by the above-described wiping portion 34c of the stirring member 34.

Further, the end surface 630e surface-contacts the flexible sheets such as the first plate portion 34b1 and the second blade portion 34b2 of the stirring member 34, so that breakage such as tear of the sheet can be suppressed. Incidentally, a rib portion forming the second side surface 631b is for enlarging a surface area of the end surface 631e, and for example, in the case where a sheet material which is thick at the blade portion 34b of the stirring member 34 and which is resistant to the tear, the end surface 631e and the second side surface 631b may be omitted.

The upper surface 631c includes an inclined surface 631s inclined downward in the direction of gravitation toward an end side of the inside upper portion 630 with respect to the projection direction TD. Further, an inclination angle of the inclined surface 641s is designed so that in the attitude during the developer amount detection (see FIG. 12), an angle formed between the inclined surface 641s and the horizontal surface is not less than an angle of repose. Thus, at least a part of the upper surface 631c is made the inclined surface inclined relative to the horizontal surface, so that deposition itself of the developer on the upper surface 631c of the inside upper portion 630 can be suppressed. Accordingly, the upper surface 630c of the inside upper portion 630 in the first and second embodiments may be inclined as in the case of the inclined surface in this embodiment. Incidentally, the first side surface 631a and the second side surface 631b are larger in angle formed between itself and the horizontal surface than the upper surface 631c is.

Further, as shown in part (b) of FIG. 23, in the case where the upper surface 631c of the inside upper portion 630 is viewed in the longitudinal direction LD in the attitude during the developer amount detection, the upper surface

631*c* is positioned above the first extension line EL1 of the upper surface 611*c* of the outside light guiding portion 611 of the light emitting-side light guiding member 610.

As shown in FIG. 21, an inside upper portion 640 of a light receiving-side light guiding member 620 includes a first side surface 641*a* (second offset surface) positioned above the light receiving window 622*a* and a second side surface 641*b* positioned above the reflecting surface 622*b*. Further, the inside upper portion 640 includes an upper surface 641*c* (first upward surface) positioned above the first side surface 641*a* and the second side surface 641*b* and an end surface 641*e* (second end surface) provided at an end of the installation surface 680 of the frame portion 650 with respect to the normal direction (projection direction TD). The upper surface 641*c* is a surface extending in a direction crossing the direction of gravitation in the attitude during the developer amount detection (see FIG. 12). The end surface 641*e* is adjacent to each of the first side surface 641*a* and the second side surface 641*b* and is disposed between the first side surface 641*a* and the second side surface 641*b* with respect to the longitudinal direction LD.

As shown in part (c) of FIG. 22, the first side surface 641*a* and the end surface 641*e* are disposed so as to be offset toward a base side (upper side in the figure) of the inside light guiding portion 622 with respect to the projection direction TD so that a state in which these surfaces are projected toward the light receiving window 622*a* is not formed as viewed in the height direction ND. By this, the first side surface 641*a* or the end surface 641*e* does not prevent wiping of the light receiving window 622 by the above-described wiping portion 34*c* of the stirring member 34.

Further, the end surface 640*e* surface-contacts the flexible sheets such as the first plate portion 34*b*1 and the second blade portion 34*b*2 of the stirring member 34, so that breakage such as tear of the sheet can be suppressed. Incidentally, a rib portion forming the second side surface 641*b* is for enlarging a surface area of the end surface 641*e*, and for example, in the case where a sheet material which is thick at the blade portion 34*b* of the stirring member 34 and which is resistant to the tear, the end surface 641*e* and the second side surface 641*b* may be omitted.

The upper surface 641*c* includes an inclined surface 641*s* inclined downward in the direction of gravitation toward an end side of the inside upper portion 640 with respect to the projection direction TD. Further, an inclination angle of the inclined surface 641*s* is designed so that in the attitude during the developer amount detection (see FIG. 12), an angle formed between the inclined surface 641*s* and the horizontal surface is not less than an angle of repose. Thus, at least a part of the upper surface 641*c* is made the inclined surface inclined relative to the horizontal surface, so that deposition itself of the developer on the upper surface 641*c* of the inside upper portion 640 can be suppressed. Accordingly, the upper surface 640*c* of the inside upper portion 640 in the first and second embodiments may be inclined as in the case of the inclined surface in this embodiment. Incidentally, the first side surface 641*a* and the second side surface 641*b* are larger in angle formed between itself and the horizontal surface than the upper surface 641*c* is.

Further, as shown in part (c) of FIG. 23, in the case where the upper surface 641*c* of the inside upper portion 640 is viewed in the longitudinal direction LD in the attitude during the developer amount detection, the upper surface 641*c* is positioned above the second extension line EL2 of the upper surface 621*c* of the outside light guiding portion 621 of the light receiving-side light guiding member 620.

Incidentally, the angle of repose changes depending on the developer, and therefore, the inclination angles of the inclined surfaces 631*s* and 641*s* provided as parts of the upper surfaces 631*c* and 641*c* of the inside upper portions 630 and 640 of the light emitting-side light guiding member 610 and the light receiving-side light guiding member 620, respectively, are appropriately changeable according to a characteristic of the developer. Even when the inclination angle of each of the inclined surfaces 631*s* and 641*s* is less than the angle of repose, if the angle formed between the inclined surface (631*s*, 641*s*) and the horizontal surface is larger than the angle formed between the upper surface (612*c*, 622*c*) and the horizontal surface, the action of suppressing the deposition of the developer can be obtained.

Also in this embodiment, as viewed in the longitudinal direction LD in the attitude during the developer amount detection, the upper surface 631*c* of the inside upper portion 630 of the light emitting-side light guiding member 610 is positioned above the first extension line EL1 of the upper surface 611*c* of the outside light guiding portion 611 of the light emitting-side light guiding member 610. Further, as viewed in the longitudinal direction LD in the attitude during the developer amount detection, the upper surface 641*c* of the inside upper portion 640 of the light receiving-side light guiding member 620 is positioned above the second extension line EL2 of the upper surface 621*c* of the outside light guiding portion 621 of the light receiving-side light guiding member 620. Accordingly, similarly as in the first embodiment, it is possible to reduce the possibility that the aggregate of the developer grows from the upper surfaces 612*c* and 622*c*, as the start points, of the inside light guiding portions 612 and 622 and then reaches the light emitting window 612*a* and the light receiving window 622*a*. By this, the erroneous detection (lowering in detection accuracy) of the developer by the remaining toner amount sensor 500 can be suppressed.

In addition, according to this embodiment, the upper surfaces 631*c* and 641*c* of the inside upper portions 630 and 640 are provided with the inclined surfaces 631*s* and 641*s*, respectively, and therefore, the deposition itself of the developer on each of the upper surfaces 631*c* and 641*c* can be suppressed. By this, erroneous detection of the developer amount by the remaining toner amount sensor 500 can be further suppressed.

Further, at ends of the inside upper portions 630 and 640, the end surfaces 631*e* and 641*e* with which the first blade portion 34*b*1 and 34*b*2 of the stirring member 34 consisting of the sheet material are in surface contact, so that the breakage such as the tear of the sheet material can be suppressed.

Incidentally, the inside upper portion 630 of the light emitting-side light guiding member 610 may be provided as a separate member from the inside light guiding portion 612, and the inside upper portion 640 of the light receiving-side light guiding member 620 may be provided as a separate member from the inside light guiding portion 622. By this modified embodiment, while maintaining the light guiding performance of the light guiding member 600, the occurrence of the sink marks when the portions of the light guiding member 600 excluding the inside upper portions 630 and 640 are molded can be suppressed. Further, the inside upper portions 630 and 640 are formed with the material through which the detection light OP does not readily transmit them through the inside light guiding portions 612 and 622, so that the erroneous detection of the developer amount due to the stray light can be further suppressed.

Fourth Embodiment

A fourth embodiment of the present invention will be described. This embodiment is different from the first to third embodiments in shape of a part of the frame portion 650 of the light guiding member 600. Other constitutions of the image forming apparatus 1 and the process unit 20 are common to the first to fourth embodiments. In the following, elements represented by the reference numerals or symbols common to the first to third embodiments and the second embodiment have constitutions and functions which are substantially the same as those described in the first to third embodiments, and a portion different from the first embodiment will be principally described.

In the constitutions of the remaining toner amount sensors 500 described in the first to third embodiments, a part of the detection light OP emitted from the light emitting element 510a enters the light guiding member 600 through a portion other than the incident surface 611a of the light guiding member 600 in some instances. Such light becomes stray light passing through a path different from a designed optical path illustrated in part (a) of FIG. 15 to part (d) of FIG. 16 and then reaches the light receiving element 510b in some instances. When a light quantity of the stray light reaching the light receiving element 510b is large, erroneous detection of the developer amount such that a light transmission time is detected longer than an assumed time can occur.

FIG. 24 is a schematic view of the light guiding member 600 mounted in the developing container 32 as viewed from the outside of the developing container 32 (the developer container lid 321). As shown in FIG. 24, the frame portion 650 of the light guiding member 600 includes a first surface portion 651 and a retracted portion 655.

The flat surface portion 651 has a flat plate shape extending in the longitudinal direction LD and the height direction ND. The first surface portion 651 includes, as surfaces exposed to the outside of the developing container 32, a front flat surface 651s and four side surfaces connecting corners by curved surfaces (first side surface 651a, second side surface 651b, third side surface 651c, fourth side surface 651d). The first side surface 651a and the second side surface 651b are opposite end portions of the flat surface portion 651 with respect to the longitudinal direction LD, and the third side surface 651c and the fourth side surface 651d are opposite end portions of the flat surface portion 651 with respect to the height direction ND.

The retracted portion 655 is provided inside the four side surfaces of the flat surface portion 651 and has a recessed shape recessed toward the outside of the developing container 32 relative to the flat surface portion 651. The retracted portion 655 forms a space in which the wiping portion 34c is capable of entering when the light emitting window 612a and the light receiving window 622a are wiped with the wiping portion 34c is formed. The retracted portion 655 includes, as surfaces exposed to the outside of the developing container 32, a front-side retracted surface 655s and front-side side surfaces 655a and 655b. The front-side retracted surface 655s is a surface curved convexly toward the outside of the developing container 32 as viewed in the longitudinal direction LD. The front-side side surfaces 655a and 655b are surfaces connected to opposite end portions of the front-side retracted surface 655s in the longitudinal direction LD by being raised from the front flat surface 651s of the flat surface portion 651 toward the outside of the developing container 32.

The front flat surface 651s and the front-side retracted surface 655s have been subjected to uneven surface treatment (surface roughening treatment) of 20 μm or more in terms of a ten-point average roughness. By this uneven surface treatment, when the detection light OP emitted from the light emitting element 510a is incident on the front flat surface 651s and the front-side retracted surface 655s, the incident light can be diffused or irregularly reflected. Accordingly, a light quantity of the stray light, of the detection light OP emitted from the light emitting element 510a, which enters the light guiding member 600 from the front flat surface 651s and the front-side retracted surface 655s and which reaches, the light receiving element 510b can be suppressed. By this, the erroneous detection (lowering in detection accuracy) of the developer amount due to the stray light can be suppressed. Incidentally, when a constitution in which of the surfaces of the light guiding member 600 exposed to the outside of the developing container 32, at least a part thereof excluding the first projected portion and the fourth projected portion has surface roughness (ten-point surface roughness) larger than surface roughness of the surfaces of the first projected portion and the fourth projected portion is employed, a similar effect can be expected.

Incidentally, in the constitutions of this embodiment, the surface sides (651a to 651d, 655a, 655b) parallel to a demolding direction (normal direction to the installation surface 680, projection direction TD) of the light guiding member 600 are not subjected to the uneven surface treatment in consideration of the molding property (parting property). Further, the light emitting-side light guiding member 610 and the light receiving-side light guiding member 620 is mirror-finished with a maximum height of 0.2 μm or less in order to minimize light quantity loss of the detection light OP by refraction and reflection. Thus, at a portion exposed to the outside of the light guiding member 600, the light emitting-side light guiding member 610 and the light receiving-side light guiding member 620 which are for guiding the detection light OP are surface-smoothened, and other portions are surface-roughed to the extent possible in consideration of the molding property. By this, while suppressing light quantity attenuation of the detection light OP passing through the designed optical path, the erroneous detection (lowering in accuracy) of the developer amount due to the stray light can be suppressed.

Incidentally, as regards an actual number (value) of the surface roughness, when the surface roughness of the light emitting-side light guiding member 610 and the light receiving-side light guiding member 620 is set larger than the surface roughness of the surfaces other than the surface of the light guiding members, although there is a difference in degree, an effect of suppressing the erroneous detection due to the stray light resulting from the detection light OP can be obtained. The setting of roughness (smoothness) of the respective surfaces are appropriately changed depending on a specific constitution such as a light quantity of an LED as the light emitting element 510a or sensitivity of a phototransistor as the light receiving element 510b.

The constitution of the surfaces of the light guiding member 600 exposed to the outside of the developing container 32 described in this embodiment can be carried out in combination with the constitutions of the inside upper portions 630 and 640 of the light emitting-side light guiding member 610 and the light receiving-side light guiding member 620 described in the first to third embodiments. Accordingly, by providing the inside upper portions 630 and 640, while suppressing the erroneous detection (lowering in accuracy) of the developer amount by the remaining toner amount sensor 500, the erroneous detection can be further reduced by the uneven surface treatment of the front flat surface 651s and the front-side retracted surface 655s.

Fifth Embodiment

A fifth embodiment of the present invention will be described. This embodiment is different from the first embodiment in shape of the outside light guiding portions 611 and 612 of the light emitting-side light guiding member 610 and the light receiving-side light guiding member 620 of the light guiding member 600 and in optical path design of the remaining toner amount sensor 500. Other constitutions of the image forming apparatus 1 and the process unit 20 are common to the first to fifth embodiments. In the following, elements represented by the reference numerals or symbols common to the first to fourth embodiments have constitutions and functions which are substantially the same as those described in the first to fourth embodiments, and a portion different from the first to fourth embodiments will be principally described.

Parts (a) and (b) of FIG. 25 are perspective views showing a light guiding member 600 as a single component part before the light guiding member 600 is integrated with the developer container lid 321. Part (a) of FIG. 25 shows a front side of the light guiding member 600, i.e., a side where the light guiding member 600 does not contact the developer in the developing container 32 and where the light guiding member 600 is exposed to the outside of the developing container 32. Part (b) of FIG. 25 shows a back side of the light guiding member 600, i.e., a side where the light guiding member 600 contacts the developer in the developing container 32 and where the light guiding member 600 is exposed to the inside of the developing container 32.

Parts (a) to (f) of FIG. 33 are schematic views of the light guiding member 600 and the detection light OP as viewed from six directions through the third angle projection method in which the back side of the light guiding member 600 is the front surface. However, for convenience of the drawing sheet, a rear (back) view (part (8)) is disposed below a bottom view (part (e)). Part (a) of FIG. 26 is a front view showing the back side of the light guiding member 600. Part (b) of FIG. 26 is a side view of the light guiding member 600 as viewed from the light emitting element 510a side in the longitudinal direction LD. Part (c) of FIG. 26 is a side view of the light guiding member 600 as viewed from the light receiving element 510b side. Part (d) of FIG. 26 is a plan view of the light guiding member 600 as viewed from an upper side of the height direction ND. Part (a) of FIG. 26 is the bottom view of the light guiding member 600 as viewed from a lower side of the height direction ND. Part (f) of FIG. 26 is the rear view showing the front side of the light guiding member 600.

Part (a) of FIG. 27 is a sectional view of the light guiding member 600 cut along a cut line A-A shown in parts (a) and (f) of FIG. 26 in a flat plane which passes through the light emitting-side light guiding member 600 and which is perpendicular to the longitudinal direction LD. Part (b) of FIG. 27 is a sectional view of the light guiding member 600 cut along a cut line B-B shown in parts (a) and (f) of FIG. 26 in a flat plane which passes through the light receiving-side light guiding member 620 and which is perpendicular to the longitudinal direction LD.

The detection light OP shown in each of part (a) of FIG. 25 to part (b) of FIG. 27 shows a representative optical path (optical axis) of the light emitted from the above-described light emitting element 510a and reaching the light receiving element 510b through the light guiding member 600.

In the first to fourth embodiments, the incident surface 611a of the outside light guiding portion 611 of the light emitting-side light guiding member 610 and the light emergent surface 621a of the outside light guiding portion 621 of the light receiving-side light guiding member 620 were provided at the end portions of the outside light guiding portions 611 and 621 with respect to the projection direction TD of the outside light guiding portions 611 and 621. On the other hand, the outside light guiding portions 611 and 621 extend in a direction along the flat surface portion 651 of the frame portion 650.

As shown in part (a) of FIG. 25 and parts (a) to (f) of FIG. 26, the outside light guiding portion 611 of the light emitting-side light guiding member 610 is formed in a prismatic shape extending in a first extension direction D1 (first direction) along the front surface 653 (front flat surface 651s) of the frame portion 650. The outside light guiding portion 611 includes the side surface portion 611d extending in the first extension direction D1, the incident surface 611a provided on one end portion of the side surface portion 611d with respect to the first extension direction D1, and the reflecting surface 611b provided on the other end portion of the side surface portion 611d with respect to the first extension direction D1.

The incident surface 611a is a surface on which the light from the light emitting element 510a is incident. The light emitting element 510a in this embodiment is disposed opposed to this incident surface 611a (part (a) of FIG. 27). The incident surface 611a is formed in a convex lens shape so that diffused light emitted from the light emitting element 510a becomes light fluxes substantially parallel to the first extension direction D1 of the outside light guiding portion 611.

The reflecting surface 611b as a first reflecting surface is a surface for reflecting, toward the inside light guiding portion 612, the detection light OP which is incident on the incident surface 611a and which travels inside the outside light guiding portion 611 in the first extension direction D1 (mirror reflection) (part (a) of FIG. 27). As an example, an angle formed by the reflecting surface 611b relative to the first extension direction D1 (direction along the front flat surface 651s of the frame portion 650) in a cross section (part (a) of FIG. 27) perpendicular to the longitudinal direction LD.

The side surface portion 611d as a first side surface portion includes U-shaped three surfaces in a cross section perpendicular to the first extension direction D1, and a substantially square-shaped cross section is formed by these three surfaces and the frame portion 650. Of the three surfaces of the side surface portion 611d, each of the two surfaces opposing each other with respect to the longitudinal direction LD may be provided with a draft. In this case, a cross section perpendicular to the first extension direction D1 of the outside light guiding portion 611 has a trapezoidal shape such that a side on a side opposite from the frame portion 650 is somewhat shorter than a side on a side contacting the frame portion 650.

As shown in part (a) of FIG. 25 and parts (a) to (f) of FIG. 26, the outside light guiding portion 621 of the light receiving-side light guiding member 620 is formed in a prismatic shape extending in a second extension direction D2 (second direction) along the front surface 653 (front flat surface 651s) of the frame portion 650. The outside light guiding portion 621 includes the side surface portion 621d extending in the second extension direction D2, the incident surface 621a provided one end portion of the side surface portion 621d with respect to the first extension direction D1, and the reflecting surface 621b provided on the other end portion of the side surface portion 621d with respect to the second extension direction D2.

The light emergent surface 621a is a surface from which the detection light OP incident on the inside light guiding portion 622 via the space optical path Q in the feeding chamber 36 is emitted toward the light receiving element 510b. The light receiving element 510b in this embodiment is disposed opposed to this light emergent surface 621a (part (b) of FIG. 27).

The reflecting surface 621b as a second reflecting surface is a surface for reflecting, toward the second extension direction D2, the detection light OP which is incident on the inside light guiding portion 622 and which travels inside light receiving-side light guiding portion 620 from the inside light guiding portion 622 to the outside light guiding portion 621 (mirror reflection) (part (b) of FIG. 27). As an example, an angle formed by the reflecting surface 621b relative to the second extension direction D2 (direction along the front flat surface 651s of the frame portion 650) in a cross section (part (b) of FIG. 27) perpendicular to the longitudinal direction LD.

The side surface portion 621d as a second side surface portion includes U-shaped three surfaces in a cross section perpendicular to the second extension direction D2, and a substantially square-shaped cross section is formed by these three surfaces and the frame portion 650. Of the three surfaces of the side surface portion 621d, each of the two surfaces opposing each other with respect to the longitudinal direction LD may be provided with a draft. In this case, a cross section perpendicular to the second extension direction D2 of the outside light guiding portion 621 has a trapezoidal shape such that a side on a side opposite from the frame portion 650 is somewhat shorter than a side on a side contacting the frame portion 650.

(Positional Relationship Between Reflecting Surface of Outside Light Guiding Portion and Inside Upper Portion)

In the first to fourth embodiments, at the end portions of the outside light guiding portions 611 and 612 with respect to the projection direction TD, the incident surface 611a on which the light emitted from the light emitting element 510a is incident and the light emergent surface 621a from which the light is emitted toward the light receiving element 510b were provided. Further, it was described that the erroneous detection of the developer amount can be reduced by disposing the inside upper portions 630 and 640 above the extension lines (EL1 and EL2 of parts (a) and (b) of FIG. 16) of the upper surfaces 611c and 621c of the outside light guiding portions 611 and 621.

On the other hand, the outside light guiding portion 611 of the light emitting-side light guiding member 610 in this embodiment is constituted so that the light incident on the incident surface 611a travels inside the outside light guiding portion 611 in the first extension direction D1 and then is guided toward the inside light guiding portion 612 by being reflected by the reflecting surface 611b. Similarly, the outside light guiding portion 621 of the light receiving-side light guiding member 620 in this embodiment is constituted so that the light traveling from the inside light guiding portion 622 to the outside light guiding portion 621 is guided toward the light emergent surface 621a in the second extension direction D2 by being reflected by the reflecting surface 621b.

In such a constitution, it can be said that of the second projected portion of the light guiding member 600, a region in which the light flux reflected by the reflecting surface 611b of the first projected portion (outside light guiding portion 611) passes is a portion substantially constituting the optical path of the detection light OP. Similarly, it can be said that of the third projected portion of the light guiding member 600, a region in which the light reflected by the reflecting surface 621b passes when the light travels from the third projected portion to the fourth projected portion (outside light guiding portion 611) is a portion substantially constituting the optical path of the detection light OP.

Therefore, in this embodiment, the upper surface of the second projected portion of the light emitting-side light guiding member 610 is disposed above a rectilinear line (IL3) passing through an upper end 611bt of the reflecting surface 611b of the outside light guiding portion 610 and extending in a light reflection direction D3 at the reflecting surface 611b. Further, in this embodiment, a position of the upper surface of the third projected portion of the light emitting-side light guiding member 620 is disposed above a rectilinear line (IL4) passing through an upper end 621bt of the reflecting surface 621b of the outside light guiding portion 620 and extending in a light incident direction D4 in which the light incident on the inside light guiding portion 622 travels toward the reflecting surface 621b.

Specifically, the virtual rectilinear line IL3 shown in part (a) of FIG. 27 is a rectilinear line passing through the upper end 611bt of the reflecting surface 611b with respect to the direction of gravitation WD and is a rectilinear line drawn in the reflection direction D3 in the case where the light in the first extension direction D1 is mirror-reflected by the reflecting surface 611b. Of the second projected portion of the light guiding member 600, a portion on a side below the virtual rectilinear line IL3 is the inside light guiding portion 612 as a portion forming the optical path of the detection light OP. Of the second projected portion of the light guiding member 600, a portion on a side above the virtual rectilinear line IL3 is the inside upper portion 630 which is a portion not contributing to the formation of the optical path of the detection light OP. Further, the upper surface 630c of the inside upper portion 630 is positioned above the virtual rectilinear line IL3 (first virtual rectilinear line) in a state in which the upper surface 630c is viewed in the longitudinal direction LD. In other words, in the case where the upper surface 630c is viewed in a direction crossing both the first extension direction D1 (first direction) in which the outside light guiding portion 611 (first projected portion) extends along the wall surface of the developing container 32 and the direction of gravitation WD, the upper surface 630c (first upper surface) of the inside upper portion 630 is positioned above the virtual rectilinear line IL3 (first virtual rectilinear line). Here, the direction crossing both the first direction and the direction of gravitation WD is preferably a direction which is perpendicular to the direction of gravitation WD and which extends along the wall surface of the developing container 32 in which the light guiding member 600 is provided. Further, the direction crossing both the first direction and the direction of gravitation WD is preferably a direction in which the inside light guiding portions 612 and 622 (second projected portion and third projected portion) oppose each other in the developing container 32 and is the longitudinal direction LD of the developing container 32 in this embodiment.

Further, the virtual rectilinear line IL4 shown in part (b) of FIG. 27 is a rectilinear line passing through the upper end 611bt of the reflecting surface 611b with respect to the direction of gravitation WD and is a rectilinear line drawn in the incident direction D4 of the incident light in the case where the incident light incident on the reflecting surface 621b is mirror-reflected in the second extension direction D2. Of the third projected portion of the light guiding member 600, a portion on a side below the virtual rectilinear line IL4 is the inside light guiding portion 622 as a portion forming the optical path of the detection light OP. Of the third projected portion of the light guiding member 600, a portion on a side above the virtual rectilinear line IL4 is the inside upper portion 640 which is a portion not contributing to the formation of the optical path of the detection light OP. Further, the upper surface 640c of the inside upper portion 640 is positioned above the virtual rectilinear line IL4 (second virtual rectilinear line) in a state in which the upper surface 640c is viewed in the longitudinal direction LD. In other words, in the case where the upper surface 640c is viewed in a direction crossing both the second extension direction D2 (second direction) in which the outside light guiding portion 621 (fourth projected portion) extends along the wall surface of the developing container 32 and the direction of gravitation WD, the upper surface 640c (second upper surface) of the inside upper portion 640 is positioned above the virtual rectilinear line IL4 (second virtual rectilinear line). Here, the direction crossing both the first direction and the direction of gravitation WD is preferably a direction which is perpendicular to the direction of gravitation WD and which extends along the wall surface of the developing container 32 in which the light guiding member 600 is provided. Further, the direction crossing both the second direction and the direction of gravitation WD is preferably a direction in which the inside light guiding portions 612 and 622 (second projected portion and third projected portion) oppose each other in the developing container 32 and is the longitudinal direction LD of the developing container 32 in this embodiment.

Thus, although this embodiment is different from the first to fourth embodiments in optical path design of the outside light guiding portions 611 and 621, the inside upper portions 630 and 640 is provided above the inside light guiding portions 612 and 622, so that the upper surfaces 630c and 640c thereof are positioned above the virtual rectilinear lines IL3 and IL4.

That is, in the case where the upper surface 620c of the second projected portion of the light guiding member 600 is viewed in the longitudinal direction LD of the developing container 32, the upper surface 630c of the second projected portion of the light guiding member 600 is a rectilinear line passing through an upper end of the reflecting surface 611b (first reflecting surface) and is positioned above the virtual rectilinear line IL3 (first virtual rectilinear line) drawn in the reflection direction D3 in the case where the light in the first extension direction D1 (first direction) is incident on and reflected by the first reflecting surface. Further, in the case where the upper surface 640c of the third projected portion of the light guiding member 600 is viewed in the longitudinal direction LD of the developing container 32, the upper surface 640c of the third projected portion of the light guiding member 600 is a rectilinear line passing through an upper end of the reflecting surface 621b (second reflecting surface) and is positioned above the virtual rectilinear line IL4 (second virtual rectilinear line) drawn in the incident direction D4 in the case where the light incident on the second reflecting surface is reflected in the second extension direction D2 (second direction).

By such a constitution, even when the developer is deposited on the upper surfaces 630c and 640c of the inside upper portions 630 and 640 in the attitude during the developer amount detection, the aggregate of the developer can be caused not to readily reach the light emitting window 612a or the light receiving window 622a of the inside light guiding portion 612 or 622. That is, even in the constitution of this embodiment, the deposition of the developer on the light emitting window 612a or the light receiving window 622a is reduced, so that the erroneous detection (lowering detection accuracy) by the remaining toner amount sensor 500 can be suppressed.

Incidentally, in this embodiment, description was made on the assumption that the extension direction of each of the outside light guiding portions 611 and 621 is substantially parallel to the height direction ND, but a constitution in which the outside light guiding portions 611 and 612 extend in another direction may be employed. The extension directions of the outside light guiding portions 611 and 621 are appropriately changeable in relationship with the positions of the light emitting element 510a and the light receiving element 510b in the image forming apparatus. For example, a constitution in which the outside light guiding portion 611 of the light emitting-side light guiding member 610 extends toward one side of the longitudinal direction LD and the outside light guiding portion 621 of the light receiving-side light guiding member 620 extends toward the other side of the longitudinal direction LD may be employed.

In this case, the reflecting surface 611b of the outside light guiding portion 611 of the light emitting-side light guiding member 610 is disposed so that the light travel from the incident surface 611a into the outside light guiding portion 611 in the longitudinal direction LD as the first direction is reflected toward the inside light guiding portion 612. Further, the reflecting surface 621b of the outside light guiding portion 621 of the light receiving-side light guiding member 620 is disposed so that the light traveling from the inside light guiding portion 622 into the outside light guiding portion 611 is reflected toward the light emergent surface 621a along the longitudinal direction LD as the second direction.

Even in the case where the extension direction (first direction) of the outside light guiding portion 611 (first projected portion) of the light emitting-side light guiding member 610 is different from the extension direction in this embodiment, the upper surface of the second projected portion may only be required to be disposed above the first virtual rectilinear line as viewed in the longitudinal direction LD. This first virtual rectilinear line is a rectilinear line passing through the upper end of the reflecting surface (first reflecting surface) of the outside light guiding portion 611 and is the virtual rectilinear line drawn in the reflection direction in the case where the light in the first direction is incident on and reflected by the first reflecting surface. Similarly, even in the case where the extension direction (second direction) of the outside light guiding portion 621 (fourth projected portion) of the light receiving-side light guiding member 620 is different from the extension direction in this embodiment, the upper surface of the third projected portion may only be required to be disposed above the second virtual rectilinear line as viewed in the longitudinal direction LD. This second virtual rectilinear line is a rectilinear line passing through the upper end of the reflecting surface (second reflecting surface) of the outside light guiding portion 621 and is the virtual rectilinear line drawn in the reflection direction in the case where the light incident on the second reflecting surface is reflected in the second direction. By this, similarly as in this embodiment, the erroneous detection (lowering in detection accuracy) of the developer amount can be suppressed.

Incidentally, the inside upper portion 630 of the light emitting-side light guiding member 610 may be provided as a separate member from the inside light guiding portion 612, and the inside upper portion 640 of the light receiving-side light guiding member 620 may be provided as a separate member from the inside light guiding portion 622. By this modified embodiment, while maintaining the light guiding performance of the light guiding member 600, the occurrence of the sink marks when the portions of the light guiding member 600 excluding the inside upper portions 630 and 640 are molded can be suppressed. Further, the inside upper portions 630 and 640 are formed with the material through which the detection light OP does not readily transmit them through the inside light guiding portions 612 and 622, so that the erroneous detection of the developer amount due to the stray light can be further suppressed.

Further, the inside portions 630 and 640 in this embodiment may be replaced with the inside upper portions 630 and 640 described in the second and third embodiments, and the frame portion 650 may be subjected to the uneven surface treatment described in the fourth embodiment.

Other Embodiments

In the above-described embodiments, the light emitting element 510a and the light receiving element 510b are disposed in the process unit 20, but may be disposed in the printer main assembly 100 of the image forming apparatus 1, for example. Further, in the above-described embodiments, between the developing container lid 321 and the substrate 700, the substrate holding member 710 is provided, but a holding structure for the substrate 700 is not limited thereto. That is, without providing the substrate holding member 710, the substrate 700 may be directly mounted on the developing container lid 321.

Further, in the above-described embodiments, the light emitting-side light guiding member 610 and the light receiving-side light guiding member 620 are constituted as an integrally molded member through the frame portion 650, but the present invention is not limited thereto. For example, the light emitting-side light guiding member 610 and the light receiving-side light guiding member 620 may be constituted as separate members and may also be mounted on the developing container 32.

Further, in the above-described embodiments, the space optical path Q was disposed so as to overlap with the rotation loci Tb1 and Tb2 of the stirring member 34 as viewed in the axial direction of the stirring member 34, but the present invention is not limited thereto. That is, the space optical path Q may be disposed so as not to overlap with the rotation loci Tb1 and Tb2 of the stirring member 34.

Incidentally, in the above-described embodiments which have been described hereinbefore, the reading device 200 was provided above the printer main assembly, but the present invention is not limited thereto. That is, the image forming apparatus may be a printer which does not include the reading device. Further, the reading device may be a reading device provided with an ADF (Auto Document Feeder) for feeding an original.

Sixth Embodiment

In general, the image forming apparatus of the electrophotographic type forms the image by transferring the toner image, formed on the surface of the photosensitive drum, onto the transfer material as a transfer medium. Further, as the developer supplying type, for example, a process cartridge type or a toner container supplying type has been known. The process cartridge type is a type in which the photosensitive drum and the developing container are assembled into a process cartridge and in which the process cartridge is exchanged to for a new (fresh) process cartridge when the developer is used up. On the other hand, the toner container supplying type is a type in which when the toner is used up, the toner is supplied to the developing container from a toner container such as the toner pack or the toner bottle.

Conventionally, an image forming apparatus in which the remaining toner amount of the developing container is estimated by a light receiving time in which the detection light emitted from the light emitting portion and passing through the inside of the developing container is received has been proposed (JP-A 2003-131479). In the toner container, the stirring member for stirring the toner is provided, and with a decreasing remaining toner amount in the toner container, the light receiving time by the light receiving portion becomes longer.

However, in the image forming apparatus described in JP-A 2003-131479, depending on a use mode of the image forming apparatus 1, flowability of the toner in the developing container changes. For example, compared with the toner in a new image forming apparatus 1, the toner in the used-up image forming apparatus 1 is lower in flowability. When the flowability of the toner changes, a timing when the toner in the developing container blocks the detection light changes. For this reason, even in the case where the remaining toner amount in the developing container is the same, the light receiving time by the light receiving portion changes, so that the detection accuracy of the remaining toner amount lowered.

Therefore, an object of this embodiment is to provide an image forming apparatus improved in detection accuracy of the developer amount in the accommodating portion.

Part (a) of FIG. 28 is a schematic view showing a structure of an image forming apparatus 1 according to a sixth embodiment. The image forming apparatus 1 is a monochromatic printer for forming an image on a recording material on the basis of image information inputted from an external device. In the recording material, various sheet materials different in material including papers such as plain paper and thick paper, a plastic film such as a sheet for an overhead projector, special-shaped sheets such as an envelope and index paper, a cloth, and the like are included.

[General Structure]

The image forming apparatus 1 includes, as shown in parts (a) and (b) of FIG. 28, a printer main assembly 100 as an apparatus main assembly, a reading device 200 supported so as to be openable relative to the printer main assembly 100, and an operating portion 300 mounted to an outer casing surface of the printer main assembly 100. The printer main assembly 100 includes an image forming portion 10 for forming a toner image on the recording material, a feeding portion 60 for feeding the recording material to the image forming portion 10, a fixing portion 70 for fixing the toner image, formed by the image forming portion 10, on the recording material, and a discharging roller pair 80.

The image forming portion 10 includes a scanner unit 11, a process unit 20 of an electrophotographic type, and a transfer roller 12 for transferring the toner image as a developer image, formed on a photosensitive drum 21 of the process cartridge 20, onto the recording material. The process unit 20 includes, as shown in part (a) and (b) of FIG. 32, a developing device 30 including the photosensitive drum 21, a charging roller 22 disposed at a periphery of the photosensitive drum 21, a pre-exposure device 23, and a developing roller 31. The process unit 20 is mounted detachably to the printer main assembly 100. Incidentally, the process unit 20 may be fastened to the printer main assembly with screws and includes a process unit which is dismounted principally by a service person, not a user. On the other hand, the process unit 20 does not include a structural member of the printer main assembly, such as a casing frame for the printer main assembly 100.

The photosensitive drum 21 is a photosensitive member molded in a cylindrical shape. The photosensitive drum 21 in this embodiment includes, on a drum-shaped base material molded with aluminum, a photosensitive layer formed with a negatively chargeable organic photosensitive member. Further, the photosensitive drum 21 as an image bearing member is rotationally driven at a predetermined process speed in a predetermined direction (clockwise direction in the figure) by a motor.

The charging roller 22 contacts the photosensitive drum 21 at a predetermined press-contact force and forms a charging portion. Further, a desired charging voltage is applied to the charging roller 22 by a high charging voltage source, so that a surface of the photosensitive drum 21 is electrically charged uniformly to a predetermined potential. In this embodiment, the photosensitive drum 21 is charged to a negative polarity by the charging roller 22. The pre-exposure device 23 discharges a surface potential of the photosensitive drum 21 before entering the charging portion in order to generate stable electric discharge at the charging portion.

The scanner unit 11 irradiates the photosensitive drum 21, by using a polygonal mirror, with laser light corresponding to image information inputted from the external device or the reading device 200, so that the surface of the photosensitive drum 21 is subjected to scanning exposure. By this light exposure, an electrostatic latent image depending on the image information is formed on the surface of the photosensitive drum 21. Incidentally, the scanner unit 11 is not limited to a laser scanner device, but for example, an LED exposure device including an LED array in which a plurality of LEDs are arranged along a longitudinal direction of the photosensitive drum 21.

The developing device 30 includes the developing roller 31 as a developer carrying member for carrying a developer, a developing container 32 as a frame for the developing device 30, and a supplying roller 33 capable of supplying the developer to the developing roller 31. The developing roller 31 and the supplying roller 33 are rotatably supported by the developing container 32. Further, the developing roller 31 is disposed at an opening of the developing container 31 so as to oppose the photosensitive drum 21. The supplying roller 33 rotatably contacts the developing roller 31, and toner as the developer accommodated in the developing container 32 is applied onto the surface of the developing roller 31 by the supplying roller 33. Incidentally, when a constitution capable of supplying the toner sufficiently to the developing roller 31 is employed, the supplying roller 33 is not necessarily required.

The developing device 30 in this embodiment uses a contact development type as a development type. That is, a toner layer carried on the developing roller 31 contacts the photosensitive drum 21 at a developing portion (developing region) where the photosensitive drum 21 and the developing roller 31 oppose each other. To the developing roller 31, a developing voltage is applied by a high developing voltage source. Under application of the developing voltage, the toner carried on the developing roller 31 is transferred from the developing roller 31 onto the drum surface in accordance with a potential distribution of the surface of the photosensitive drum 21, so that the electrostatic latent image is developed into a toner image. Incidentally, in this embodiment, a reversal development type is employed. That is, the toner image is formed by being deposited on a surface region of the photosensitive drum 21 attenuated in charge amount by being exposed to light in an exposure step after being charged in a charging step.

Further, in this embodiment, the toner which is 6 µm in particle size and of which normal charge polarity is a negative polarity is used. As the toner in this embodiment, a polymerization toner formed by a polymerization method as an example is employed. Further, the toner in this embodiment is a so-called non-magnetic one-component developer which does not contain a magnetic component and in which the toner is carried on the developing roller 31 principally by an intermolecular force or an electrostatic force (mirror force). However, a one-component developer containing a magnetic component may also be used. Further, in the one-component developer, an additive (for example, wax or silica fine particles) for adjusting flowability and charging performance is contained in addition to toner particles in some cases. Further, as the developer, a two-component developer constituted by non-magnetic toner and a magnetic carrier may also be used. In the case where the developer having a magnetic property is used, as the developer carrying member, for example, a cylindrical developing sleeve inside of which a magnet is disposed is used.

At an inner portion of the developing container 32, a stirring member 34 is provided. The stirring member 34 not only stirs the toner in the developing container 32 but also conveys the toner toward the developing roller 31 and the supplying roller 33 by being driven and rotated by a motor M1 (see FIG. 39). Further, the stirring member 34 has a function of circulating the toner, peeled off from the developing roller 31 without being used for the development, in the developing container and of uniformizing the toner in the developing container. Incidentally, the stirring member 34 is not limited to a rotatable form. For example, a stirring member in a swingable from may also be employed. Further, in addition to the stirring member 34, another stirring member may be provided.

Further, at an opening of the developing container 32 where the developing roller 31 is disposed, a developing blade 35 for regulating an amount of the toner carried on the developing roller 31 is disposed. The toner supplied to the surface of the developing roller 31 passes through an opposing portion to the developing blade 35 with rotation of the developing roller 31, so that the toner is uniformly formed in a thin layer and is charged to the negative polarity by triboelectric charge.

A feeding portion 60 includes, as shown in parts (a) and (b) of FIG. 28, a front door 61 supported so as to be openable by the printer main assembly 100, a tray portion 62, an intermediary plate 63, a tray spring 64, and a pick-up roller 65. The tray portion 62 constitutes a bottom of a recording material accommodating space which appears by opening the front door 61, and the intermediary plate 63 is supported by the tray portion 62 so as to be capable of being raised and lowered. The tray spring 64 urges the intermediary plate 63 upward and presses the recording materials P, stacked on the intermediary plate 63, against the pick-up roller 65. Incidentally, the front door 61 closes the recording material accommodating space in a state in which the front door 61 is closed relative to the printer main assembly 100, and supports the recording materials P together with the tray portion 62 and the intermediary plate 63 in a state in which the front door 61 is opened relative to the printer main assembly 100.

The fixing portion 70 is a heat fixing type in which an image fixing process is performed by heating and melting the toner on the recording material. The fixing portion 70 includes a fixing film 71, a fixing heater such as a ceramic heater for heating the fixing film 71, a thermistor for measuring a temperature of the fixing heater, and a pressing roller 72 press-contacting the fixing film 71.

Next, an image forming operation of the image forming apparatus 1 will be described. When an instruction of image formation is inputted to the image forming apparatus 1, on the basis of the image information inputted from an external computer connected to the image forming apparatus 1 or from the reading device 200, an image forming process by the image forming portion 10 is started. The scanner unit 11 emits the laser light toward the photosensitive drum 21 on the basis of the inputted image information. At this time, the photosensitive drum 21 is charged in advance by the charging roller 22, and is irradiated with the laser light, so that the electrostatic latent image is formed on the photosensitive drum 21. Thereafter, this electrostatic latent image is developed by the developing roller 31, so that the toner image is formed on the photosensitive drum 21.

In parallel to the above-described image forming process, the pick-up roller 65 of the feeding portion 60 sends the recording material P supported by the front door 61, the tray portion 62, and the intermediary plate 63. The recording material P is fed to the registration roller pair 15 by the pick-up roller 65, and is abutted against a nip of the registration roller pair 15, so that oblique movement of the recording material P is corrected. Further, the registration roller pair 15 is driven by being timed to a transfer timing of the toner image, and is conveyed toward a transfer nip formed by a transfer roller 12 and the photosensitive drum 21.

To the transfer roller 12 as a transfer means, a transfer voltage is applied from a high transfer voltage source, so that the toner image carried on the photosensitive drum 21 is transferred onto the recording material P conveyed by the registration roller pair 15. The recording material P onto which the toner image is transferred is conveyed to the fixing portion 70, where the toner image is heated and pressed when the recording material P passes through a nip between the fixing film 71 and the pressing roller 72 of the fixing portion 70. By this, the recording material P passing through the fixing portion 70 is thereafter fixed, so that the toner image is fixed on the recording material P. The recording material P passed through the fixing portion 70 is discharged to an outside of the image forming apparatus 1 (outside of the printer) by a discharging roller pair 80, so that the discharged recording materials P are stacked on a discharge tray 81 formed at an upper portion of the printer main assembly 100.

The discharge tray 81 is inclined upward toward a downstream end in a discharging direction of the recording material, and the recording material discharged on the discharge tray 81 slides down on the discharge tray 81, so that a trailing end of the recording material is aligned by a restricting surface 84.

The reading device 200 includes, as shown in parts (a) and (b) of FIG. 30, a read unit 201 in which an unshown reading portion is built, and a platen 202 supported by the reading unit 201 so as to be openable and closable. At an upper surface of the reading unit 201, an original supporting platen glass 203 which permits transmission of light emitted from the reading portion and on which an original is to be placed.

In the case where a user intends to cause the reading device 200 to read an image of the original, the user places the original on the original supporting platen glass 203 in a state in which the platen 202 is opened. Then, the platen 202 is closed and a positional deviation of the original on the original supporting platen glass 203 is prevented, so that a reading instruction is outputted to the image forming apparatus 1 by operating the operating portion 300, for example. When a reading operation is started, the reading portion in the reading unit 201 reciprocates in a sub-scan direction, i.e., the reading portion reciprocates in a left-right direction in a state in which the user faces the operating portion 300 of the image forming apparatus 1 on a front (surface) side. The reading portion receives light reflected by the original by a light receiving portion while emitting light from a light emitting portion toward the original, and photoelectrically converts the light, so that the reading portion reads the image of the original. Incidentally, in the following, on the basis of a state in which the user faces the operating portion 300 on the front side, a front-rear direction, the left-right direction, and an up-down direction are defined.

As shown in parts (a) and (b) of FIG. 29, at an upper portion of the printer main assembly 100, a first opening 101 which opened upward is formed, and the first opening 101 is covered with a discharge tray 81 in a normal use state (state in which an image forming operation is capable of being executed). The discharge tray 81 is opened from the front side toward a rear side in a state in which the reading device 200 is opened relative to the printer main assembly 100. Further, a constitution in which to the first opening 101, a mounting portion including a supply opening 32a through which a toner pack 40 is mountable as described later is exposed is employed (see parts (a) and (b) of FIG. 4). The user is capable of accessing the mounting portion 57 by opening the discharge tray 81. Incidentally, the reading device 200 and the discharge tray 81 may also be constituted so as to be held in an opened state and a closed state by a holding mechanism such as a hinge mechanism.

Further, in this embodiment, as shown in part (b) of FIG. 28, the discharge tray 81 is provided with an openable member 83 so as to be openable and closable about a rotation shaft extending in the front-rear direction. The discharge tray 81 is provided with an opening 81a which opens upward. The openable member 83 is constituted so as to be movable between a closed position where the openable member 83 covers the supply opening 32a so that the toner pack 40 cannot be mounted on the developing container 32 and an open position where the supply opening 32a is exposed so that the toner pack 40 can be mounted on the developing container 32. The openable member 83 functions as a part of the discharge tray 81 in the closed position. The openable member 83 and the opening 81a are formed on the left side of the discharge tray 81. The openable member 83 is opened in the leftward direction by that the user holds the openable member 83 with his (her) fingers through a groove portion 81b provided in the discharge tray 81. For this reason, the user is capable of accessing the supply opening 32a only by opening the openable member 83. The openable member 83 is formed in a substantially L-character shape along a shape of the discharge tray 81.

In this embodiment, a type (direct supply type) in which the user is supplies the toner from the toner pack 40 (parts (a) and (b) of FIG. 28) as a toner container to the developing device 30 while maintaining a state in which the developing device 30 is mounted in the image forming apparatus 1 is employed. For this reason, in the case where the remaining toner amount of the process unit 20 becomes small, there is no need to perform an operation in which the process unit 20 is dismounted from the printer main assembly 100 and then is exchanged with a new (fresh) process unit, so that usability can be improved. Further, the toner can be supplied into the developing container 32 more inexpensively than in the case where entirety of the process unit 20 is exchanged. Incidentally, even when compared with the case where only the developing device 30 of the process unit 20 is exchanged, in the direct supply type, there is no need to exchange various rollers, gears, and the like, so that cost reduction can be realized. Incidentally, the image forming apparatus 1 and the toner pack 40 constitute the image forming system.

[Collection of Transfer Residual Toner]

This embodiment employs a cleaner-less type in which transfer residual toner remaining on the photosensitive drum 21 without being transferred onto the recording material P is collected in the developing device 30 and is utilized again. The transfer residual toner is removed in the following step. In the transfer residual toner, toner charged to the positive polarity and toner which is charged to the negative polarity out which does not have sufficient electric charges are present in mixture. The photosensitive drum 21 after the transfer is charge-removed by the pre-exposure device 23, and the charging roller 22 is caused to generate uniform electric discharge, so that the transfer residual toner is charged again to the negative polarity. The transfer residual toner charged again to the negative polarity at the charging portion reaches a developing portion with rotation of the photosensitive drum 21. Then, a surface region of the photosensitive drum 21 passed through the charging portion is exposed to light by the scanner unit 11 while being in a state in which the transfer residual toner is deposited on the surface, so that the electrostatic latent image is written (formed).

Here, behavior of the transfer residual toner that reached the developing portion will be described by dividing a portion of the photosensitive drum 21 into an exposure portion and a non-exposure portion. The transfer residual toner deposited on the non-exposure portion of the photosensitive drum 21 is transferred onto the developing roller 31 at the developing portion by a potential difference between a non-exposure portion potential (dark-portion potential) of the photosensitive drum 21 and the developing voltage, and is collected in the developing container 32. This is because the developing voltage applied to the developing roller 31 on the assumption that a normal charge polarity of the toner is negative is a positive polarity relative to the non-exposure portion potential. Incidentally, the toner collected in the developing container 32 is stirred and dispersed with the toner in the developing container by the stirring member 34, and is carried on the developing roller 31, so that the toner is used again in the developing step.

On the other hand, the transfer residual toner deposited on the exposure portion of the photosensitive drum 21 remains on the drum surface without being transferred from the photosensitive drum 21 onto the developing roller 31 at the developing portion. This is because the developing voltage applied to the developing roller 31 on the assumption that the normal charge polarity of the toner is the negative polarity becomes a further negative potential than an exposure portion potential (light-portion potential). The transfer residual toner remaining on the drum surface is carried on the photosensitive drum 21 together with another toner transferred from the developing roller 31 onto the exposure portion, and is moved to a transfer portion, so that the toner is transferred onto the recording material P at the transfer portion.

Thus, this embodiment employs the cleaner-less constitution in which the transfer residual toner is collected in the developing device 30 and is utilized again, but may also employ a conventionally well-known constitution in which the transfer residual toner is collected using a cleaning blade contacting the photosensitive drum 21. In that case, the transfer residual toner collected by the cleaning blade is collected in a collecting container provided separately from the developing device 30. However, by employing the cleaner-less constitution, a mounting space for collecting container for collecting the transfer residual toner or the like becomes unnecessary and further downsizing of the image forming apparatus 1 becomes possible, and further, it is also possible to realize printing cost reduction by re-utilizing the transfer residual toner.

[Constitution of Developing Container and Toner Pack]

Next, constitutions of the developing container 32 and the toner pack 40 will be described. Part (a) of FIG. 31 is a perspective view showing the developing container 32 and the toner pack 40, and part (b) of FIG. 31 is a front view showing the developing container 32 and the toner pack 40. Part (c) of FIG. 31 is a perspective view showing the stirring member 34 in the developing container 32. Part (a) of FIG. 32 is a 5A-5A sectional view of part (b) of FIG. 31, and part (b) of FIG. 32 is a 5B-5B sectional view of part (b) of FIG. 31.

As shown in part (a) of FIG. 31 to part (b) of FIG. 32, the developing container 32 which is a part of the developing device 30 includes a feeding chamber 36 for accommodating the stirring member 34, and the feeding chamber 36 as an accommodating portion for accommodating a developer containing the toner (hereinafter, referred to as the toner) extends over a full length of the developing container 32 in a longitudinal direction LD (left-right direction). Further, the developing container 32 as a transfer includes a developing container frame 320 and a developing container lid (cover) 321, and the developing container frame 320 and the developing container lid 321 are connected by a connecting portion 322.

Further, the developing roller 31 and the supplying roller 33 are rotatably supported by the developing container frame 320.

Further, the developing container 32 includes a projected supply portion 37 which projects upward from one end portion of the feeding chamber 36 in the longitudinal direction LD and which communicates with the feeding chamber 36. Specifically, the projected supply portion 37 is provided at one end portion of the developing container lid 321 in the rotational axis direction (longitudinal direction LD) of the developing roller 31. The projected supply portion 37 projects toward the discharge tray 81 than the central portion projects in the crossing direction crossing the rotational axis direction.

In this embodiment, the projected supply portion 37 is formed in a hollow shape at an inside thereof, and is disposed on the left side of the developing container 32. At an end portion of the projected supply portion 37, a mounting portion 57 where the toner pack 40 is mountable is provided, and at the mounting portion 57, a rotatable supply opening 32a for permitting supply of the developer from the toner pack 40 to the feeding chamber 36 is formed. To the mounting portion 57, the toner pack 40 can be mounted in a state in which the toner pack 40 is exposed to an outside of the image forming apparatus 1.

The projected supply portion 37 obliquely extends from the feeding chamber 36 toward the front of and above the apparatus. That is, the projected supply portion 37 projects toward a downstream end in a discharge direction of the discharging roller pair 80 and upward. For this reason, the supply opening 32a disposed at the projected supply portion 37 is disposed on the front side of the image forming apparatus 1, so that a supplying operation of the toner to the developing container 32 can be easily carried out.

Further, the projected supply portion 37 where the supply opening 32a is disposed on one side in the longitudinal direction of the developing container 32, so that it is possible to ensure a laser passing space through which the laser (light) emitted from the scanner unit 11 is capable of passing, and the image forming apparatus 1 can be downsized.

The toner pack 40 is constituted so as to be mountable to and dismountable from the mounting portion 57 of the first projected portion 37 as shown in part (a) of FIG. 31 to part (b) of FIG. 32. Further, the toner pack 40 includes a shutter member 41 and which is openable and closable, and a projection 42 formed corresponding to a groove 32b formed at the mounting portion 57. In the case where the user supplies the toner to the developing container 32, the user performs alignment so that the projections 42 of the toner pack 40 pass through the grooves 32b of the mounting portion 57, so that the user connects the toner pack 40 with the mounting portion 57. Then, in this state, when a shutter member 41 of the toner pack 40 is rotated 90 degrees through an unshown lever device in the image forming apparatus 1, the supply opening 32a is also rotated correspondingly to the shutter member 41. Then, the lever or the shutter member 41 abuts against an unshown abutting portion of the mounting portion 57, so that the shutter member 41 is completely opened and at the same time, the supply opening 32a and the opening of the toner pack 40 communicate with each other. By this, the toner accommodated in the toner pack 40 falls through the opening of the toner pack 40 and enters from the hollow-shaped projected supply portion 37 into the feeding chamber 36 through the supply opening 32a.

Here, the stirring member 34 includes, as shown in part (c) of FIG. 31, a stirring shaft 34a extending in the longitudinal direction LD, and a first blade portion 34b1 and a second blade portion 34b2 which extend from the stirring shaft 34a toward an outside in a radial direction. The first blade portion 34b1 and the second blade portion 34b2 are formed with flexible sheets and are different in length extending toward the outside in the radial direction from each other. The first blade portion 34b1 is longer than the second blade portion 34b2. In parts (a) and (b) of FIG. 32, a rotational locus of the first blade portion 34b1 on assumption that the first blade portion 34b1 is rotated in a straightly extending state in disregard of the wall surface of the developing container 32 is represented by a rotational locus Tb1. Similarly, in parts (a) and (b) of FIG. 32, a rotation locus of the second blade portion 34b2 on assumption that the second blade portion is rotated in a straightly extending state in disregard of the wall surface of the developing container 32 is represented by a rotational locus Tb2. Incidentally, a wiping portion 34c and an auxiliary wiping portion 34d of the stirring member 34 shown in part (c) of FIG. 31 will be described later.

As shown in part (a) of FIG. 32, the toner supplied from the supply opening 32a disposed on an upstream side in a (recording material) feeding direction of the stirring member 34 is sent toward the developing roller 31 and the supplying roller 33 with rotation of the stirring member 34. The supply opening 32a and the projected supply portion 37 are disposed at one end portion of the developing container 32 in the longitudinal direction LD, but the toner is spread over a full length of the developing container 32 by repeating the rotation of the stirring member 34. That is, the feeding direction of the stirring member 34 is not only a direction parallel to the longitudinal direction LD of the developing container 32 (see part (a) of FIG. 31) but also a direction (direction from the feeding chamber 36 toward the developing roller 31 and the supplying roller 31) crossing the longitudinal direction LD. Here, as indicated by the rotation loci Tb1 and Tb2, the first blade portion 34b1 which is a longer blade portion functions as a principal portion for feeding the toner toward the developing roller 31 and the supplying roller 33. On the other hand, the second blade portion 34b2 which is a shorter blade portion functions as an auxiliary portion for feeding, for example, toner which cannot be satisfactorily fed by the first blade portion 34b1 due to belly abutment.

In this embodiment, the toner pack 40 is constituted by a deformable bag member made of a plastic film as shown in FIG. 33 and part (a) of FIG. 34, but the present invention is not limited thereto. For example, the toner pack 40 (supply container) may be constituted by a substantially cylindrical-shaped bottle container 40B as shown in part (b) of FIG. 34, and may be constituted by a paper container 40C made of paper as shown in part (c) of FIG. 34. In either case, the toner pack 40 (supply container) may be any material and shape. Further, as regards a method of ejecting the toner from the toner pack 40, a method such that the user squeezes the toner pouch with fingers if the toner pouch is the toner pack 40 or the paper container 40C is suitable, and a method such that the user leaks down the toner by tapping the container or the like while vibrating the container if the toner pouch is the bottle container 4B is suitable. Further, in order to discharge the toner from the bottle container 40B, a discharging mechanism may be provided in the bottle container 40B. Further, the discharging mechanism may be a constitution for receiving a driving force from the printer main assembly 100 by engaging with the printer main assembly 100.

Further, in either toner pack, the shutter member 41 may be omitted, or a shutter of a slide type may be applied instead of the shutter member 41. Further, the shutter member 41 may be a constitution in which the shutter member 41 is broken by mounting the toner pack on the supply opening 32a or by rotating the toner pack in a mounted state, or may be a dismountable lid (cover) structure such as a seal.

Further, in this embodiment, the stirring member 34 is provided with the two blade portions 34b1 and 34b2 different in length, but a length and the number thereof are not limited thereto. For example, the length and the number of the blade portions may be freely set in consideration of the shape of the developing container, feeding efficiency, and the like.

[Remaining Toner Amount Sensor]

In the following, a constitution of the remaining toner amount sensor 500 for detecting the remaining toner amount in the developing container 32 will be specifically described using FIGS. 35 to 38. FIG. 35 is a perspective view showing the developing device 30. Part (a) of FIG. 36 is a perspective view showing a state in which a substrate 700 and a substrate holding member 710 are assembled with the developing container lid 321. Part (b) of FIG. 36 is a perspective view showing the substrate 700 and the substrate holding member 710, and part (c) of FIG. 36 is another perspective view showing the substrate 700 and the substrate holding member 710. Part (a) of FIG. 37 is a sectional view passing through a light emitting element 510a of the developing device 30, and part (b) of FIG. 37 is a sectional view of a 10B-10B cross section of part (a) of FIG. 37. FIG. 38 is a schematic circuit diagram showing an example of a circuit constitution of a remaining toner amount sensor 500.

As shown in FIG. 35, the developing container lid 321 constituting a part of the developing container 32 includes substrate positioning portions 321a and 321b and surface fixing portions 321c and 321d. In a position between the substrate fixing portions 321c and 321d of the developing container lid 321, a light guiding member 600 as a light guiding means is provided. The light guiding member 600 includes a first light guiding portion 610 and a second light guiding portion 620. The first light guiding portion 610 extends toward the light emitting element 510a described later, and the second light guiding portion 620 extends toward the light receiving element 510b described later. The first light guiding portion 610 guides light, emitted from the light emitting element 510a, to an inside of the feeding chamber 36. The second light guiding portion 620 guides the light, passed through the light emitting-side light guiding member 610 and the feeding chamber 36, to the light receiving element 510b.

Incidentally, the light guiding member 600, the light emitting element 510a as a light emitting portion, and the light receiving element 510b as a light receiving portion, are referred in combination to as the remaining toner amount sensor 500 as a detecting unit.

The substrate positioning portions 321a and 321b are disposed outside the substrate fixing portions 321c and 321d, respectively, with respect to the longitudinal direction LD of the developing container 32, and each has a boss shape such that the substrate positioning portion is projected in a direction of being separated from the developing container 32. The shape of each of the substrate positioning portions 321a and 321b is not limited to the boss shape but may also be an arbitrary shape. Further, the longitudinal direction LD of the developing container frame 320 is the same as the longitudinal direction LD (see part (a) of FIG. 4) of the process unit 20. With the substrate fixing portions 321c and 321d, a fixing tool such as screws is threadably engageable.

In this embodiment, as shown in part (a) of FIG. 36, the substrate 700 and the substrate holding member 710 are assembled with the developing container lid 321. The substrate holding member 710 is assembled with the developing container lid 321 in a state in which the substrate holding member 710 is sandwiched between the developing container lid 321 and the substrate 700. That is, the substrate holding member 710 is disposed between the developing container lid 321 and the substrate 700. At this time, the substrate holding member 710 covers a surface 510c of the substrate 700 on which the light emitting element 510a and the light receiving element 510b are mounted. By this, it is possible to not only suppress the deposition of a foreign matter such as dirt or the toner on the surface 510c but also prevent touch of the surface 510c by the user. The light emitting element 510a and the light receiving element 510b are arranged and disposed in the longitudinal direction LD of the process unit 20. The light emitted from the light emitting element 510a passes through the inside of the feeding chamber 36 and then is received by the light receiving element 510b. That is, the light emitting element 510a and the light receiving element 510b form the optical path Q (see part (a) of FIG. 37) inside the feeding chamber 36. The optical path Q extends in the longitudinal direction LD. Incidentally, in this embodiment, the light emitting element 510a and the light receiving element 510b were disposed on the substrate 700, but the present invention is not limited thereto. For example, the light emitting element 510a and the light receiving element 510b may be disposed inside the feeding chamber 36. Or, the light emitting element 510a and the light receiving element 510b may be disposed on the outer surface of the developing container 32, and the light may be guided to the inside or the outside of the feeding chamber 36 through the light guiding portions.

As shown in part (b) of FIG. 36, the substrate 700 is provided with the light emitting element 510a and the light receiving element 510b which are disposed on opposite surfaces of the substrate holding member 710 and which are used for detecting the remaining toner amount in the feeding chamber 36.

Further, in this embodiment, an LED is used as the light emitting element 510a, and as the light receiving element 510b, a phototransistor put in an ON state by light from the light emitting element 510a is used, but the present invention is not limited thereto. For example, a halogen lamp or a fluorescent lamp may be used as the light emitting element 510a, and a photodiode or an avalanche photodiode may be used as the light receiving element 510b. Further, the substrate 700 is provided with a cable connector 700n, and the cable connector 700n is connected to a controller 90 (see, FIG. 39) described later by an unshown cable.

Further, the substrate 700 includes positioning holes 700a and 700b through which the substrate positioning portions 321a and 321b are inserted and engaged, respectively, and includes substrate fixing holes 700c and 700d through which screws to be threadably engaged with the substrate fixing portions 321c and 321d are capable of penetrating.

Similarly, the substrate holding member 710 includes positioning holes 710a and 710b through which the substrate positioning portions 321a and 321b are inserted and engaged, respectively, and includes substrate fixing holes 710c and 710d through which screws to be threadably engaged with the substrate fixing portions 321c and 321d are capable of penetrating. Further, the substrate holding member 710 is provided with a first through hole 711a through which the first light guiding portion 610 of the light guiding member 600 is inserted and a second through hole 711b through which the second light guiding portion 620 of the light guiding member 600 is inserted. The substrate holding member 710 includes a first opposing surface 710 opposing the developing container lid 321, and a first cylindrical portion 711c and a second cylindrical portion 711d which extend from the first opposing surface 710h toward the developing container lid 321. Each of the first and second through holes 711a and 711b has a cylindrical shape, and defines the first through hole 711a (or the second through hole 711b). The substrate holding member 710 contacts the substrate 700.

Further, on a side where the substrate holding member 710 opposes the substrate 700, light-blocking plates 710e and 710f are provided. These light-blocking plates 710e and 710f are disposed between the light emitting element 510a and the light receiving element 510b and are close to the substrate 710 in a state in which the substrate 700 and the substrate holding member 710 are assembled with the developing container lid 321.

As shown in FIG. 35 to part (a) of FIG. 37, the substrate holding member 710 is positioned relative to the developer container lid 321 by engagement of the positioning portions 321a and 321b of the developer container lid 321 with the positioning holes 710a and 710b, respectively, through penetration. Further, the substrate 700 is positioned relative to the developing container lid 321 by engagement of the positioning portions 321a and 321b of the developing container lid 321 with the positioning holes 700a and 700b, respectively, through penetration. Thus, the substrate positioning portions 321a and 321b are used common to the substrate holding member 710 and the substrate 700, so that the developing container lid 321, the substrate holding member 710, and the substrate 700 can be accurately positioned relative to each other.

Further, in a state in which the substrate holding member 710 and the substrate 700 are positioned relative to the developing container lid 321, screws are inserted into the substrate fixing holes 700c, 700d, 710c and 710d, and thus are threadably engaged with the substrate fixing portions 321a and 321b of the developing container lid 321. By this, the substrate holding member 710 and the substrate 700 are co-fastened to the developer container lid 321, so that the substrate holding member 710 and the substrate 700 are fixed to the developing container lid 321.

As shown in FIG. 35 to part (b) of FIG. 37, when the substrate holding member 710 and the substrate 700 are assembled with the developing container lid 321, the first light guiding portion 610 of the light guiding member 600 is inserted in the first through hole 711a of the substrate holding member 710. Then, the first light guiding portion 610 is positioned in a position where the substrate 700 is close to the light emitting element 510a of the substrate 700. Similarly, the second light guiding portion 620 of the light guiding member 600 is inserted in the second through hole 711b of the substrate holding member 710. Then, the second light guiding portion 620 is positioned in a position where the light receiving-side light guiding member 620 is close to the light receiving element 510b of the substrate 700. The first through hole 711a covers the side surface 611 of the first light guiding portion 610 inserted in the first through hole 711a. Similarly, the second through hole 711b covers the side surface 621 of the second light guiding portion 620 inserted in the second through hole 711b. By this, it is possible to suppress that the light other than the light emitted from the light emitting element 510a is incident on the first light guiding portion 610 or the second light guiding portion 620, so that the detection accuracy of the remaining toner amount can be improved.

As described above, the substrate holding member 710 and the substrate 700 are positioned relative to the developer container lid 321 with accuracy, and therefore, the light emitted from the light emitting element 510a is guided by the first light guiding portion 610 with reliability. Then, the light guided to the feeding chamber 36 inside the developing container frame 320 by the first light guiding portion 610 is emitted from the light emitting window 612a of the first light guiding portion 610 in the longitudinal direction LD.

Then, the light traveling along the space optical path Q in the inside of the feeding chamber 36 is incident on the light receiving window 622a of the second light guiding portion 620 and is guided to the outside of the developing container frame 320 by the second light guiding portion 620. The second light guiding portion 620 is disposed close to the light receiving element 510b, and therefore, the light outgoing from the second light guiding portion 620 is received by the light receiving element 510b with reliability. Therefore, the detection accuracy of the remaining toner amount by the light emitting element 510a and the light receiving element 510b can be improved.

Further, as shown in parts (b) and (c) of FIG. 36, the substrate holding member 710 is provided with the light-blocking plates 710e and 710f disposed between the light emitting element 510a and the light receiving element 510b in a position close to the substrate 700. Incidentally, the substrate holding member 710 is also provided with a second opposing surface 710g opposing the substrate 700. The light-blocking plates 710e and 710f are ribs standing from the second opposing surface 710g so as to approach the substrate 700. For this reason, the light traveling toward the light receiving element 510b without via the first light guiding portion 610 and the second light guiding portion 620 is shielded (blocked) by the light-blocking plates 710e and 710f. Particularly, in this embodiment, the LED element is used as the light emitting element 510a and is weaker in directivity than, for example, a cannonball-type LED or the like, so that it is desirable that the light emitted from the light emitting element 510a and directly reaching the light receiving element 510b is shielded. Therefore, erroneous detection due to reception of light (stray light), which does not pass through the space optical path Q, by the light receiving element 510b is suppressed, so that the detection accuracy of the remaining toner amount by the light emitting element 510a and the light receiving element 510b can be improved.

Here, arrangement of the light emitting element 510a and the light receiving element 510b will be specifically described.

The light emitting element 510a and the light receiving element 510b are disposed on a side surface 36a side of the developing container 32 opposite from the developing roller 31 with respect to a direction perpendicular to the longitudinal direction of the developing roller 31 as shown in parts (a) and (b) of FIG. 37. Further, the light emitting element 510a and the light receiving element 510b are provided at a central portion of the feeding chamber 36 with respect to the longitudinal direction LD. Specifically, the light emitting element 510a and the light receiving element 510b are disposed so that a center (line) 31a (broken line) of the developing roller 31 is positioned therebetween. Thus, by providing the light emitting element 510a and the light receiving element 510b at the central portion of the feeding chamber 36, the remaining toner amount in the feeding chamber 36 can be satisfactorily detected. That is, at an end portion of the feeding chamber 36, the developer (toner) is localized in some instances, but the localization of the developer at the central portion is small in degree, so that a practical remaining toner amount can be detected.

Here, a structure of the stirring member 34 relating to the light guiding member 600 will be described. As shown in part (c) of FIG. 31, the stirring member 34 is provided with a wiping portion 34c including a light emitting-side wiping end 34c1 and a light receiving-side wiping end 34c2 and with an auxiliary wiping portion 34c2. The auxiliary wiping portion 34d is disposed so as to overlap with the wiping portion 34c. Each of these wiping portion 34c and auxiliary wiping portion 34d is a flexible sheet. Further, as viewed in an axial direction (longitudinal direction LD) of the stirring member 34, a rotation locus of the wiping portion 34c is set so as to overlap with the optical path Q.

When the stirring member 34 is rotated, the light emitting-side wiping end 34c1 passes through the light guiding member 600 while rubbing the light emitting window 612a of the first light guiding portion 610, and the light receiving-side wiping end 34c2 passes through the light guiding member 600 while rubbing the light receiving window 622a of the second light guiding portion 620. That is, every (one) rotation of the stirring member 34, the developer deposited on the light emitting window 612a and the light receiving window 622a is wiped by the wiping portion 34c. Further, the auxiliary wiping portion 34d is used for adjusting a contact pressure and an entering angle of each of the light emitting window 612a and the light receiving window 622a relative to the wiping portion 34c, and is designed in consideration of shapes, a positional relationship, and the like of the light guiding member 600 and the stirring member 34. Incidentally, the auxiliary wiping portion 34d may be omitted when a wiping performance of the wiping portion 34c alone can be sufficiently ensured. Further, a constitution in which the wiping portion 34c is omitted and in which the light emitting window 612a and the light receiving window 622a of the light guiding member 600 are cleaned by the blade portions of the stirring member 34 may be employed.

As shown in the circuit diagram of the remaining toner amount sensor 500 of FIG. 38, between the light emitting element 510a and the power source voltage Vcc, an unshown switch is provided. By putting the switch in an ON state, a voltage from the power source voltage Vcc is applied to the light emitting element 510a. By this, the light emitting element 510a is in a conduction state. On the other hand, the light receiving element 510b is also provided with an unshown switch between itself and a power source voltage (voltage source) Vcc, and by putting the switch in an ON state, the light receiving element 510b is in a conduction state by a current depending on a light quantity detected.

To the light emitting element 510a, the power source voltage Vcc and a current limiting resistor R1 are connected, and the light emitting element 510a emits light by a current determined by the current limiting resistor R1. The light emitted from the light emitting element 510a passes through the optical path Q as shown in part (b) of FIG. 37 and is received by the light receiving portion 51b. To a collector terminal of the light receiving element 510b, the power source voltage Vcc is connected, and to an emitter terminal, a detection resistor R2 is connected. The light receiving element 510b which is the phototransistor receives the light emitted from the light emitting element 510a and outputs a signal as an output value depending on a light receiving time (detection time). This signal is converted into a voltage V1 by the detection resistor R2 and is inputted to an A/D converting portion 95 of a controller 90 (see FIG. 38). The light receiving time (detection time) in which the light is received by the light receiving element 510b during one rotation of the stirring member 34 is proportional to a time in which the optical path Q is open, and therefore, becomes longer with a decreasing remaining toner amount in the embodiment chamber 36. That is, the remaining toner amount sensor 500 outputs the output value corresponding to the light receiving time of the light receiving element 510b depending on the toner amount (developer amount) of the toner (developer) accommodated in the feeding chamber 36.

As shown in part (a) of FIG. 38, the optical path Q of the remaining toner amount sensor 500 is set so as to cross the rotation loci Tb1 and Tb2 of the stirring member 34 as viewed in an axial direction of the rotation shaft of the stirring member 34. In other words, the light emitted from the light emitting element 510a of the remaining toner amount sensor 500 passes through the inside of the feeding chamber 36 within the rotation loci Tb1 and Tb2 of the stirring member 34 as viewed in the axial direction (longitudinal direction LD) of the stirring member 34.

[Control System of Image Forming Apparatus]

FIG. 39 is a block diagram showing a control system of the image forming apparatus 1. The controller 90 as a control means of the image forming apparatus 1 includes the CPU 91 as a calculating device, a RAM 92 used as an operation area of the CPU 91, and the ROM 93 for storing various programs. Further, the controller 90 includes an I/O interface 94 as an input/output port through which the controller 90 is connected to an external device, an A/D converting portion 95 for converting an analog signal into a digital signal, and an image print number counter 97 for counting the image print number of the sheets.

To an input side of the controller 90, the remaining toner amount sensor 500, a mounting sensor 53, and an open/close sensor 54 are connected, and the mounting sensor 53 detects that the toner pack 40 is mounted on the supply opening 32a of the developing container 32. For example, the mounting sensor 53 is provided at the supply opening 32a and is constituted by a pressure-sensitive switch for outputting a detection signal by being pressed by the toner pack 40. Further, the open/close sensor 54 detects whether or not the openable member 83 is opened, relative to the discharge tray 81. The open/close sensor 54 is constituted by, for example, a pressure-sensitive switch or a magnetic sensor.

The CPU 91 of the controller 90 discriminates a whether or not the light receiving element 510b receives the light from the light emitting element 510a on the basis of a voltage level inputted to the remaining toner amount sensor 500. Then, the CPU 91 calculates a length of a time in which the remaining toner amount sensor 500 detects the light when the toner in the developing container 32 is stirred for a certain time by the stirring member 34. The ROM 93 stores, in a table 96 in advance, a remaining toner amount discrimination threshold for discriminating a remaining toner amount from a light detection time of the remaining toner amount sensor 500. The CPU 91 calculates (estimates) the remaining toner amount of the toner in the developing container 32 on the basis of the light detection time of the remaining toner amount sensor 500 and the threshold stored in the table 96.

Further, to the controller 90, the operating portion 300, the image forming portion 10, and a remaining toner amount panel 400 as a notifying means capable of displaying information on the remaining toner amount are connected, and the operating portion 300 includes a display portion 301 capable of displaying various setting screens, and physical keys and the like. The display portion 301 is constituted by a liquid crystal panel, for example. The image forming portion 10 includes a motor M for driving the photosensitive drum 21, the developing roller 31, the supplying roller 33, the stirring member 34, and the like. Incidentally, a constitution in which the photosensitive drum 21, the developing roller 31, the supplying roller 33, and the stirring member 34 are driven by separate motors may also be employed.

The remaining toner amount panel 400 is provided on a right side of a front surface of a casing of the printer main assembly 100, i.e., on a side opposite from the operating portion 300 disposed on a left side, and displays information on the remaining toner amount in the developing container 32 as shown in part (b) of FIG. 28 and parts (a) to (d) of FIG. 40. In this embodiment, the remaining toner amount panel 400 as a displaying portion is a panel member consisting of a plurality (three in this embodiment) of scales arranged vertically in parallel, and the respective scales correspond to the Low level, the Mid level, and the Full level, which are described above.

That is, as shown in part (a) of FIG. 40, in the case where only a lower scale blinks intermittently, the remaining toner amount of the developing container 32 indicates a Near Out level. At this time, the remaining toner amount of the toner in the developing container 32 is smaller than a first amount QT1 (see FIG. 45). As shown in part (b) of FIG. 40, in the case where only the lower scale is lighted continuously, the remaining toner amount of the developing container 32 indicates the Low level. At this time, the remaining toner amount of the toner in the developing container 23 is the first amount QT1 (see FIG. 45) or more and less than a second amount QT2. In other words, a state of the remaining toner amount panel 400 is capable of transition between a first state (first display state) shown in part (b) of FIG. 40 and a second state (second display state), different from the first state, shown in part (a) of FIG. 40. As shown in part (c) of FIG. 40, in the case where lower and central scales are lighted and an upper scale is turned off, the remaining toner amount of the developing container 32 indicates the Mid level. As shown in part (d) of FIG. 40, all the three scales are lighted, the remaining toner amount of the developing container 32 indicates the Full level.

The NearOut level shows the remaining toner amount of an extent such that the toner in the developing container 32 is used up soon and thus the image cannot be properly formed. The Lw level shows the remaining toner amount larger than the remaining toner amount of the NearOut level and smaller than the remaining toner amount of the Mid level. The Mid level shows the remaining toner amount larger than the remaining toner amount of the Low level and smaller than the remaining toner amount of the Full level.

Incidentally, the remaining toner amount panel 400 is not limited to the liquid crystal panel, but may be constituted by a light source such as an LED or an incandescent lamp and a diffusion lens. Further, a constitution in which without separately providing the remaining toner amount panel 400, the display of the scales as described in this embodiment is made at a display of the operating portion 300 may be employed. Further, when the remaining toner amount of the developing container 32 becomes the Low level, supply notification for prompting the user to supply the toner may be displayed on the operating portion 300. Further, when the toner runs out, the supply notification for prompting the user to supply the toner may also be displayed, on the operating portion 300.

Further, in this embodiment, the constitution in which the four states are displayed by the three levels was described, but the number of the scales is not limited thereto. The number of the scales may be appropriately set depending on the structure or the like of the image forming apparatus. Further, the remaining toner amount panel 400 may be constituted so as to display the remaining toner amount continuously by percentage display or gauge display. Further, notification of the remaining toner amount to the user may be carried out by voice (sound) with use of a speaker.

[Detecting Method of Remaining Toner Amount]

Next, using part (a) of FIG. 45, a detecting method of the remaining toner amount of the toner in the developing container 32 will be described. Part (a) of FIG. 41 is a sectional view showing a state in which the remaining toner amount of the developing container 32 is small and showing a 5B-5B cross section of part (b) of FIG. 31. Part (b) of FIG. 41 is a sectional view which shows a state in which the remaining toner amount of the developing container 32 is small and in which a rotational phase of the stirring member 34 is different from a rotational phase of the stirring member 34 in part (a) of FIG. 41 and which shows the 5B-5B cross section of part (b) of FIG. 31. Incidentally, parts (a) and (b) of FIG. 41 shows a state in which an aggregation degree of the toner described later is low.

Part (a) of FIG. 42 is a sectional view which shows a state in which the remaining toner amount of the developing container 32 is large and in which a rotational phase of the stirring member 34 is the same as the rotational phase of the stirring member 34 in part (a) of FIG. 41 and which shows the 5B-5B cross section of part (b) of FIG. 31. Part (b) of FIG. 42 is a sectional view which shows a state in which the remaining toner amount of the developing container 32 is small and in which the aggregation degree of the toner is high and which shows the 5B-5B cross section of part (b) of FIG. 31. FIG. 43 is a graph showing a detected voltage when the remaining toner amount sensor 500 detects the light during one rotation of the stirring member 34. FIG. 44 is a graph showing progression of the aggregation degree of the toner with respect to a print number. FIG. 45 is a graph showing a relationship between the remaining toner amount and the detection time of the remaining toner amount sensor.

As shown in part (a) of FIG. 41 to part (b) of FIG. 42, the toner in the developing container 32 is moved and stirred in the developing container 32 by rotation of the stirring member 34. In the following, description will be made by paying attention to the toner moved by particularly the first blade portion 34b1 and the second blade portion 34b2 of the stirring member 34.

In the rotational phase of the stirring member 34 shown in part (a) of FIG. 41, the toner raised by the first blade portion 34b1 and the second blade portion 34b2 starts to fall. At this time, the stirring member 34 is in a position of the first rotational phase. Then, when the stirring member 34 is further rotated from the first rotational phase to the second rotational phase, as shown in part (b) of FIG. 41, the toner on the first blade portion 34b1 and the second blade portion 34b2 falls. In the state shown in part 8a) of FIG. 41, the light is capable of passing through the optical path Q, i.e., the optical path Q is open without being blocked. Accordingly, the remaining toner amount sensor 500 can detect the light.

On the other hand, in the state shown in part (b) of FIG. 41, the optical path Q is blocked with the toner which has fallen from the first blade portion 34b1 and the second blade portion 34b2, so that the remaining toner amount sensor 500 cannot detect the light. In a process of the rotation of the stirring member 34 from the first rotational phase to the second rotational phase, as shown in FIG. 43, the remaining toner amount sensor 500 meets a light-blocking timing Tc1 when the state of the light receiving element 510b is switched from a light-detectable state to a light-indetectable state. In the state in which the remaining toner amount of the operating container 32 is small, a time in which the remaining toner amount sensor 500 is capable of detecting the light during one-full circumference of the stirring member 34 is a time T1.

Part (a) of FIG. 42 shows a state in which the remaining toner amount of the developing container 32 is larger than in the case of each of parts (a) and (b) of FIG. 41 and in which the stirring member 34 is positioned in the first rotational phase. At this time, as shown in part (a) of FIG. 42, even in the state in which the toner is raised by the first blade portion 34b1 and the second blade portion 34b2, the toner exists in the neighborhood of the optical path Q. For this reason, as shown in FIG. 43, in the state in which the remaining toner amount of the developing container 32 is large, the time in which the remaining toner amount sensor 500 is capable of detecting the light during one-full circumference of the stirring member 34 is a time T0 shorter than the time T1.

Thus, a time in which the optical path Q is blocked by the toner fed by the stirring member 34 during one rotation of the stirring member 34, i.e., a time in which the remaining toner amount sensor 500 cannot detect the light changes depending on the remaining toner amount. That is, when the remaining toner amount of the toner in the developing container 32 is large, the optical path Q is liable to be blocked by the toner, and therefore, the time in which the remaining toner amount sensor 500 detects the light becomes short, and when the remaining toner amount is small, the time in which the remaining toner amount sensor 500 detects the light becomes long.

Incidentally, with an increasing number of times of cumulative image formation of the image forming apparatus 1 (image print number), the toner in the developing container 32 gradually loses flowability thereof. This would be considered because the toner undergoes mechanical stress by the developing roller 31 and the stirring member 34, and a fluidizing agent is embedded in a toner binder. The toner is principally constituted by a binder, a colorant, a wax, a charge control agent, and the fluidizing agent. The binder is constituted by a resin material and has a function of improving a fixing property of the image transferred on the recording material, or the like function. Here, the aggregation degree as one index indicating the flowability of the toner in the developing container (hereinafter, simply referred to as toner flowability) will be described.

[Aggregation Degree]

The aggregation degree is an index indicating ease of aggregation of the toner. In a state in which the aggregation degree of the toner is high, the toner particles gather and aggregate, and therefore, the toner flowability becomes low. On the other hand, in a state in which the aggregation degree of the toner is low, a state in which the toner particles do not readily gather is formed, so that the toner flowability becomes high. Such aggregation degree can be measured by the following method, for example.

A measuring device is a measuring instrument ("Powder Tester (registered trademark) PT-D", manufactured by Hosokawa Micron Group). Measurement was performed in the following manner. First, on a vibration table of the measuring device, three types of sieves are superimposed and set. The three types of shelves include a 200-mesh sleeve with a sieve mesh of 75 μm, a 390-mesh sieve with a sieve mesh of 38 μm, and a 635-mesh sieve with a sieve mesh of 25 μm, which are disposed in a named order from above. These sieves are set on the vibration table, and 5 g of toner aged overnight in an environment of 23° C. and 50% RH is placed on the uppermost sieve, and then the vibration table is subjected to vibration for 15 sec with an amplitude of 0.6 mm. Then, an amount of the toner remaining on each of the three sieves is measured, and the aggregation degree is calculated by using the following formulas.

(Weight of toner remaining on sieve with sieve mesh of 75 μm)×1     (a)

(Weight % of toner remaining on sieve with sieve mesh of 38 μm)×0.6     (b)

(Weight % of toner remaining on sieve with sieve mesh of 25 μm)×0.2     (c)

Aggregation degree=(a)+(b)+(c)(%)

In FIG. 44, the progression of the toner aggregation degree relative to the print number is shown. From an initial state, the aggregation degree increases with an increasing print number of sheets subjected to the image formation. The image forming apparatus 1 of this embodiment is a direct supply type in which the toner is directly supplied to the developing container 32, and by supplying the toner, the aggregation degree of the toner in the developing container 32 becomes lower than the aggregation degree immediately before the toner supply. In the case where only the toner is supplied and then the process unit 20 is repetitively used, the aggregation degree of the toner in the developing container 32 gradually increases.

In the following, a relationship between the toner flowability and the remaining toner amount detection time will be described. The state of part (a) of FIG. 41 described above is a state in which the toner aggregation degree is low. For comparing this state, part (b) of FIG. 42 shows a state in which the amount of the toner in the developing container 32 is the same as the toner amount in the state of part (a) of FIG. 42 and in which the rotational phase of the stirring member 34 is the same as the rotational phase in the state of part (a) of FIG. 42, but in which the toner aggregation degree is higher than the toner aggregation degree in the state of part (a) of FIG. 42. The toner flowability has a tendency that the toner flowability is inversely proportional to the toner aggregation degree. Even in the case where the amount of the toner in the developing container 32 is the same, when the toner flowability is different, there arises a difference in timing when the toner on the first blade portion 34b1 and the second blade portion 34b2 starts the fall.

In a state in which the aggregation degree is low as shown in part (a) of FIG. 41, the toner flowability is high, so that the toner deposited on the first blade portion 34b1 and the second blade portion 34b2 is liable to slide (slip) downward with respect to the direction of gravitation. On the other hand, in a state in which the toner aggregation degree is high as shown in part (b) of FIG. 41, the toner flowability is low, so that when compared with a condition in which the toner flowability is high, there is a tendency that the toner deposited on the first blade portion 34b1 and the second blade portion 34b2 maintains the attitude thereof. For this reason, the toner on the first blade portion 34b1 and the second blade portion 34b2 does not readily slide (slip) downward with respect to the direction of gravitation. That is, the timing when the toner on the first blade portion 34b1 and the second blade portion 34b2 starts to fall with respect to the direction of gravitation is slower in the condition of a low toner flowability than in the condition of a high toner flowability.

As shown in FIG. 43, a light-blocking timing when the state of the light receiving element 510b in the low toner flowability condition is switched from a light-detectable state to a light-in detectable state is a light-blocking timing Tc2. The light-blocking timing Tc2 is later than the light-blocking timing Tc1 in the high toner flowability condition. For this reason, a time in which in the low toner flowability condition, the remaining toner amount sensor 500 can detect the light during one-full circumference of (rotation of) the stirring member 34 is T2 longer than the above-described time T1. Incidentally, a light-transmission timing Tc3 when the state of the light receiving element 510b is switched from the light-indetectable state to the light-detectable state is constant irrespective of the toner flowability. Further, in the above, the times T1 and T2 were described by paying attention to the toner moved by the first blade portion 34b1 and the second blade portion 34b2, but the relationship of T1<T2 is unchanged even when the toner moved by the wiping portion 34c and the auxiliary wiping portion 34d are taken into consideration.

That is, even in the case where the amount of the toner in the developing container 32 is the same, when the toner flowability is different, there arises a difference in time when the remaining toner amount sensor 500 detects the light. Specifically, the detection time of the remaining toner amount sensor 500 becomes short in the high toner flowability condition and becomes long in the low toner flowability condition.

In this embodiment, the threshold for discriminating the remaining toner amount from the detection time is stored in the table 96 of the ROM 93. In the table 96, the threshold for discriminating the remaining toner amount is different depending on the image print number. For example, in the case where the threshold at a point of time of 5000 sheets from an initial state in terms of the image print number is taken as 100%, the threshold is 105% at a point of time of 10000 sheets and is 110% at a point of time of 20000 sheets.

Here, a broken line TV1 shown in FIG. 45 schematically represents a relationship between the remaining toner amount and the detection time of the remaining toner amount sensor 500 when the image forming apparatus 1 and the process unit 20 are in a new state. A solid line TV2 shown in FIG. 45 schematically represents a relationship between the remaining toner amount and the detection time of the remaining toner amount sensor 500 in the image forming apparatus 1 at the point of time of 20000 sheets in terms of the image print number. Incidentally, the abscissa of FIG. 45 represents the remaining toner amount and shows that the remaining toner amount of the toner in the developing container 32 becomes small toward a + direction (rightward direction). Further, the ordinate of FIG. 45 represents the detection time of the remaining toner amount sensor 500 and shows that the detection time becomes long toward a +direction (upward direction). In the table 96, Low thresholds V1a and V2a and NearOut thresholds V1b and V2b are stored. Incidentally, in an example shown in FIG. 45, in a range of the first amount QT1 or more and less than the second amount QT2 in terms of the remaining toner amount, the remaining toner amount panel 400 shows a Low level. In the case where the remaining toner amount is less than the first amount QT1, the remaining toner amount panel 400 shows a NearOut level.

In a new image forming apparatus 1 (see, line TV1), when the detection time of the remaining toner amount sensor 500 exceeds the Low threshold V1a, the controller 90 discriminates that the remaining toner amount is the Low level. Then, the controller 90 controls the remaining toner amount panel 400 to show the Low level (see, part (b) of FIG. 40). Further, in the new image forming apparatus 1, when the detection time of the remaining toner amount sensor 500 exceeds the NearOut threshold V1b, the controller 90 discriminates that the remaining toner amount is the NearOut level. Then, the controller 90 controls the remaining toner amount panel 400 to show the NearOut level (see, part (a) of FIG. 40). In other words, in the case where the detection time outputted from the remaining toner amount sensor 500 is not more than the NearOut threshold V1b as a predetermined threshold, the remaining toner amount panel 400 indicates the Low level (first display state). Further, in the case where the detection time outputted from the remaining toner amount sensor 500 is longer than the NearOut threshold V1b, the remaining toner amount panel 400 indicates the NearOut level (second display state).

Similarly, in the image forming apparatus 1 (see, line TV2), at the point of time of 20000 sheets in terms of the image print number, when the detection time of the remaining toner amount sensor 500 exceeds the Low threshold V2a, the controller 90 discriminates that the remaining toner amount is the Low level. Then, the controller 90 controls the remaining toner amount panel 400 to show the Low level (see, part (b) of FIG. 40). Further, in the image forming apparatus 1 at the point of time of 20000 sheets in terms of the image print number, when the detection time of the remaining toner amount sensor 500 exceeds the NearOut threshold V2b, the controller 90 discriminates that the remaining toner amount is the NearOut level. Then, the controller 90 controls the remaining toner amount panel 400 to show the NearOut level (see, part (a) of FIG. 40). In other words, in the case where the detection time outputted from the remaining toner amount sensor 500 is not more than the NearOut threshold V2b, the remaining toner amount panel 400 indicates the Low level (first display state). Further, in the case where the detection time outputted from the remaining toner amount sensor 500 is longer than the NearOut threshold V2b, the remaining toner amount panel 400 indicates the NearOut level (second display state).

Thus, the controller 90 changes the threshold used in discrimination of the remaining toner amount, depending on the image print number of the image forming apparatus 1. In other words, the threshold used in the remaining toner amount discrimination changes depending on the aggregation degree of the toner as the developer accommodated in the developing container 32.

Specifically, with an increasing image print number, the toner flowability becomes low (toner aggregation degree becomes high). Further, even in the case where the remaining toner amount is the same, with a lower toner flowability, the detection time of the remaining toner amount sensor 500 becomes longer. For this reason, in this embodiment, with the increasing image print number, correction is made so that the threshold for discriminating the remaining toner amount becomes higher. For example, the Low threshold V2a for that the image forming apparatus 1 at the point of time of 20000 sheets in terms of the image print number discriminates that the remaining toner amount is the Low level is higher than the Low threshold V1a for that the new image forming apparatus 1 discriminates that the remaining toner amount is the Low level. The NearOut threshold V2b for that the image forming apparatus 1 at the point of time of 20000 sheets in terms of the image print number discriminates that the remaining toner amount is the NearOut level is larger than the NearOut threshold V1b for that the new image forming apparatus 1 discriminates that the remaining toner amount is the NearOut level. In other words, the threshold is set at the NearOut threshold V1b as a first threshold in the case where the print number is a first value (for example, 0 sheets) and is set at the NearOut threshold V2b as a second threshold in the case where the print number is a second value (for example, 20000 sheets) larger than the first value.

Thus, by correcting the threshold for discriminating the remaining toner amount depending on the image print number, the remaining toner amount of the toner in the developing container 32 can be calculated with accuracy. For example, the case where the remaining toner amount of the toner accommodated in the developing container 32 is a third amount QT3 as a predetermined amount will be considered. The third amount QT3 is an amount which is the first amount QT1 or more and less than the second amount QT2 and which corresponds to the Low level. At this time, in the new image forming apparatus 1 (see, line TV1), the remaining toner amount sensor 500 outputs a detection time V1c as a first output value. On the other hand, in the image forming apparatus 1 (see, line TV2) at the point of time of 20000 sheets in terms of the image print number, the remaining toner amount sensor 500 outputs a detection time V2c as a second output value different from the detection time V1c. Further, as a result that the applied thresholds for discriminating the remaining toner amount are different from each other, in both the new image forming apparatus 1 and the image forming apparatus 1 at the point of time of 20000 sheets in terms of the image print number, the remaining toner amount panel 400 shows the Low level (upper display state). Therefore, even when the detection times outputted from the remaining toner amount sensor 500 are different from each other due to a difference in toner aggregation degree (transfer), by correcting the threshold for discriminating the remaining toner amount, detection accuracy of the remaining toner amount of the developing container 32 can be improved.

Incidentally, the image forming apparatus 1 of this embodiment is the direct supply type, and the toner amount of the toner in the developing container 32 is increased by supplying the toner. Also, when the controller 90 discriminates the remaining toner amount of the developing container 32 after the toner supply, the controller 90 changes the threshold for discriminating the remaining toner amount, depending on the image print number. That is, the image forming apparatus 1 changes the threshold for discriminating the remaining toner amount, depending on the image print number not only in the discrimination of the Low level or the NearOut level but also in the discrimination of the Mid level or the Full level.

Further, in this embodiment, in the process unit 20 including the feeding chamber 36 for accommodating the toner, the substrate holding member 710 and the substrate 700 are mounted, and the substrate 700 is provided with the light emitting element 510a and the light receiving element 510b. For this reason, a relative position of the optical path Q in the feeding chamber 36 is constant, so that the remaining toner amount can be stably detected irrespective positional accuracy of the process unit 20 relative to the printer main assembly 100.

Further, the light emitting element 510a and the light receiving element 510b in this embodiment are arranged and disposed along the longitudinal direction LD of the process unit 20, and are disposed on the same side (on the front side) with respect to the feeding chamber 36 as viewed in the longitudinal direction LD. For this reason, not only the light emitting element 510a and the light receiving element 510b can be disposed in a compact state, but also a power source constitution for supplying power to the light emitting element 510a and the light receiving element 510b can be disposed in a compact state. Therefore, the process unit 20 can be downsized.

Seventh Embodiment

Next, a seventh embodiment of the present invention will be described, but the seventh embodiment is different in remaining toner amount discrimination method from the sixth embodiment. For this reason, constitutions similar to those in the sixth embodiment are omitted from illustration or will be described by adding the same reference numerals or symbols to the associated figures.

As shown in FIG. 46, similarly as in the sixth embodiment, the controller 90 in this embodiment includes the CPU 91, the RAM 92, the ROM 93, the I/O interface 94, the A/D converting portion 95, and an image print number counter 97. Further, the controller 90 monitors a rotation state of the motor M1 for last several minutes from the start of the detection of the remaining toner amount by the remaining toner amount sensor 500, and includes a motor operating ratio counter 98 for calculating a latest operating ratio of the motor M1 (hereinafter, referred to as a latest motor operating ratio). That is, the latest motor operating ratio as an operating ratio is an operating ratio in a period from the start of the detection of the remaining toner amount (developer amount) by the remaining toner amount sensor 500 to before a predetermined time. Then, the CPU 91 of the controller 90 discriminates the remaining toner amount on the basis of the detection time of the light by the remaining toner amount sensor 500 and the threshold stored in the table 96. In this embodiment, the threshold for discriminating the remaining toner amount is different depending on the latest motor operating ratio.

Specifically, the rotation of the motor for the last 5 minutes from the start of the detection of the remaining toner amount is monitored, in a state in which the motor M1 is at rest for 5 minutes or more until the detection of the remaining toner amount is started, the latest motor operating ratio is 0%. On the other hand, the latest motor operating ratio in the case where the motor M1 is continuously rotated for 5 minutes or more until the detection of the remaining toner amount is started is 100%. In this embodiment, in the case where the threshold at the point of time when the latest motor operating ratio is 0% is taken as 100%, when the latest motor operating ratio reaches 100%, the threshold is 110%. Further, in a process in which the latest motor operating ratio is increased from 0% to 100%, the threshold is changed from 100% to 110% while performing linear interpolation depending on the latest motor operating ratio.

In the following, a relationship between the latest motor operating ratio and the remaining toner amount detection will be described. FIG. 47 is a graph showing a relationship between the motor rotation time and the toner aggregation degree. The toner aggregation degree is the index indicating ease of aggregation of the toner as described above. In the case where the toner in the developing container 32 is continuously stirred by the stirring member 34, the toner is electrically charged, and thus is put in a state in which toner particles are liable to aggregate together, so that the aggregation degree tends to become high (that is, the toner flowability tends to become low). On the other hand, when the stirring member 34 is at rest for a certain time, electric charges of the toner by stirring the toner with the stirring member 34 gradually attenuate, and thus the state in which the toner particles are liable to aggregate is eliminated, so that the aggregation degree tends to become low.

A region SA of FIG. 47 represents a period in which the image forming apparatus 1 continuously prints images from a state in which the image forming apparatus 1 is at rest for a certain time. That is, in the region SA, the operating ratio of the motor M1 is high. When the images are continuously printed, the toner aggregation degree increases, and when the images are printed in a certain number of sheets, the toner aggregation degree becomes constant in a high state.

A region 3B of FIG. 47 represents a period in which the image forming apparatus 1 continuously prints the images and then is at rest for a certain time or more. That is, in the region SB, the operating ratio of the motor M1 is low. When the printing is at rest, the toner aggregation degree gradually lowers, and when a certain time or more has elapsed, the toner aggregation degree becomes constant in a low state. Thus, depending on an operating status of the motor M1, the toner aggregation degree is capable of being changed. That is, the toner aggregation degree is changed depending on a frequency of use of the image forming apparatus 1 by the user or on the print number.

That is, in the case where the user operates the image forming apparatus 1 to print the images on the sheets in a small print number with an interval of a certain toner or more, the toner aggregation degree is in a low state, so that the toner flowability becomes high. On the other hand, the user continuously uses the image forming apparatus 1, the toner aggregation degree is in a high state, so that the toner flowability becomes low.

In this embodiment, the controller 90 changes the threshold for discriminating the remaining toner amount, depending on the latest motor operating ratio calculated by the motor operating ratio counter 98. In the table 96, a plurality of combinations between the latest motor operating ratio and the threshold for discriminating the remaining toner amount are stored.

That is, as in the case where the user operates the image forming apparatus 1 to print the images on the sheets in a small print number with an interval of a certain time or more, when the latest motor operating ratio is low, the threshold for discriminating the remaining toner amount is set at a low value. On the other hand, as in the case where the user continuously uses the image forming apparatus 1, when the latest motor operating ratio is high, the threshold for discriminating the remaining toner amount is set at a high value.

For example, as shown in FIG. 45, in the case where the latest motor operating ratio is low, the image forming apparatus 1 employs the Low threshold V1a and the NearOut threshold V1b. On the other hand, in the case where the latest motor operating ratio is high, the image forming apparatus 1 employs the Low threshold V2a and the NearOut threshold V2b. That is, even in the case where the same first amount QT1 is detected as the remaining toner amount, the NearOut threshold V2b when the latest motor operating ratio is high is larger than the NearOut threshold V1b when the latest motor operating ratio is low. In other words, the threshold for discriminating whether or not the remaining toner amount becomes the NearOut level is set at the NearOut threshold V1b as a first threshold when the latest motor operating ratio is a first operating ratio (for example 0%). Further, the threshold for discriminating whether or not the remaining toner amount becomes the NearOut level is set at the NearOut threshold V2b as a second threshold when the latest motor operating ratio is a second operating ratio (for example 100%) larger than the first operating ratio. The NearOut threshold V2b is larger than the NearOut threshold V1b.

Thus, depending on the latest motor operating ratio corresponding to the use frequency of the image forming apparatus 1 by the user, the threshold for discriminating the remaining toner amount is changed, so that the remaining toner amount of the toner in the developing container 32 can be accurately calculated.

Other Embodiments

Incidentally, in the above-described first embodiment, the controller 90 corrects the threshold for discriminating the remaining toner amount, depending on the image print number of sheets, but the present invention is not limited thereto. That is, it is also possible to correct the detection time of the remaining toner amount sensor 500 while making the remaining toner amount threshold constant. Further, the controller 90 may also correct the threshold for discriminating the remaining toner amount, depending on a total print time or a total operation time of the image forming apparatus.

Further, in either one of the above-described embodiments, the controller 90 compares the detection time of the remaining toner amount sensor 500 with the predetermined threshold and thus discriminates the remaining toner amount level of the toner in the developing container 32, but the present invention is not limited thereto. For example, the remaining toner amount sensor 500 may output, to the controller 90, a signal having a value inversely proportional to the detection time, and the controller 90 may discriminate the remaining toner amount level of the toner in the developing container 32 by comparing this value with the threshold. At this time, the threshold is set lower with a higher aggregation degree of the toner.

Further, in either one of the above-described embodiments, the light emitting portion and the light receiving portion are disposed and arranged along the longitudinal direction LD, but the present invention is not limited thereto. That is, the light emitting portion and the light receiving portion may be disposed in any positions when these portions are disposed on the side surface sides opposite from the developing roller 31.

Incidentally, in either one of the above-described embodiments, the reading device 200 is provided over the printer main assembly, but the present invention is not limited thereto. That is, the image forming apparatus may be a printer provided with no reading device. Further, the reading device may be a reading device provided with the ADF (Auto Document Feeder).

In the following, constitution embodiments of the sixth and seventh embodiments are shown.

Constitution Embodiment 1

An image forming apparatus comprising:
an apparatus main assembly;
an image bearing member on which an image is borne;
a process unit provided in the apparatus main assembly and including a frame constituting an accommodating portion for accommodating a developer, a developer carrying member provided on the frame and for developing an electrostatic latent image by supplying the developer to the electrostatic latent image formed on the image bearing member, and a supply opening through which the developer is capable of being supplied to the accommodating portion;
a detecting unit including a light emitting portion for emitting light and a light receiving portion for receiving the light emitted from the light emitting portion and passed through an inside of the accommodating portion, wherein the detecting unit outputs an output value depending on a developer amount of the developer accommodated in the accommodating portion; and
a display portion capable of transition between a first display state and a second display state and constituted so as to make a transition to the first display state in the case where the output value outputted from the detecting unit is a threshold or less and so as to make a transition to the second display state in the case where the output value is larger than the threshold, wherein the threshold changes depending on a cumulative print number of sheets of the image forming apparatus.

Constitution Embodiment 2

In the image forming apparatus according to the constitution embodiment 1, the threshold is set at a first threshold in the case where the print number of sheets is a first number of sheets and is set at a second threshold larger than the first threshold in the case where the print number of sheets is a second number of sheets larger than the first number of sheets.

Constitution Embodiment 3

In the image forming apparatus according to the constitution embodiment 1 or 2, the process unit includes a stirring member which stirs the developer accommodated in the accommodating portion by rotation thereof.

Constitution Embodiment 4

An image forming apparatus comprising:
an apparatus main assembly;
an image bearing member on which an image is borne;
a process unit mounted in the apparatus main assembly and including a frame constituting an accommodating portion for accommodating a developer, a developer carrying member provided on the frame and for developing an electrostatic latent image by supplying the developer to the electrostatic latent image formed on the image bearing member, a stirring member for stirring the developer accommodated in the accommodating portion by being rotated, and a supply opening through which the developer is capable of being supplied to the accommodating portion;
a driving source for driving the stirring member;
a detecting unit including a light emitting portion for emitting light and a light receiving portion for receiving the light emitted from the light emitting portion and passed through an inside of the accommodating portion, wherein the detecting unit outputs an output value depending on a developer amount of the developer accommodated in the accommodating portion; and
a display portion capable of transition between a first display state and a second display state and constituted so as to make a transition to the first display state in the case where the output value outputted from the detecting unit is a predetermined threshold or less and so as to make a transition to the second display state in the case where the output value outputted from the detecting unit is larger than the predetermined threshold, wherein the predetermined threshold changes depending on an operating ratio of the driving source in a period from a detection start timing of the developer amount by the detecting unit to before a predetermined time.

Constitution Embodiment 5

In the image forming apparatus according to the constitution embodiment 4, the predetermined threshold is set at a first threshold in the case where the operating ratio is an operating ratio and is set at a second threshold larger than the first threshold in the case where the operating ratio is a second operating ratio larger than the first number operating ratio.

Constitution Embodiment 6

In the image forming apparatus according to the constitution embodiment 4 or 5, the light emitting portion and the light receiving portion are disposed and arranged along a longitudinal direction of the image bearing member, and
the light emitted from the light emitting portion passes through the inside of the accommodating portion with a rotation locus of the stirring member as viewed in the longitudinal direction.

Constitution Embodiment 7

In the image forming apparatus according to any one of the constitution embodiments 4 to 6, the output value is a value that corresponds to a time in which the light receiving portion receives the light emitted from the light emitting portion during one rotation of the stirring member.

Constitution Embodiment 8

An image forming apparatus comprising:
an apparatus main assembly;
an image bearing member on which an image is borne;
a process unit provided in the apparatus main assembly and including a frame constituting an accommodating portion for accommodating a developer, a developer carrying member provided on the frame and for developing an electrostatic latent image by supplying the developer to the electrostatic latent image formed on the image bearing member, and a supply opening through which the developer is capable of being supplied to the accommodating portion;
a detecting unit including a light emitting portion for emitting light and a light receiving portion for receiving the light emitted from the light emitting portion and passed through an inside of the accommodating portion, wherein the detecting unit outputs an output value depending on a developer amount of the developer accommodated in the accommodating portion; and
a display portion capable of transition between a first display state and a second display state and constituted so as to make a transition to the first display state in the case where the output value outputted from the detecting unit is a threshold or less and so as to make a transition to the second display state in the case where the output value is larger than the threshold, wherein the threshold changes depending on an aggregation degree of the developer accommodated in the accommodating portion.

Constitution Embodiment 9

An image forming apparatus comprising:
an apparatus main assembly;
an image bearing member on which an image is borne;
a process unit provided in the apparatus main assembly and including a frame constituting an accommodating portion for accommodating a developer, a developer carrying member provided on the frame and for developing an electrostatic latent image by supplying the developer to the electrostatic latent image formed on the image bearing member, and a supply opening through which the developer is capable of being supplied to the accommodating portion;
a detecting unit including a light emitting portion for emitting light and a light receiving portion for receiving the light emitted from the light emitting portion and passed through an inside of the accommodating portion, wherein the detecting unit outputs an output value depending on a developer amount of the developer accommodated in the accommodating portion; and
a display portion capable of transition between a first display state, wherein the display portion is in the first display state when the developer amount of the developer accommodated in the accommodating portion is a predetermined amount and the output value is a first output value, and is in the second display state when the developer amount of the developer accommodated in the accommodating portion is the predetermined amount and the output value is a second output value different from the first output value.

Constitution Embodiment 10

In the image forming apparatus according to any one of the constitution embodiments 1 to 9, the display portion is a panel member which is continuously turned on the first display state and which intermittently blinks in the second display state.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Applications Nos. 2021-203077 filed on Dec. 15, 2021 and 2021-206459 filed on Dec. 20, 2021, which are hereby incorporated by reference herein in their entirety.

What is claimed is:

1. An image forming apparatus comprising:
   a container configured to accommodate a developer; and
   a sensor configured to output an output signal depending on an amount of the developer in the container, wherein the sensor includes a light emitting element and a light receiving element which are provided outside the container, and a light guide provided on a wall surface of the container and configured to guide light, emitted by the light emitting element, toward the light receiving element through an inside space of the container,
   wherein the light guide includes:
   a first projected portion projected to an outside of the container relative to the wall surface in a first direction intersecting with a direction of gravity and having an incident surface on which the light emitted by the light emitting element is incident and which is provided at an end portion of the first projected portion with respect to the first direction;
   a second projected portion projected to an inside of the container relative to the wall surface in the first direction and through which the light incident on the first projected portion is emitted to the inside space of the container, wherein an upper surface of the second projected portion is positioned above a first virtual rectilinear line that is parallel to and is on an upper surface of the first projected portion as viewed in a direction intersecting with both the first direction and the direction of gravitation,
   a third projected portion projected to the inside of the container relative to the wall surface in a second direction intersecting with the direction of gravity and on which the light emitted to the inside space of the container is incident; and
   a fourth projected portion projected to the outside of the container relative to the wall surface in the second direction and having a light emergent surface from which the light incident on the third projected portion is emitted toward the light receiving portion and which is provided on an end portion of the fourth projected portion with respect to the second direction,
   wherein an upper surface of the third projected portion is positioned above a second virtual rectilinear line that is parallel to and is on an upper surface of the fourth projected portion in a case where the upper surface of the third projected portion is viewed in a direction crossing the second direction and the direction of gravitation,
   wherein the first projected portion and the second projected portion are configured such that a direction in which the light travels from the outside of the container to the inside of the container through the first projected portion and the second projected portion is a direction intersecting with the direction of gravity, and
   wherein the third projected portion and the fourth projected portion are configured such that a direction in which the light travels from the inside of the container to the outside of the container through the third projected portion and the fourth projected portion is a direction intersecting with the direction of gravity.

2. An image forming apparatus according to claim 1, wherein the second projected portion includes a first lower portion positioned below the first virtual rectilinear line and a first upper portion positioned above the first lower portion as viewed in the direction intersecting both the first direction and the direction of gravitation,
   wherein the upper surface of the second projected portion is a part of the first upper portion,
   wherein the third projected portion includes a second lower portion positioned below the second virtual rectilinear line and a second upper portion positioned above the second lower portion as viewed in the direction intersecting both the second direction and the direction of gravitation, and
   wherein the upper surface of the third projected portion is a part of the second upper portion.

3. An image forming apparatus according to claim 2, wherein the first upper portion is molded integrally with the first lower portion with the same material as a material of the first lower portion, and
   wherein the second upper portion is molded integrally with the second lower portion with the same material as a material of the second lower portion.

4. An image forming apparatus according to claim 2, wherein the first upper portion and the first lower portion are separate members, and a lower surface of the first upper portion and an upper surface of the first lower portion are bonded together, and
   wherein the second upper portion and the second lower portion are separate members, and a lower surface of the second upper portion and an upper surface of the second lower portion are bonded together.

5. An image forming apparatus according to claim 4, wherein the first upper portion is formed with a material lower in transmission property of the light emitted by the light emitting element than a material of the first lower portion, and
   wherein the second upper portion is formed with a material lower in transmission property of the light emitted by the light emitting element than a material of the second lower portion.

6. An image forming apparatus according to claim 2, wherein a first space is provided between a lower surface of the first upper portion and an upper surface of the first lower portion, and
   wherein a second space is provided between a lower surface of the second upper portion and an upper surface of the second lower portion.

7. An image forming apparatus according to claim 2, further comprising a stirring member which is provided inside the container and which is rotated about an axis extending in a longitudinal direction of the container so as to stir the developer in the container,
  wherein the stirring member includes a shaft extending in the longitudinal direction and a blade portion which is formed with a flexible sheet material and which is projected from the shaft,
  wherein at an end portion of the first upper portion opposite from the wall surface of the container, a first end surface extending in the longitudinal direction, and
  wherein at an end portion of the second upper portion opposite from the wall surface of the container, a second end surface extending in the longitudinal direction.

8. An image forming apparatus according to claim 1, wherein at least a part of the upper surface of the second projected portion is inclined downward toward the inside of the container as viewed in the direction intersecting both the first direction and the direction of gravitation, and
  wherein at least a part of the upper surface of the third projected portion is inclined downward toward the inside of the container as viewed in the direction intersecting both the first direction and the direction of gravitation.

9. An image forming apparatus according to claim 8, wherein each of an inclination angle of at least the part of the upper surface of the second projected portion relative to a horizontal surface and an inclination angle of at least the part of the upper surface of the third projected portion relative to the horizontal surface is larger than an angle of repose of the developer.

10. An image forming apparatus according to claim 1, wherein the incident surface of the first projected portion is a first incident surface and the light emergent surface of the fourth projected portion is a first light emergent surface,
  wherein the second projected portion has a second light emergent surface from which the light incident on the first projected portion is emitted to the inside space,
  wherein the third projected portion has a second incident surface on which the light emitted from the second projected portion to the inside space is incident, and
  wherein the second light emergent surface and the second incident surface oppose each other with respect to a longitudinal direction of the container.

11. An image forming apparatus according to claim 10, further comprising a wiping portion provided inside the container and configured to wipe the developer deposited on the second light emergent surface of the second projected portion and the second incident surface of the third projected portion by being rotated about an axis thereof extending in the longitudinal direction in contact with the second light emergent surface and the second incident surface.

12. An image forming apparatus according to claim 11, wherein the second projected portion has a first offset surface positioned above the second light emergent surface and extending in a direction along the second light emergent surface,
  wherein the third projected portion has a second offset surface positioned above the second incident surface and extending in a direction along the second incident surface,
  wherein the first offset surface is offset to a side close to the wall surface relative to the second light emergent surface as viewed in a height direction perpendicular to the longitudinal direction and parallel to the wall surface of the container, and
  wherein the second offset surface is offset to a side close to the wall surface relative to the second incident surface as viewed in the height direction.

13. An image forming apparatus according to claim 11, wherein the second light emergent surface is bent convexly toward the second incident surface with respect to the longitudinal direction as viewed in a height direction perpendicular to the longitudinal direction and parallel to the wall surface of the container, and
  wherein the second incident surface is bent convexly toward the second light emergent surface with respect to the longitudinal direction as viewed in the height direction.

14. An image forming apparatus according to claim 11, wherein the second projected portion has a reflecting surface for reflecting, toward the second light emergent surface, the light traveling from the first projected portion to the second projected portion on a side opposite from the second light emergent surface with respect to the longitudinal direction, and
  wherein the third projected portion has a reflecting surface for reflecting, toward the first light emergent surface of the fourth projected portion, the light incident on the second incident surface on a side opposite from the second incident surface with respect to the longitudinal direction.

15. An image forming apparatus according to claim 1, wherein the wall surface of the container is provided with an opening,
  wherein the light guide includes a frame portion mounted on the opening, and
  wherein the first projected portion, the second projected portion, the third projected portion, the fourth projected portion, and the frame portion are integrally molded.

16. An image forming apparatus according to claim 1, wherein of surfaces of the light guide exposed to the outside of the container, surface roughness of at least a part of a portion excluding the first projected portion and the fourth projected portion is larger than surface roughness of each of the first projected portion and the fourth projected portion.

17. An image forming apparatus according to claim 1, wherein the second projected portion and the third projected portion oppose each other, and
  wherein each of the direction intersecting both the first direction and the direction of gravitation and the direction intersecting both the second direction and the direction of gravitation is the longitudinal direction.

* * * * *